(12) United States Patent
McKenzie

(10) Patent No.: US 11,743,544 B2
(45) Date of Patent: *Aug. 29, 2023

(54) INTERACTIVE CONTENT FEEDBACK SYSTEM

(71) Applicant: Trent R McKenzie, Austin, TX (US)

(72) Inventor: Trent R McKenzie, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,008

(22) Filed: Jul. 29, 2021

(65) Prior Publication Data

US 2021/0357447 A1 Nov. 18, 2021

Related U.S. Application Data

(63) Continuation-in-part of application No. 17/229,864, filed on Apr. 14, 2021, now Pat. No. 11,423,077,
(Continued)

(51) Int. Cl.
*G06F 3/04847* (2022.01)
*H04N 21/475* (2011.01)
(Continued)

(52) U.S. Cl.
CPC ....... *H04N 21/4756* (2013.01); *G06F 16/638* (2019.01); *G06F 16/686* (2019.01); *H04N 21/2743* (2013.01)

(58) Field of Classification Search
CPC ........... G06Q 30/0203; G06Q 30/0204; G06Q 30/0202; H04N 21/4756; H04N 21/2743; G06F 16/638; G06F 16/686
See application file for complete search history.

(56) References Cited

U.S. PATENT DOCUMENTS

| 6,963,848 B1 | 11/2005 | Brinkerhoff |
| 7,301,944 B1 | 11/2007 | Redmond |

(Continued)

OTHER PUBLICATIONS

M. Wilkening, "Top 10 Drum Songs," published May 31, 2011 as indicated in the waybackmachine.org, downloaded from http://ultimateclassicrock.com/top-drum-songs/.

(Continued)

*Primary Examiner* — Eric J Yoon

(57) ABSTRACT

This invention is directed to a tool that enables content creators to collect and analyze feedback on their content during production and live performances. During playback of content, users are enabled to provide detailed feedback and comments via various feedback interfaces on user devices. Users may indicate that they like and dislike certain aspects of the content, such as musical instruments featured in a song, at specific points in time. Feedback is time-stamped, transformed into values, and aggregated for review and analysis. Using machine learning techniques, the present invention can identify trends in audience preferences and generate recommendations for tailoring content and content delivery. An interactive display enables the content creator to efficiently manipulate and make sense of collected feedback. With robust security features, the interactive content feedback system described herein may integrate with content streaming platforms as well as operate as an independent application.

20 Claims, 16 Drawing Sheets

Related U.S. Application Data which is a continuation-in-part of application No. 16/256,198, filed on Jan. 24, 2019, now Pat. No. 11,003,708, which is a continuation-in-part of application No. 16/120,261, filed on Sep. 1, 2018, now Pat. No. 10,795,929, which is a continuation of application No. 14/261,764, filed on Apr. 25, 2014, now Pat. No. 10,102,224.

(60) Provisional application No. 61/815,965, filed on Apr. 25, 2013.

(51) Int. Cl.
 *G06F 16/68*    (2019.01)
 *G06F 16/638*   (2019.01)
 *H04N 21/2743*  (2011.01)

(56) References Cited

U.S. PATENT DOCUMENTS

| | | | | |
|---|---|---|---|---|
| 7,890,374 | B1* | 2/2011 | Khan | G06Q 30/02 |
| | | | | 705/27.2 |
| 8,311,881 | B2 | 11/2012 | Silman | |
| 8,417,715 | B1* | 4/2013 | Bruckhaus | G06Q 10/04 |
| | | | | 705/26.1 |
| 8,918,312 | B1 | 12/2014 | Rehling | |
| 9,235,967 | B1* | 1/2016 | Magee | G06F 3/14 |
| 9,325,653 | B1 | 4/2016 | Peterson | |
| 9,436,947 | B2* | 9/2016 | Thiel | G06Q 30/0201 |
| 10,102,224 | B2 | 10/2018 | McKenzie | |
| 10,795,929 | B2 | 10/2020 | McKenzie | |
| 11,003,708 | B2 | 5/2021 | McKenzie | |
| 2002/0032776 | A1 | 3/2002 | Hasegawa | |
| 2003/0014262 | A1 | 1/2003 | Kim | |
| 2003/0089218 | A1 | 5/2003 | Gang | |
| 2004/0049534 | A1 | 3/2004 | Nickerson | |
| 2005/0111662 | A1* | 5/2005 | Fiedler | H04N 21/472 |
| | | | | 348/E7.071 |
| 2005/0125444 | A1 | 6/2005 | Grigorian | |
| 2006/0212444 | A1 | 9/2006 | Handman | |
| 2007/0163428 | A1 | 7/2007 | Salter | |
| 2008/0082394 | A1 | 4/2008 | Floyd | |
| 2008/0109415 | A1 | 5/2008 | Yabe | |
| 2009/0038468 | A1 | 2/2009 | Brennan | |
| 2010/0038416 | A1 | 2/2010 | Canora | |
| 2010/0191689 | A1 | 7/2010 | Cortes | |
| 2010/0211439 | A1* | 8/2010 | Marci | H04N 21/42201 |
| | | | | 705/7.29 |
| 2013/0124653 | A1 | 5/2013 | Vick | |
| 2013/0145385 | A1 | 6/2013 | Aghajanyan | |
| 2014/0099973 | A1 | 4/2014 | Cecchini | |
| 2014/0281981 | A1 | 9/2014 | Yoshikawa | |
| 2021/0232624 | A1 | 7/2021 | McKenzie | |
| 2021/0357447 | A1 | 11/2021 | McKenzie | |

OTHER PUBLICATIONS

WDD staff, "Common Elements Used in Interface Button Design," published on Apr. 27, 2011, downloaded at https://www.webdesignerdepot.com/2011/04/common-elements-used-in-interface-button-design/ (Year 2011).

* cited by examiner

Menu-Upload Page

BACK — 1

MENU — 2

Upload

1. Upload File:
   - Browse — 3
     - Attached File 1
   - or
   - Enter URL + — 4
     - Attached URL 1

2. Enter Information: — 5
   - Title
   - Artist
   - Album
   - Lyrics
   - Discography Uploaded @ Hr:Min on Day/Month/Year Text Entry Box — 6

3. Select Rating Criteria:
   - Selected Criterion 1
   - Selected Criterion 2
   - Selected Criterion 3
   - Custom Criterion 1

| Criterion 1 | Criterion 5 | Criterion 9 |
   | Criterion 2 | Criterion 6 | Criterion 10 | — 7
   | Criterion 3 | Criterion 7 | Criterion 11 |
   | Criterion 4 | Criterion 8 | Custom + |

4. Add Recipients:
   - Select Contacts — 8
     - Selected Contact 1
     - Selected Contact 2
     - Selected Contact 3
   - or
   - Enter Emails + — 9
     - Selected Email 1
     - Selected Email 2
     - Selected Email 3

Comments/Instructions — 10

Time / Date — 13

Upload & Send — 11

FIGURE 1

INTERACTIVE CONTENT FEEDBACK SYSTEM

CROSS REFERENCES TO OTHER RELATED APPLICATIONS

This application is a continuation-in-part (CIP) of and claims priority to U.S. patent application Ser. No. 17/229,864, filed on Apr. 14, 2021, which is a CIP of and claims priority to U.S. patent application Ser. No. 16/256,198, filed on Jan. 24, 2019 and issued as U.S. Pat. No. 11,003,708 on May 11, 2021, which is a CIP of and claims priority to U.S. patent application Ser. No. 16/120,261, filed on Sep. 1, 2018 and issued as U.S. Pat. No. 10,795,929 on Oct. 6, 2020, which is a continuation of and claims priority to U.S. patent application Ser. No. 14/261,764, filed on Apr. 25, 2014 and issued as U.S. Pat. No. 10,102,224 on Oct. 16, 2018, which claims priority to and is a non-provisional patent application of U.S. Provisional Patent Application No. 61/815,965, filed on Apr. 25, 2013. The contents of each aforementioned patent application and/or issued patent are hereby incorporated by reference in entirety.

BACKGROUND

When creating content, whether it be music, audio, visual, video, written, typed, text, multimedia, and/or any other type of content, a creator may seek the opinions of others, such as bandmates, producers, directors, collaborators, investors, trusted advisors, focus groups, target audiences, fans, listeners, viewers, watchers, readers, riders, patrons, customers, consumers, live audiences, team members, consultants, colleagues, employees, and/or the general public. For example, a songwriter may desire to understand what a listener likes or dislikes about a particular song at various points in time or during certain sections of the song. Feedback obtained from others informs the creator's decisions when creating content and therefore enables the creator to tailor his content to preferences and/or audience demands if he or she chooses. Accordingly, there is need for a tool that enables content creators to efficiently solicit, receive, and analyze feedback during the content creation process.

BRIEF SUMMARY

The present invention is generally directed to a tool that enables content creators to efficiently solicit, receive, and analyze feedback during the content creation process. In an exemplary embodiment, a content creator first uploads content to an online platform, selects recipients, and sets parameters for feedback collection. Once set, the online platform presents the content and a feedback interface to each recipient on the recipient's computing device. While the content plays, the recipient provides feedback on the content using the feedback interface. For example, the recipient may indicate on the feedback interface that he or she likes or dislikes particular elements of the content, such as musical instruments featured in the content, at different points in time or in certain sections of the content. Inputted feedback is timestamped, processed by encryption or other means, and transmitted to the online platform. The online platform aggregates and analyzes all recipient feedback, identifies trends, generates suggestions for improving the content, and presents all of the aforementioned to the content creator on an interactive display. The content creator can view, sort, filter, and/or otherwise interact with the recipient feedback to determine how best to tailor the content to audience preferences. The interactive content feedback system described herein may integrate with a variety of streaming platforms, be utilized during live performances, and/or operate without ever uploading content to the online platform.

BRIEF DESCRIPTION OF THE DRAWINGS

Having thus described embodiments of the invention in general terms, reference will now be made to the accompanying drawings.

FIG. 1 is an exemplary user interface for enabling a content creator to upload content, in accordance with embodiments of the present invention.

Figure 2:
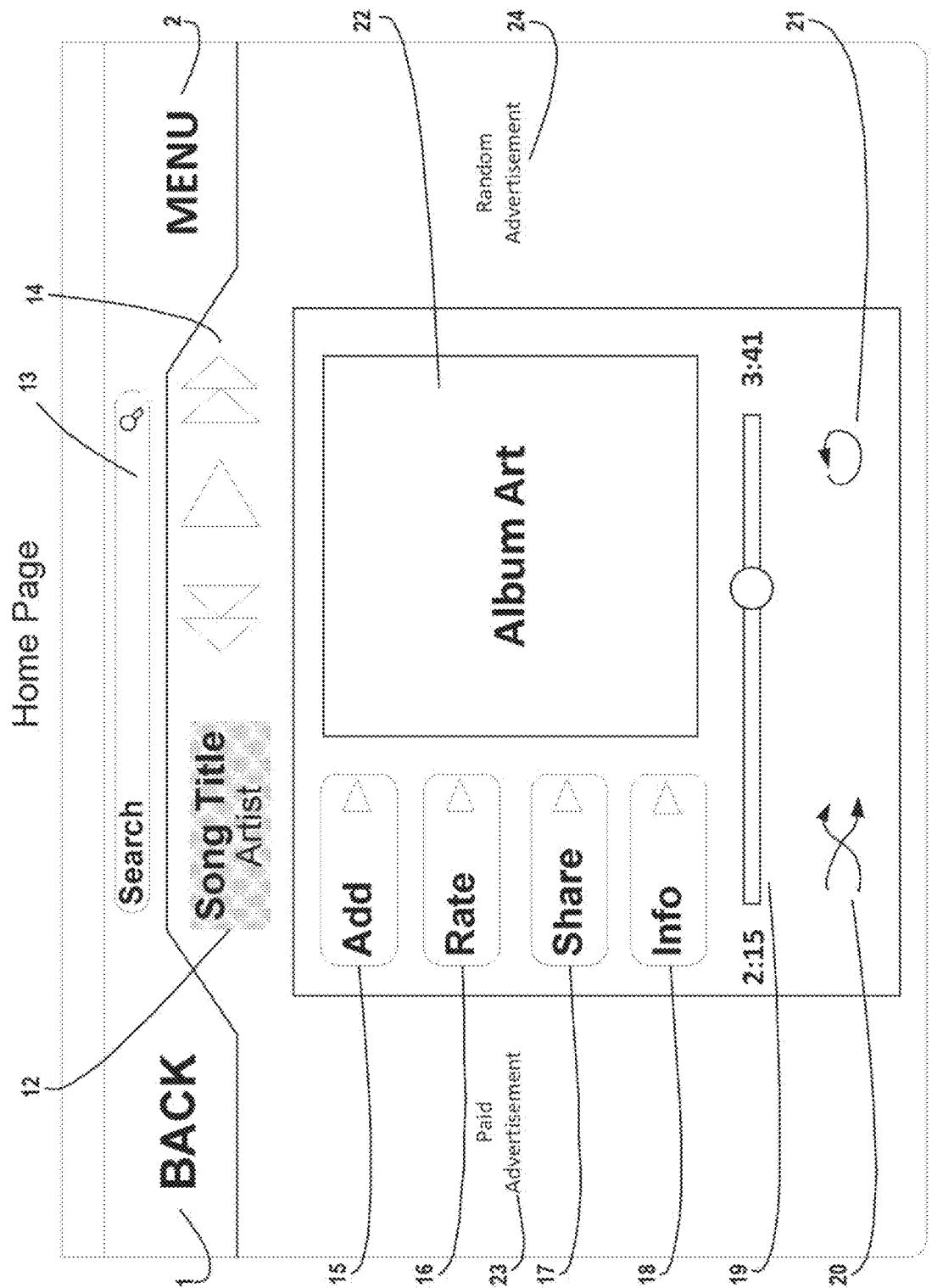

FIG. 2 is an exemplary user interface for a recipient's home page, in accordance with embodiments of the present invention.

Figure 3:
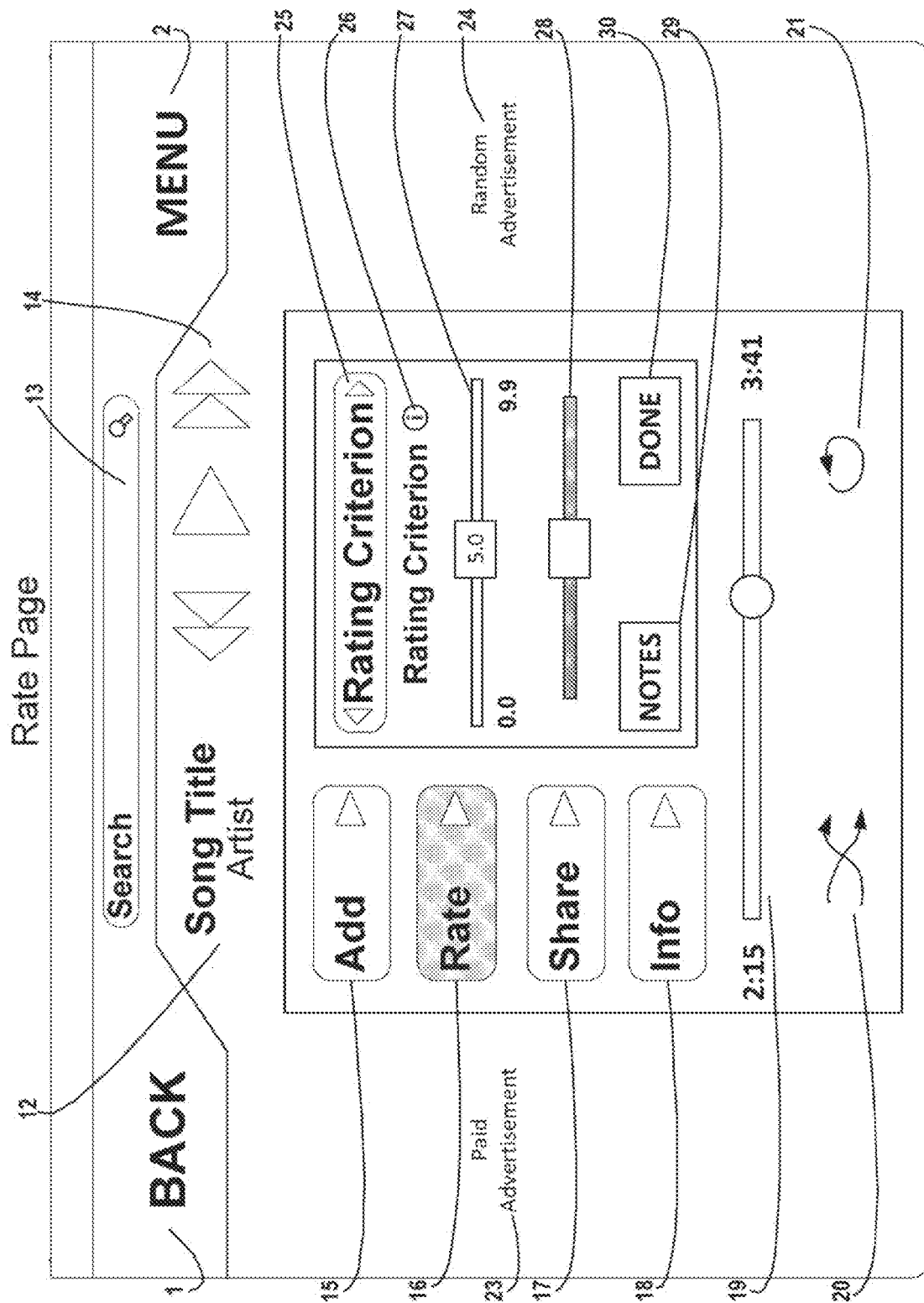

FIG. 3 is an exemplary user interface for enabling a recipient to provide feedback during playback of content, in accordance with embodiments of the present invention.

Figure 4:
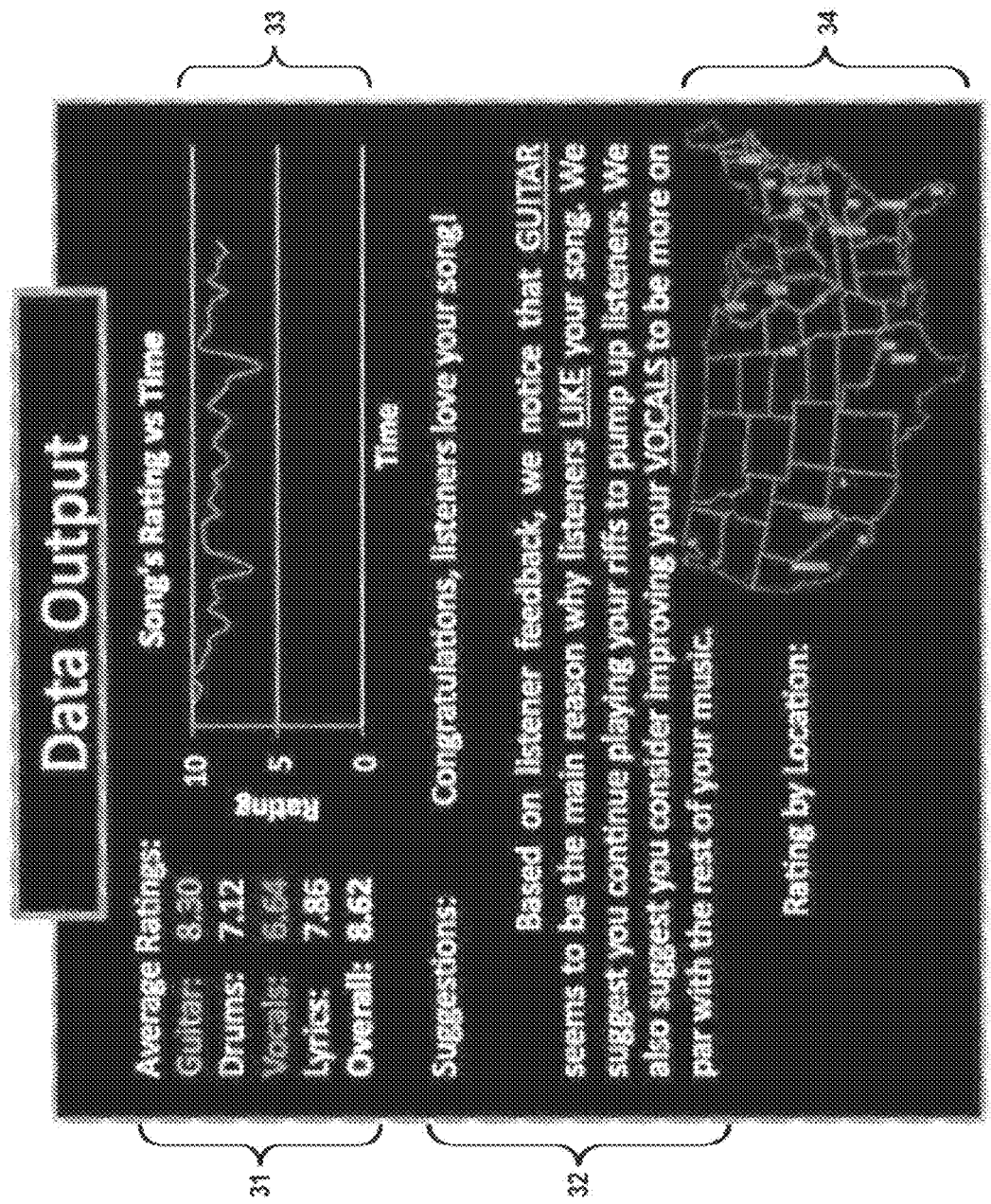

FIG. 4 is an exemplary user interface for presenting recipient feedback and accompanying analysis to the content creator, in accordance with embodiments of the present invention.

Figure 5:
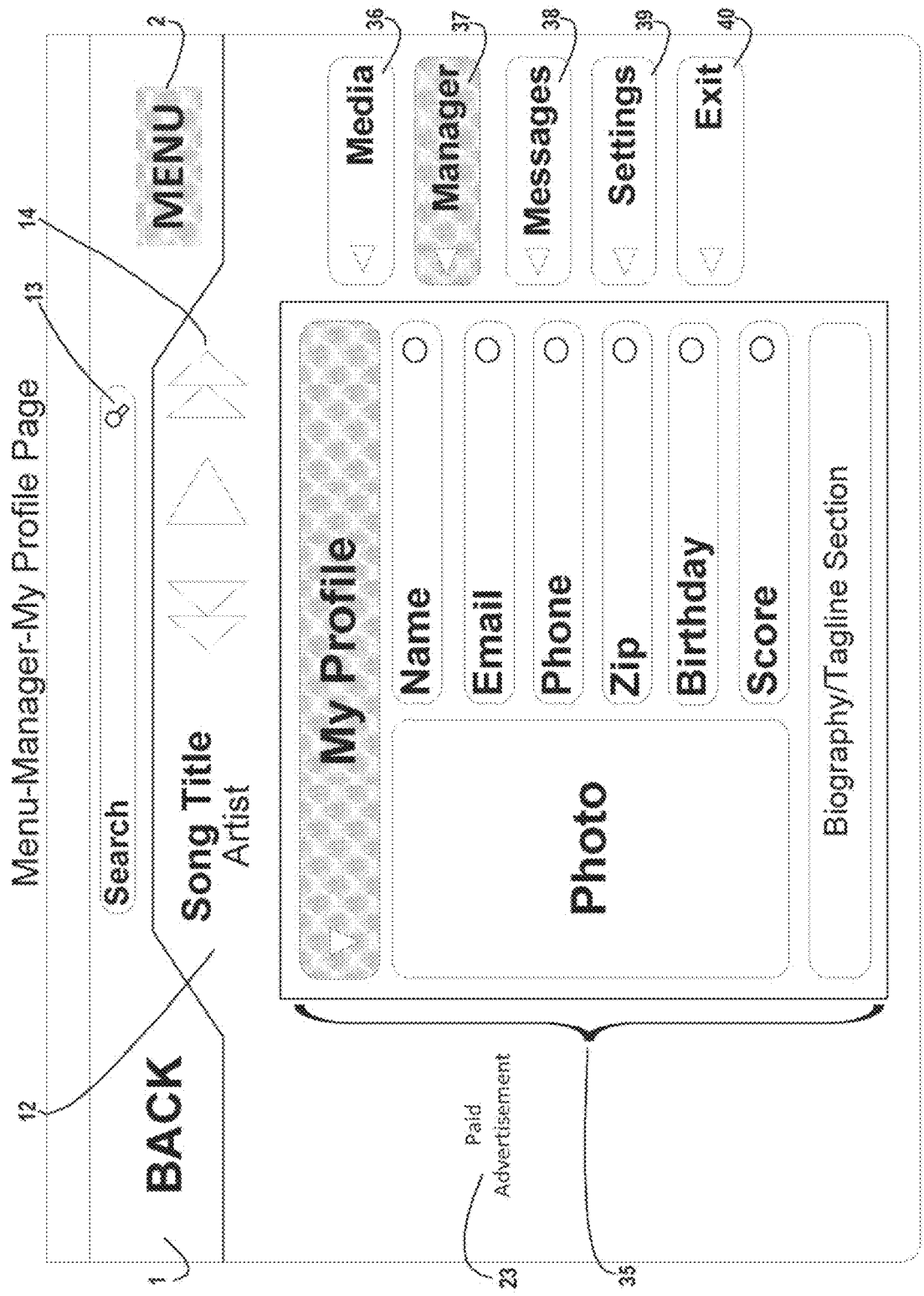

FIG. 5 is an exemplary user interface for a user profile, in accordance with embodiments of the present invention.

Figure 6:
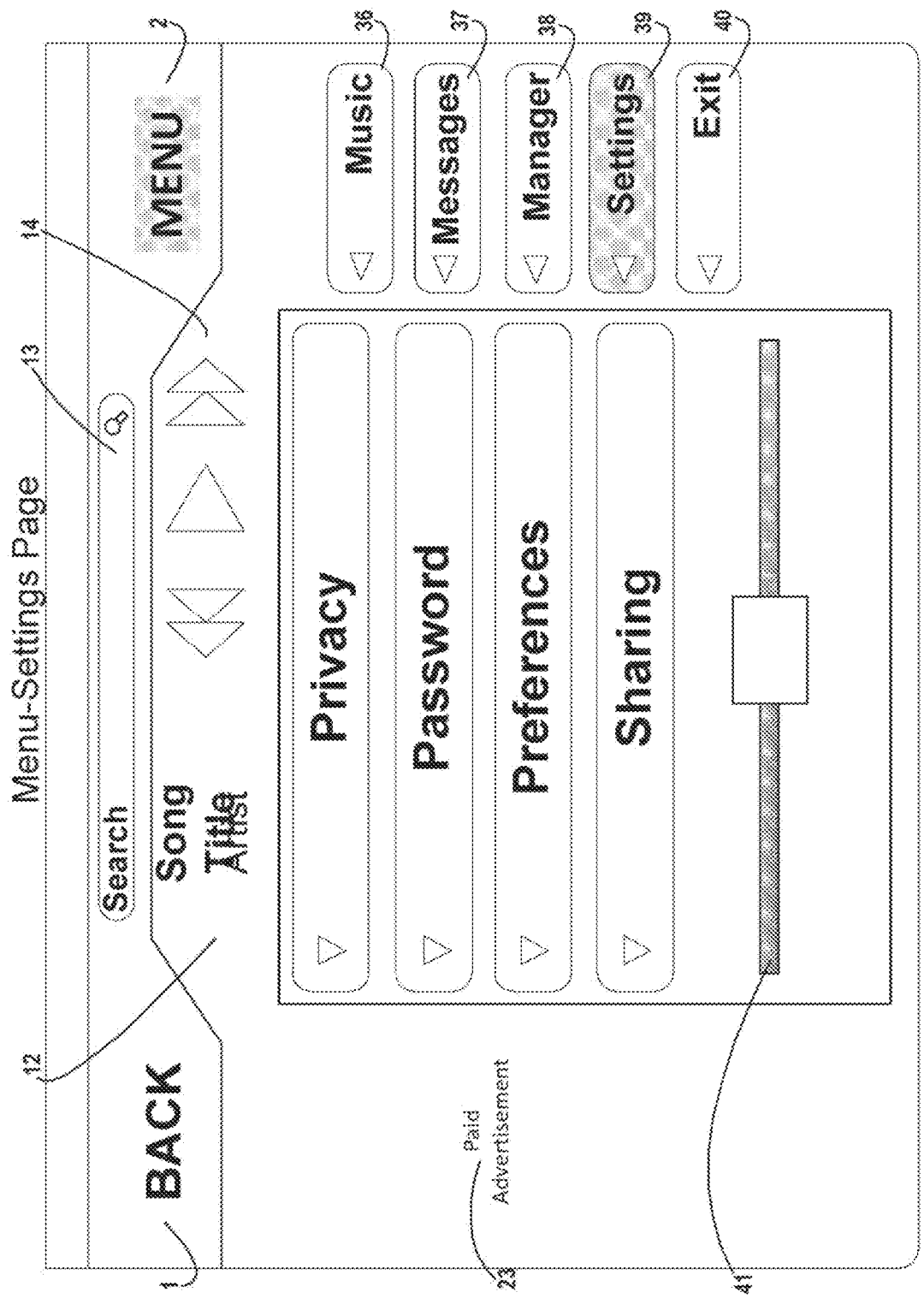

FIG. 6 is an exemplary user interface for user settings, in accordance with embodiments of the present invention.

Figure 7:
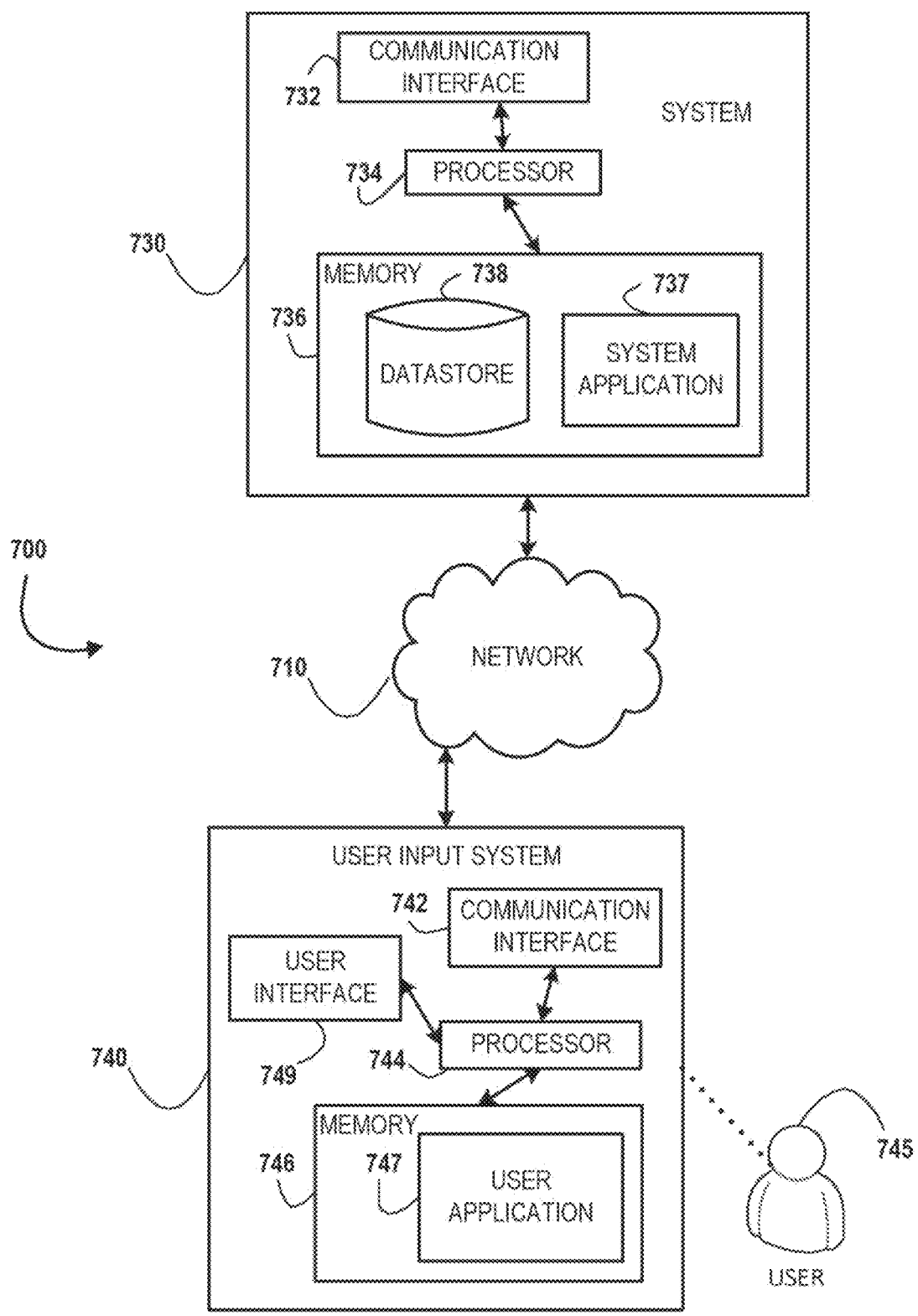

FIG. 7 is an exemplary system diagram of a computing environment, in accordance with embodiments of the present invention.

Figure 8:
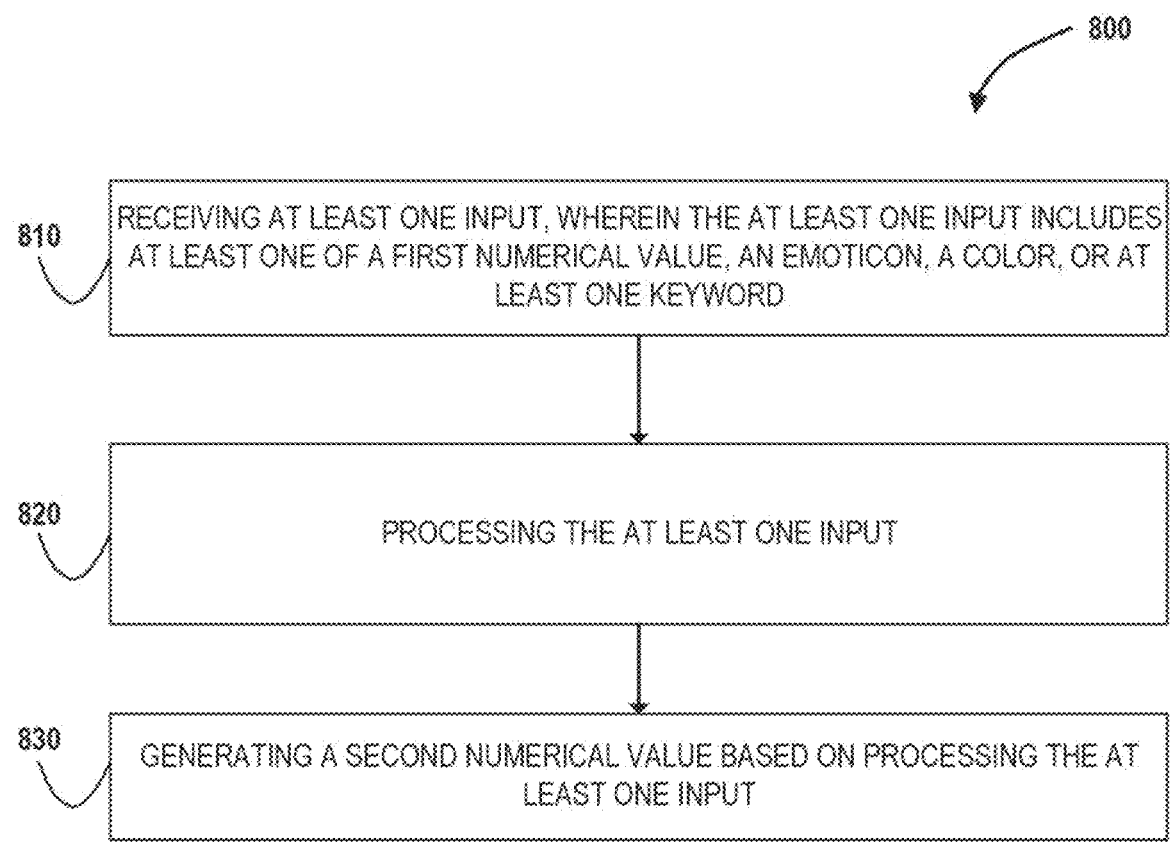

FIG. 8 is an exemplary process flow for generating a rating score for content based on a variety of inputs, in accordance with embodiments of the present invention.

Figure 9A:
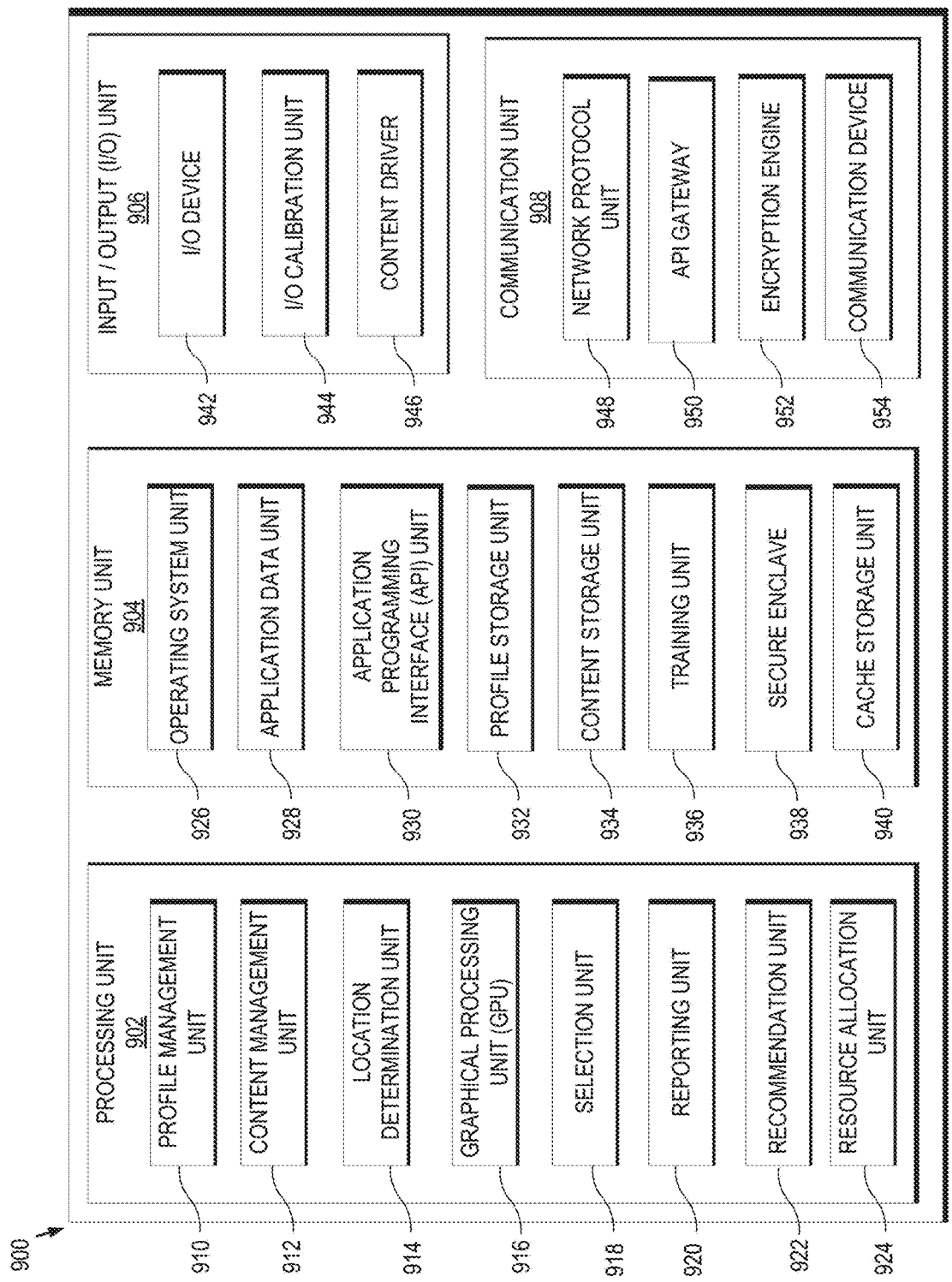

FIG. 9A is an exemplary computing environment, in accordance with embodiments of the present invention.

Figure 9B:
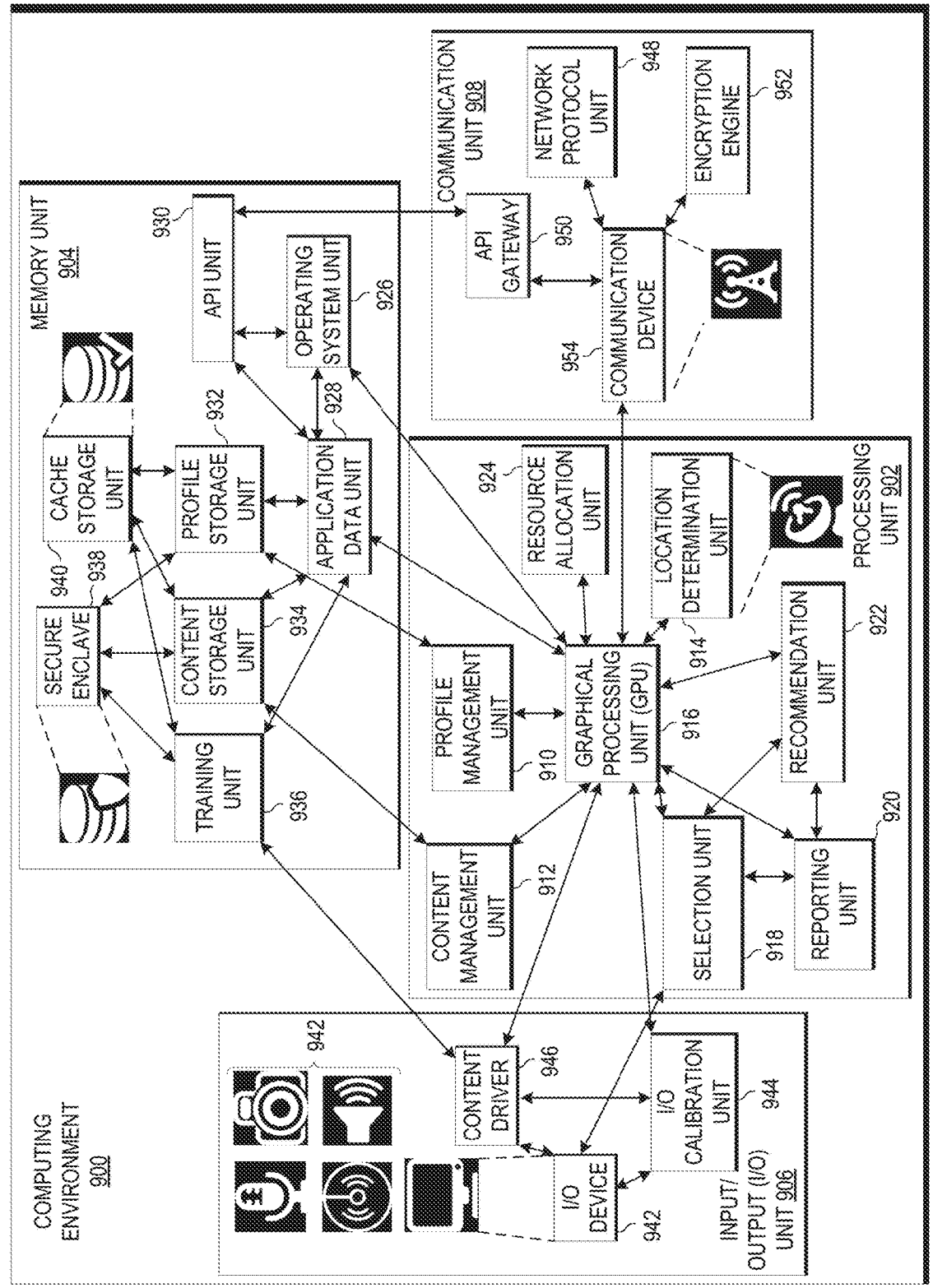

FIG. 9B is an exemplary connectivity diagram of the computing environment in FIG. 9A, in accordance with embodiments of the present invention.

Figure 10A:
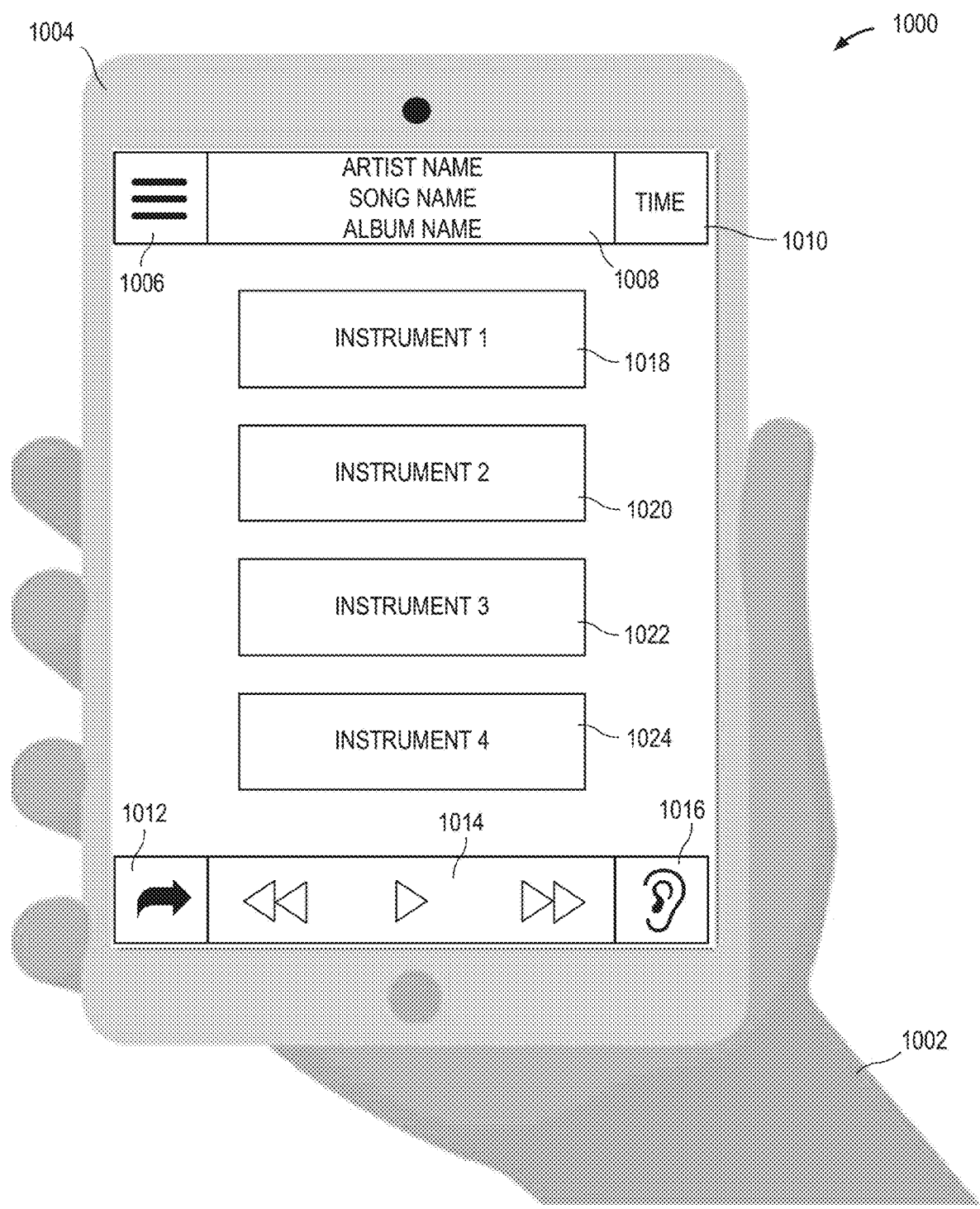

FIG. 10A is an exemplary feedback interface with selectable buttons, in accordance with embodiments of the present invention.

Figure 10B:
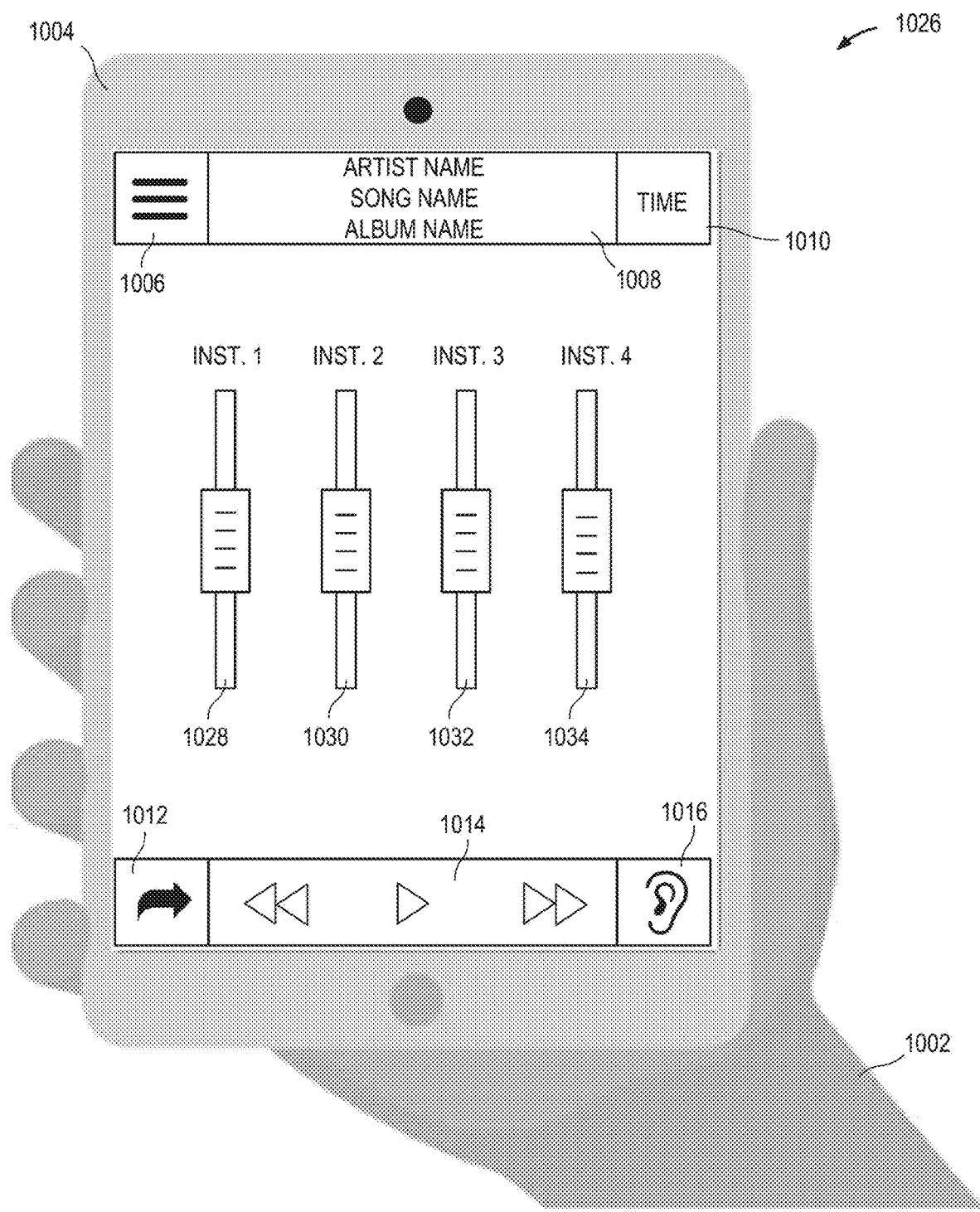

FIG. 10B is an exemplary feedback interface with sliders, in accordance with embodiments of the present invention.

Figure 10C:
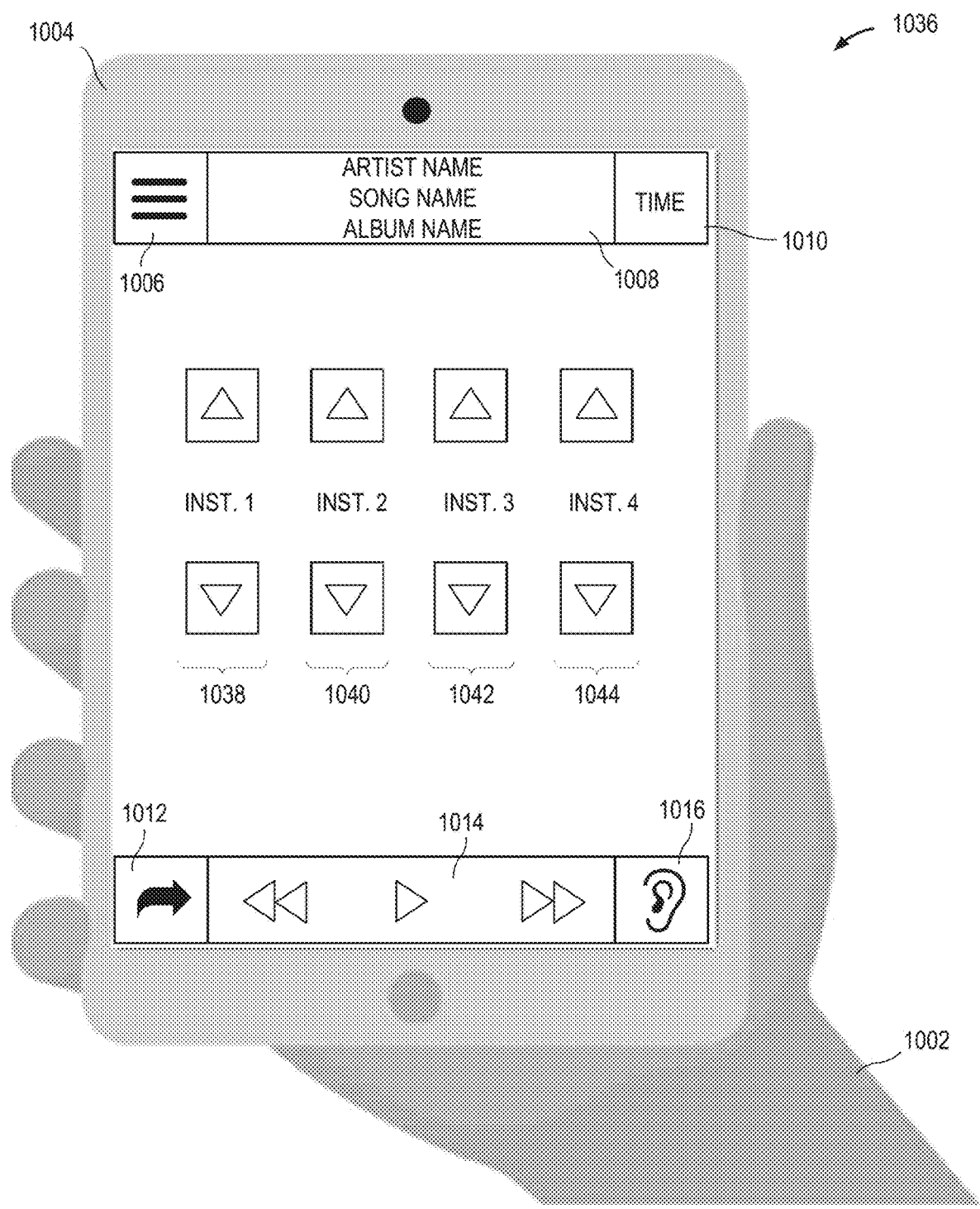

FIG. 10C is an exemplary feedback interface with up and down buttons, in accordance with embodiments of the present invention.

Figure 10D:
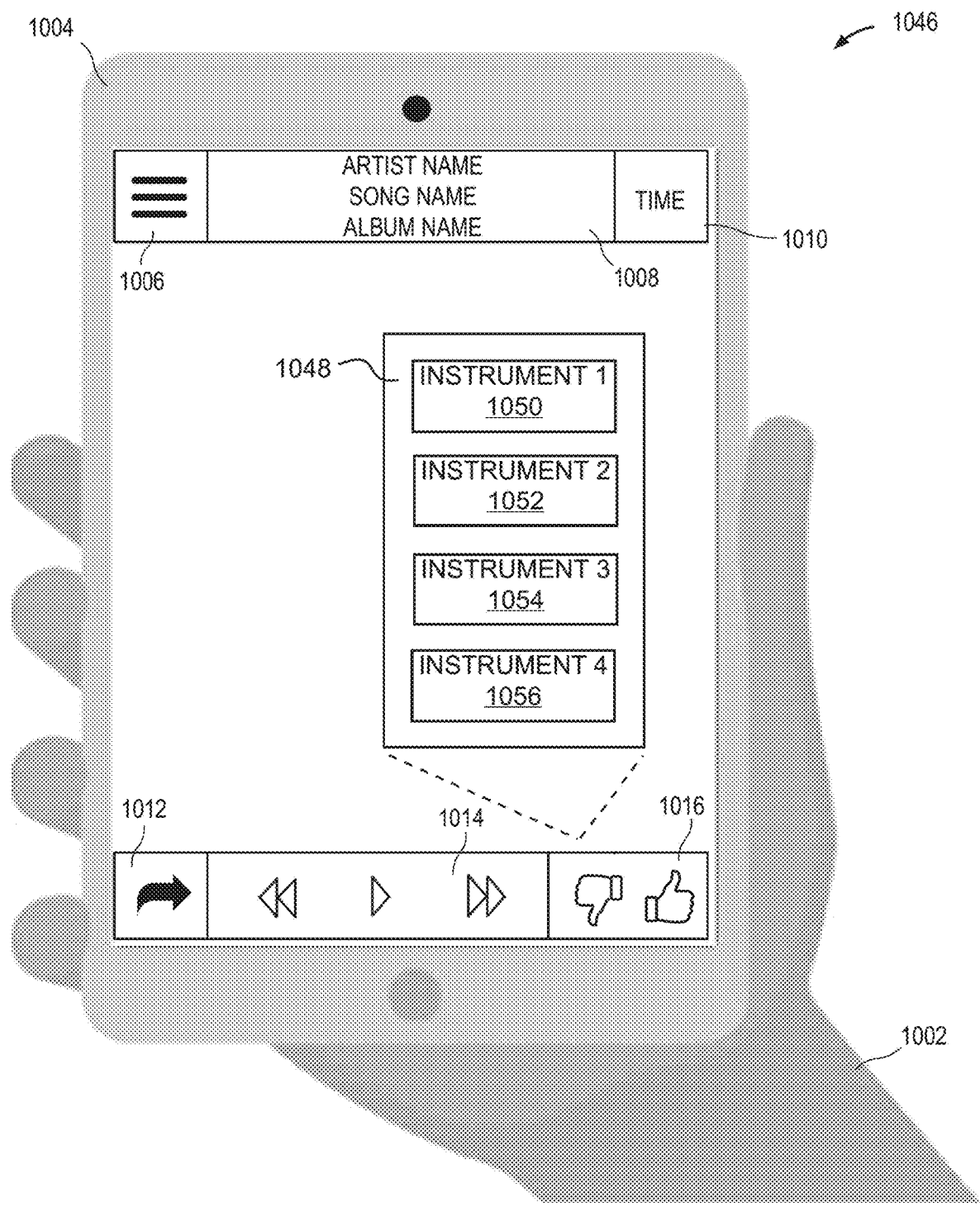

FIG. 10D is an exemplary feedback interface with a pop-up menu, in accordance with embodiments of the present invention.

Figure 10E:
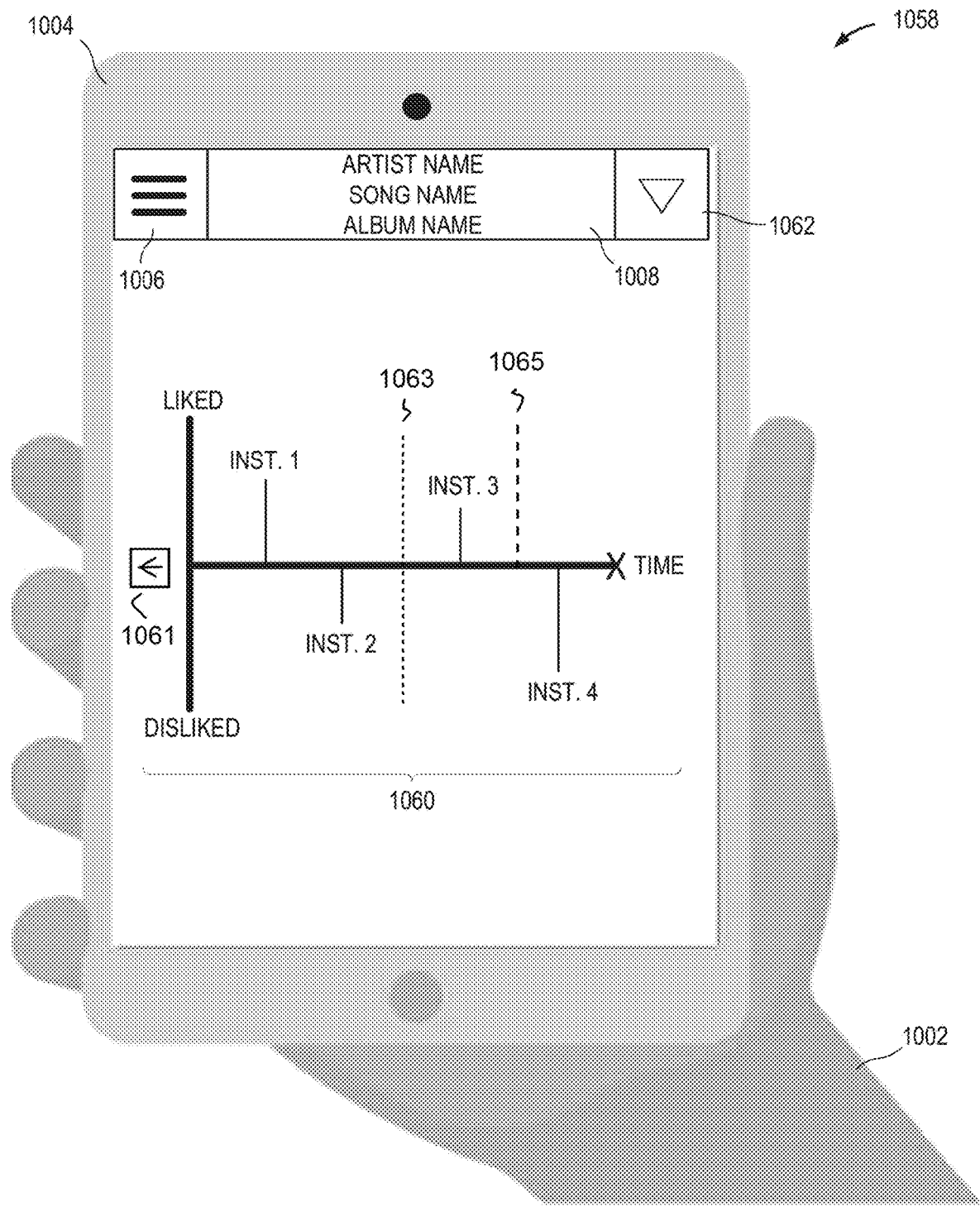

FIG. 10E is an exemplary user interface displaying recipient feedback received during playback of content, in accordance with embodiments of the present invention.

Figure 10F:
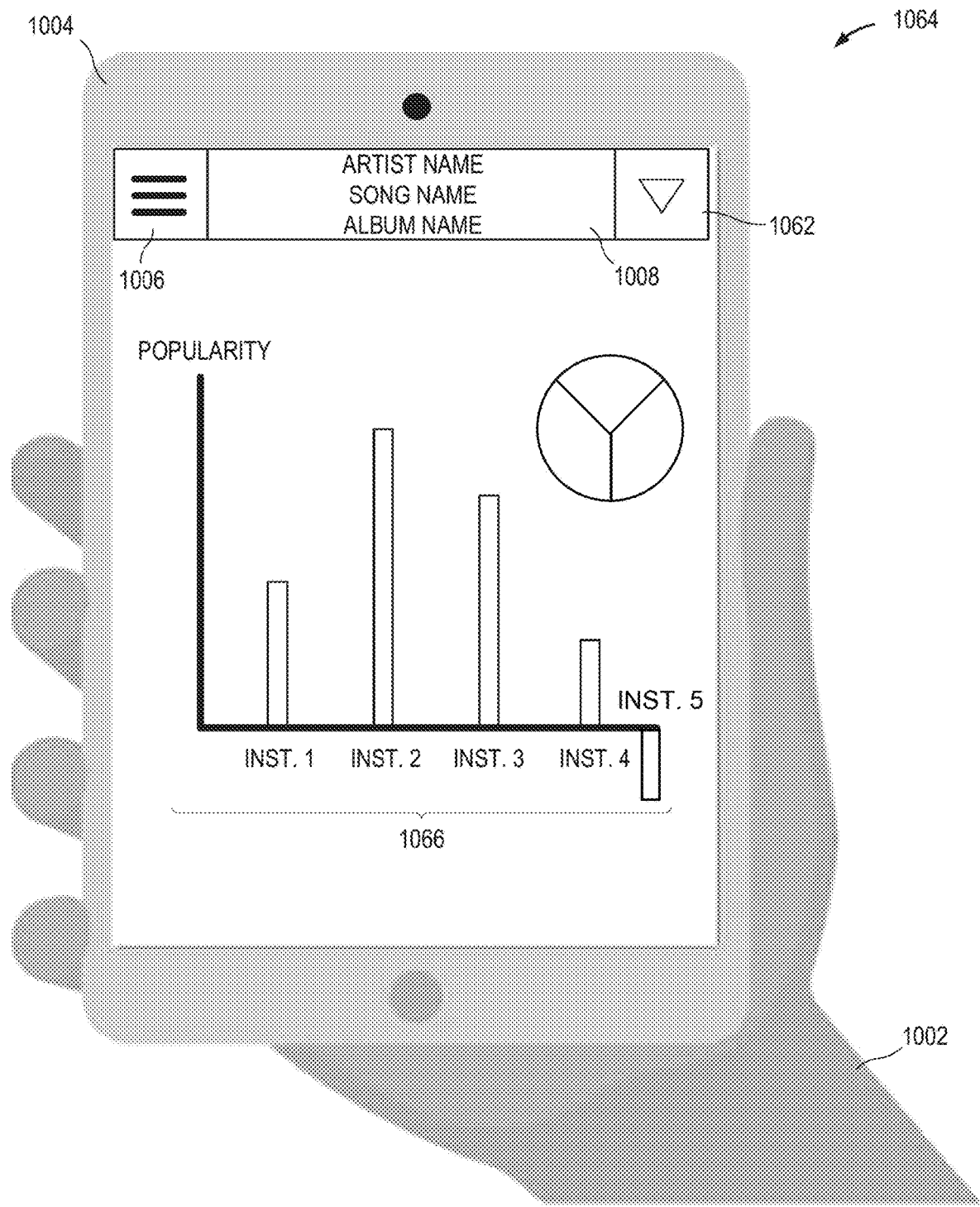

FIG. 10F is an exemplary user interface displaying recipient feedback received during playback of content, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Any embodiment of the present invention described herein may be combined with any other embodiment of the present invention, separated from other embodiments, and/or otherwise integrated with any combination of embodiments and/or characteristics of the present invention described herein.

As used herein, a "user" may refer to a "first user," a "second user," and/or the like. The first user generally refers to a content creator such as a songwriter, an artist, a musician, a producer, a director, a cinematographer, a photographer, a musical performer, an engineer, a product designer, a marketer, a writer, and/or the like. The second user generally refers to a recipient such as a listener, an audience member, a family member, a friend, a fan, a second musician, a focus group participant, a band mate, another first user, and/or the like. These user terms may be used interchangeably and/or may refer to one another.

The present invention is directed to a software-based tool (e.g., an application) that enables the first user to collect feedback from one or more second users in regards to content (e.g., a work of art, a piece of music, a song, audio content, video content, an advertisement, text, a live performance, a sporting event, a sports broadcast, a player, a user, a television broadcast, a webcast, a podcast, a comedy skit, a speech, a movie, a picture, an image, a physical product, a virtual product, a non-fungible token (NFT), an item, a website, a design, a social media post, an article, a meme, a game, a book, a product demonstration, a prototype, a dating profile, a social media profile, media content, an instrument, multimedia content, a person, an animal, a plant, and/or any other type of content). The term "content" may be used interchangeably throughout with any (or multiple) of the examples provided herein, and each example of content may refer to and/or include one another. In some embodiments, the application may be further configured to generate a unique rating score (e.g., a numerical value) associated with the content, an element of and/or featured in the content (e.g., a musical instrument, a phrase, lyrics, a tempo, an effect, the order and/or structure of the content, and/or any other characteristic of the content as described herein) and/or a recipient's opinion of the content based on the processing of recipient feedback. The rating score may serve as a numerical benchmark for overall quality, an indicator of an emotional response to the content, popularity of various elements of the content, a comparison of multiple content items, and/or other metrics. As mentioned above, one or more individual elements of the content and/or one or more users may also receive rating scores in addition and/or alternatively to an overall rating score.

The present invention described herein may be used in a production setting, a collaborative production setting, songwriting, film production, television production, video production, audio production, music production, social media content production, content production, pre-screens of content, previews of content, prereleases of content, live performances of content, focus groups, social media platforms, streaming platforms, virtual reality platforms, sports, content players, media players, art galleries, art expositions, comedy performances, podcasts, spoken word, sermons, political speeches, dating applications, web applications, mobile applications, computer applications, product design, sales pitches, brand consulting, and/or any other instances in which feedback on content would be helpful.

As shown in FIG. 1, the first user may be enabled via an interface (e.g., an online form, an application page, a display, and/or a web application) to upload the content to a server location accessible by the first user and/or one or more second users. A "Back" 1 button and a "Menu" 2 button may generally enable the user to navigate between pages of the interface. In some embodiments, the user may attach a file by selecting the "Browse" 3 button. The system may launch a window that enables the first user to select a content file from a storage location of a user device such as a desktop, a folder, a hard drive, a cloud server, and/or the like. In some embodiments, the content is uploaded, transferred to, and/or otherwise accessible by a dedicated server, a cloud-based server, a user device, and/or another storage device. In other embodiments, the first user may be enabled to provide a hyperlink, a URL, a pointer, and/or another reference to the content if the content is already uploaded to an Internet-enabled media server and/or otherwise accessible to the interactive content feedback system described herein. To do so, the user may provide a URL and/or a link to the file by selecting the "Enter URL" 4 button. For example, the first user may wish to link to a piece of music that has already been uploaded to the Internet, a website, a storage device (e.g., a server, a hot spot, a mobile device, and/or the like), a social media network, a music streaming service, a content platform, and/or the like. The content may be accessed by the system described herein and ultimately made available to the first user and/or the one or more second users via the World Wide Web, the Internet, an application, an operating system, a streaming protocol, a secure network, and/or any other type of communication connection.

In some embodiments, the content may be a physical item and/or a live performance, and therefore uploading the content to a computer is not possible. In these instances, simply a reference, a label, and/or other markers can be inputted manually by the first user to identify the content. Such referencing or other means of identification could also be useful when the first user has security concerns and/or for various reasons does not wish to upload content to the online platform. For example, the first user may fear of the content being stolen, leaked, and/or distributed without proper authorization if it is uploaded to the online platform. The first user may also be contractually prohibited from transmitting, moving, and/or sharing content in certain manners as part of a production agreement. While the online platform (e.g., the system described herein) may take great strides to ensure the highest security possible for any content uploaded and/or feedback received on such content, the first user may still be required to operate the interactive content feedback system herein without ever uploading the content to be reviewed. In some embodiments of the present invention the interactive content feedback system may enable the first user to solicit and collect feedback on content without requiring the content to be uploaded, transmitted, and/or otherwise shared as described in more detail herein.

After the first user selects, uploads, references, and/or otherwise provides access to the content, or even if the first user does not upload or reference any content, the first user is enabled to input information 5 associated with the content. Information associated with the content may include identifying information such as a title, an artist name, a producer name, a picture or photo, a length or duration associated with the content, a time, date, and/or location of a performance or focus group event, a version number, lyrics, discography information, a genre, an album name, a biography, notes, instructions for reviewing the content, metadata, and/or the like. Additional notes may be entered via the "Text Entry Box" 6. In some embodiments, the system may automatically identify, retrieve, list, and/or fill in at least one piece of information 5 based on an analysis of the content, metadata associated with the content, and/or a history of previous content on which the first user sought feedback. In other embodiments, manual entry of information 5 may be utilized, or a combination of manual and automatic entry.

In addition to entering information 5 associated with the content, the first user may be enabled to select, identify, denote, indicate, and/or otherwise input at least one rating criterion by selecting at least one of the "Criterion" 7 buttons and/or by other means. In some embodiments, the at least one rating criterion may be associated with and/or include any element or characteristic of the content such as a musical instrument featured in a piece of music, the audio mix or arrangement of a piece of music, special effects in video content, dialogue, a performance of a particular musical instrument, an aspect or feature of a product, a feeling, an emotion, sections of content, a purchasable item, purchasable content, interactive content, and/or the like. The at least one rating criterion, which will be presented to the second user(s) who provide feedback on the content as selectable options for responding to the content, may direct the second user(s) to rate certain aspects and/or elements of the content and/or otherwise indicate to the second user(s) the element(s) of the content that the first user desires to obtain feedback on. In some embodiments, the at least one rating criterion may be manually specified, defined, selected, and/or inputted by the first user. In other embodiments, the at least one rating criterion may be automatically determined by the system. For example, the system may automatically determine, based on an analysis or other processing of the content, which musical instruments are present in a mix or an arrangement of audio content, and thus may automatically include each identified instrument as a separate rating criterion. The system may also automatically determine which items, products, characters, vehicles, manufacturers, and/or the like are present in content based on an analysis of the content and/or metadata associated with content. The system may also group and/or consolidate similar identified instruments into one rating criterion. For example, if the system identifies multiple guitar tracks in audio content, the system may create one rating criterion for all guitars featured in the audio content.

In some embodiments, the first user may create a custom rating criterion. This may enable the first user to specify exactly which aspects of the content he wishes to receive feedback on. More particularly, the first user may also be enabled to input elements (e.g., rating criteria, one or more characteristics, aspects of the content, and/or the like) on which the first user wishes to receive feedback. For example, in the context of rating a song, an element may include an musical instrument featured in the song, a voice, a vocal performance, a song section (e.g., intro, verse, prechorus, chorus, bridge, breakdown, and/or the like), a tempo, a beat, a vibe, a feel, a groove, dynamics, an artist, a genre, an album, lyrics, effects, profanity, subject matter, a mix, an arrangement, and/or any other characteristic of the song. As another example, when seeking feedback on an image, the first user may specify "composition," "brightness," "contrast," "subject," clarity," "zoom," "color," "set", "scene," "location," and/or any other characteristic of the image as criteria to be reviewed by the second user. In this manner, the first user is enabled to specify custom criteria.

Various input means may be provided to enable the first user to specify and/or select rating criteria such as icons, lists, selections, text fields, and/or the like. For example, the first user may input and/or select the names of three musical instruments featured in a song on which he wishes to receive feedback. In some embodiments, the first user may be enabled to select criteria from a list of predetermined, popular, most-used, and/or recently-used criteria. In some embodiments, the first user may be enabled to select only a limited number of elements from a limited set of options based on a first account status (e.g., a limited and/or basic account status). Upon achieving a second account status (e.g., an unlimited and/or premium account status) through payment, activity, and/or other means, the first user may be enabled to select a larger number of rating criteria from a broader set of element options and/or to input custom elements. In some embodiments, specifying and/or selecting a rating criterion may cause a device described herein to assign a name, an icon, an image, a value, and/or another indication associated with the specified and/or selected rating criterion to an interface portion (e.g., element), a button, a text field, slider, and/or any other interface element that may be used by the second user to indicate a like, dislike, and/or other response with respect to the corresponding element of the content.

As used herein, the terms element, instrument, and/or rating criterion may be used interchangeably. An element may refer to and/or include an instrument (e.g., a musical instrument), an instrument may refer to and/or include an element (e.g., a characteristic and/or a section of content), an element may refer to and/or include a rating criterion, a rating criterion may refer to and/or include an element, an instrument may refer to and/or include a rating criterion, a rating criterion may refer to and/or include an instrument, and so on. As such, an instrument, element, and/or a rating criterion may include any musical instrument such as a voice, vocals, spoken word, dialogue, commentary, narration, a guitar, an acoustic guitar, an electric guitar, a lead guitar, a rhythm guitar, a drum, a drum set, an electronic drum set, an acoustic drum set, a cymbal, a gong, a piano, a keyboard, a harpsichord, a synthesizer, a bass guitar, an electric bass guitar, an acoustic bass guitar, an upright bass, a stringed instrument, a woodwind instrument, a brass instrument, a percussion instrument, and/or any other musical instrument. An instrument, element, and/or a rating criterion may also refer to a piece of gear or equipment used to produce the content such as an equalizer, a compressor, a preamplifier, a microphone, converters, wireless microphone units, wireless monitoring units, cables, power amplifiers, monitors, speakers, speaker cabinets, effects units, effects processors, pedals, power supplies, a software application, a plug-in, and/or any other tool used in content production. An instrument, element, and/or a rating criterion may also refer to a microphone placement, a camera placement, a mix of one or more audio tracks and/or video files, an arrangement, and/or any other content production technique. An instrument, element, and/or a rating criterion may also include and/or refer to a content section, dynamics, a tempo, a beat, a feel, a groove, a pace, an inflection, a vibe, lyrics, dialogue, effects, a pitch, sharp, flat, a rhythm, a harmony, various video characteristics, various image characteristics, various product characteristics and/or aspects, and/or the like. An instrument, element, and/or a rating criterion may also include a song name, an artist name, a director name, an actor name, a studio name, a distributor name, a record label name, a production company name, a genre name, an album name, media content, audio content, video content, a product name, a manufacturer name, and/or the like.

In some embodiments relating to music, multiple instruments may be present, comprised, and/or otherwise featured in an arrangement of a song (e.g., audio content). Each instrument in a song may be associated with one or more audio tracks that are mixed together to create the final song product. As such, a song (e.g., audio content) may comprise one or more audio tracks, where each audio track is associated with one or more instruments. For example, a song may include a music track and a vocal track, where the music track includes one or more performances of musical instruments and/or where the vocal track includes one or more performances of voices (e.g., musical instruments). A song may also include multiple vocal tracks and/or spoken word tracks. In some embodiments, audio content may also include a multitrack audio recording session and/or a project in a digital audio workstation with multiple audio tracks associated with one musical instrument. In some embodiments, audio content may include multiple musical instruments associated with one audio track. In some embodiments, multiple instruments may be included and/or otherwise present in a single audio track. In some embodiments, one instrument may correspond to multiple audio tracks. A song may include audio content and/or vice versa. As used herein, a song may include and/or otherwise refer to any type of content such as audio content, video content, multimedia content, movie content, television content, radio content, streaming content, social media content, advertising content, a live performance, a product, and/or the like and/or vice versa.

In some embodiments, an audio track may include an audio file, an audio file region, a MIDI region, an audio channel, a tape channel, an analog channel, a digital channel, a video file, and/or any other element of a music production project. For example, an audio track may include a recorded performance of a musical instrument in a digital audio workspace application.

In the context of podcasts and/or comedy, elements to be reviewed may include timing, a performance, delivery, projection, pitch, audience response, an accent, a joke, a story, an impersonation, stage presence, eye contact, appearance, style, clothes, accessories, audio quality, a laugh, subject matter, and/or the like. For example, a second user could provide feedback as to which jokes he likes and dislikes and communicate why using the feedback interface.

In the context of video content such as movies, television, videos, and/or the like, a video content file may include audio content that features one or more musical instruments such as a voice. A second user could provide feedback on any aspect of the video content, including whether accompanying music suits the particular video content at various points in time or during different scenes, how music is balanced with dialogue, foley sounds, various special effects, transitions between scenes, set design, cinematography, direction, lens type, focus, camera angle, stunts, the screenplay, dialogue, and/or the like. Generally, content may include multiple tracks and/or files of video content, audio content, and/or other types of multimedia content as well as metadata that identifies particular elements, features, and/or other information associated with the content.

In some embodiments, an image and/or profile of a person, artist, and/or the like may be reviewed. For example, the interactive feedback system described herein may be used in the context of a mobile dating application. When a user of a mobile dating application views another's profile, which may include an image of a person, a name, a description, and/or other personal information, the user may review the profile to determine whether he/she would like to communicate further with that person. As such, the tool described herein may enable the user to provide feedback about what he/she likes and/or dislikes about the other person. For example, the user may be enabled to denote that he/she is attracted to someone's height, age, hobbies and/or the like. Elements to be reviewed may include a name, an age, a location, a description, a caption, an image, appearance, personality, a face, a face shape, a nose, eyes, ears, a chin, hair, hair style, hair color, hair length, skin color, skin clarity, a tattoo, a piercing, body art, an accessory, a body part, a body shape, a hobby, an interest, a skill, a profession, a school, a religion, a race, an ethnicity, a gender, a sexual orientation, income level, and/or the like.

As an illustrative example, consider a mobile dating application in which users are presented with others' dating profiles and either "swipe left" to reject the profile or "swipe right" in hopes of continuing communication. After swiping, the user could, using the interactive feedback system described herein, communicate which elements of the person's dating profile he/she found attractive and/or unattractive. This data could then be presented to the person associated with the dating profile so that he/she could improve his/her odds at attracting a mate.

As another example, consider a sports context. Audience members (whether in person or viewers at home) could use the system described herein to provide feedback on a sports team's performance and/or a player's performance during a live game and/or in response to viewing a recorded game (e.g., football, basketball, baseball, tennis, golf, chess, game shows, e-sports, video games, racing, and/or any other sport or entertainment program). For example, audience members may be polled on various strategy decisions such as play calls, player positions, player substitutions, clock management, roster moves, equipment changes and/or customizations, and/or the like. Audience members may further be enabled to suggest such actions to improve a team's strategy and/or a player's strategy, ultimately involving the audience in the management of a game, a match, a race, and/or any other sporting event. A coach, player, manager, owner, and/or other person associated with a sports team could utilize the system described herein to gain insights on audience preferences of game play, and then take actions in alignment with such audience feedback. The system herein may be enabled to generate one or more recommendations for improving game play based on an analysis of collected audience feedback.

The interface further enables the first user to input and/or select recipients (e.g., one or more second users) to review and provide feedback on the content. Recipients may be denoted by an email address, a username, a name, a phone number, an account, a profile, a device number, an identification number, and/or the like and may be selected from a list of contacts and/or manually inputted. For example, the first user may select a recipient from a list of contacts via the "Select Contacts" 8 button, emails via the "Enter Emails" 9 button, or the like. The application described herein may be configured to access a user's contacts, social media connections, history of recent recipients, and/or the like.

In some embodiments, the first user may create a private party and/or a group of recipients (e.g., second users) that is exclusive to the selected recipients to ensure privacy of the audio content. For example, the system may limit access to audio content that is designated as private and/or assigned to a specific group of listeners by requiring a password to access the audio content, requiring user authentication by data input and/or biometric data, multifactor authentication, encryption and decryption protocols, and/or other security mechanisms. The first user may also select target demographics, locations groups of recipients, and/or specific audiences that are to review the content. In some embodiments, the first user may choose to make the content available to and/or collect feedback from the general public, a random group of recipients, and/or the like. The first user may create a feedback collection session that is open to users only in a certain location (e.g., within a predetermined distance of a reference point, device, GPS coordinates, and/or the like, within a predetermined boundary, within a predetermined country and/or group of countries, within a predetermined city and/or group of cities, within a predetermined room, facility, building, lot, stage, and/or studio, and/or the like).

In some embodiments, the system may require a recipient (e.g., second user) to input some form of authentication such as a key, token, non-fungible token, password, biometric data, an account, and/or another security mechanism in order for the second user to access the content and/or information associated with the content. The purpose of requiring authentication may be to maintain privacy of the content while it is still in production and/or to comply with confidentiality requirements in various contracts. In some instances, the system may generate a limited number of keys, tokens, and/or other security mechanisms so that only a specific number of recipients (or only certain users) may access and provide feedback on the content. The system and/or the first user may determine which users may access the content including how many, to whom, and for how long security credentials are distributed and/or valid. Authentication credentials may be limited and/or characterized by a particular time, duration, location, user identity, device identity, and/or the like in which a second user may access the content. As such, authentication credentials may expire after a predetermined period of time following an event such as uploading the content, sending the content to a recipient, receipt by a recipient of the content, and/or any other operation described herein. Authentication credentials may be stored on a user device, a server, a local computing network, and/or a cloud computing network, and/or in a browser, a blockchain, a decentralized digital ledger, and/or any other type of distributed computing network.

As an additional security measure, the system may watermark content using any technique known in the field, including using hash functions and/or Fourier transforms. In some embodiments, the system may encrypt content and/or any information associated with the content (e.g., feedback, transformed feedback, metadata, and/or the like). In some embodiments, the system may augment content with one or more musical elements, metadata, elements of content, identifiers, and/or other information for purposes of tracking, identifying, securing, and/or specifying the contents of the content, and/or for any other reason. Each of these security measures may be applied by the system in a manner that is specific to individual users. For example, each recipient authorized to access the content may receive a different watermarked copy of the content. As another example, the system may utilize a first protocol to encrypt the content when it is sent to a first recipient whereas the system may utilize a second protocol to encrypt the content when it is sent to a second recipient. The purpose of these security measures may be to trace and/or track each instance of the content that is accessible by users so that if the content is ever shared with a non-authorized user and/or otherwise accessed in an unauthorized manner, the system can identify which user shared and/or accessed the content in an unauthorized manner and take action to secure the content and/or information associated with the content. Any data and/or piece of information contemplated herein may be encrypted, watermarked, modified, appended, and/or otherwise transformed by the system.

A "Comments/Instructions" 10 box may enable the first user to provide exact instructions for providing feedback on the content. For example, the first user may be enabled to input text, emoticons, notes, directions, instructions, comments, messages, and/or the like for the benefit of the recipients completing the feedback process. The inputted message may be accessible to the general public and/or accessible only to a private predetermined party (e.g., recipients only). The first user may further be enabled by the system to specify various other parameters of the feedback collection session. For example, the first user may set predetermined Times and/or Dates 13 during which the content may be accessed by users and/or during which feedback on the content may be provided by users. After expiration of such set times and/or dates, the system may prevent users from reviewing the content and/or providing any more feedback on the content.

In some embodiments, the first user may specify and/or select a portion, a section, and/or a subpart of content to be reviewed. For example, the first user may desire to have a group of second users review only the introduction and/or chorus of a song. The system described herein may enable the first user to select a range of content, a duration of content, a collection of content, a section of content, a portion of content, and/or the like to be reviewed, uploaded, and/or otherwise accessed by others. The system may be configured to automatically splice content according to the selected parameters. The system may also be configured to create a new content file based on the original content according to the selected parameters (e.g., create a new audio file that is only thirty seconds long from an audio file that is originally two minutes long).

When the first user is finished specifying the parameters of the feedback collection session, the first user may select the "Upload & Send" 11 button. When the user selects the "Upload & Send" 11 button, a selected file associated with the content (e.g., a media file, an audio file, metadata, and/or the like) may be transmitted from a user device associated with the first user to a server, a database, and/or the like associated with the interactive music feedback system described herein. In some embodiments, the system may automatically create a database entry, enter into a database any information associated with the content file (e.g., bibliographic information, review instructions, identifiers of elements to be reviewed, metadata, recipients, authentication credentials, and/or the like), and/or save such information as well as the content file. In some embodiments, if the media content is already hosted online and a link to a the media content was provided, the system may store the provided URL, reference, and/or other pointer in lieu of storing the content file itself. The system may also create database entries for feedback associated with the content and/or partition a predetermined amount of computing resources for receiving and/or storing the same. Database entries for the content file, information associated with the content file, and/or feedback (including information associated with a user and/or an element of the content) may be associated with (e.g., connected to, referenced by, linked to, accessible by, and/or the like) one or more of each other in the database.

In some embodiments, the first user may not wish to upload the content to the online platform for various reasons. Accordingly, the first user may create a feedback session using the interface shown in FIG. 1 generally in the same manner described above without selecting and/or uploading any content file. The first user may still be enabled to enter information associated with the content, select rating criteria, select recipients, specify parameters, and/or input comments and/or instructions for providing feedback on content. In instances when the first user does not wish to upload any content, upon the first user's selection of the Upload & Send 11 button, the system may still store any inputted information associated with the content and/or create database entries for the same, including entries for anticipated feedback as described above.

In some embodiments, the system may transmit one or more instances of the content, a link to the content, a message and/or instructions, and/or a feedback interface to a user device (mobile device, computer, laptop, tablet, and/or the like) associated with each selected recipient (e.g., second user, audience member, focus group participant, and/or the like). In some embodiments, these items may be delivered via an internal messaging system native to the application associated with the interactive music feedback system. In some embodiments, these items may be delivered via email, a text message, a social media post, an SMS message, a notification, a music streaming application, a media content platform, and/or any other method or platform of communication. In some embodiments, the online platform and/or system described herein may be integrated with various content streaming platforms. In some embodiments, only a feedback interface may be transmitted and/or otherwise made accessible by the user to various second users.

For example, the system may transmit a message (e.g., a notification, alert, email, text message, and/or the like) to designated recipients (e.g., second users). The message may include the content, means for consuming the content (e.g., a video player, a music player, an image or photograph, various control interfaces for the same, a link to a web page on which content is hosted and/or presented, social media platforms, streaming platforms, virtual reality platforms, augmented reality platforms, and/or the like), and/or means for reviewing and/or providing feedback on the content (e.g., a feedback interface, and/or the like). In some embodiments, the content that is to be reviewed by the second user and/or the content player may be embedded in the message, and/or vice versa. Additionally and/or alternatively, the message may include a link to the content, a user interface that enables the second user to provide feedback in regards to the content, and/or any information associated with the content (e.g., a list of included rating criteria, comments, instructions, and/or the like). As described in more detail below, the message may be transmitted via any communication network such as the Internet, a radio network, a Bluetooth network, a fiber optic network, a wireless network, and/or the like. This transmittal process may also be accomplished in other ways, such as utilizing an attachment button and/or a send button in an email application and/or integrating with a messaging system, a website, a social media network, a music streaming platform, a radio station, and/or the like.

As described in more detail herein, a second user (e.g., a recipient) may receive the content and/or a feedback interface that enables the second user to review (e.g., view, listen to, look at, feel, touch, watch, critique, review, consume, and/or otherwise interact with) the content and/or provide feedback on the content. More specifically, the content, feedback interface, and/or accompanying information may be received at a user device of one or more second users. The message (e.g., the media content, feedback interface, accompanying information, and/or an invitation to review the content) may be accessible by a second user (and/or other recipients) on a mobile device, a tablet, a laptop computer, a desktop computer, a wearable computing device, a biometric device, a radio, a smartphone, a headset, glasses, a screen, a display, and/or another device.

Once the content and/or the feedback interface is received on the second user's user device, the second user may experience (e.g., consume, watch, listen, look, examine, feel, touch, taste, and/or the like) and/or review the content. In some embodiments, the content may be consumed by the second user via an interface that includes a media player. For example, the interface may include at least one of (and/or a combination of) a video player, a music player, a media player, a photograph, a picture, an image, an icon, text, comments, instructions, a description, information associated with the content, a list and/or array of selectable rating criteria, various input means for providing feedback (e.g., a slider, a button, a text field, a selection menu, selectable fields, a gesture pad or area, and/or the like), and/or the like. The interface (including the feedback interface contemplated herein) may integrate with a third party content provider platform as well, such as a music streaming platform or video streaming platform. In some embodiments, the content may be comprised and/or embedded in the feedback interface. In some embodiments, information associated with the content, a watermark, identifying information, and/or an advertisement may be embedded within the content itself and/or another element of the interface. In some embodiments, second users may simply follow a hyperlink to a website that hosts the content in order to review the content. In some embodiments, the feedback interface may overlay a webpage that posts the content.

In instances in which no content is uploaded to the system before feedback is solicited, the system may present a feedback interface without content included therein to second users. For example, in the context of a live music performance, the first user may set up a session for collecting audience feedback prior to the performance as described with reference to FIG. 1. Once the session is set up by the first user, the system may distribute and/or otherwise make available to audience members via their smartphones and/or other devices a feedback interface that enables such audience members to provide feedback on the live music performance in real time. The feedback interface sent to such audience members may also include various information associated with the live performance and/or other content as described herein, as well as means for interacting with content (such as in an augmented reality and/or virtual reality context).

FIG. 2 illustrates an exemplary user interface for a Home Page of the system described herein. This Home Page may be presented to the second user upon logging into an online portal, opening an application, receiving the feedback interface, and/or the like associated with the interactive content feedback system. The Home Page may enable the first user and/or the second user to listen, share, and/or interact with the content. Information 5 associated with the content may be displayed in a banner 12. Selecting the banner 12 may display a more detailed report of an artist profile. As used herein, an artist may refer to a first user, a second user, and/or the like. A search bar 13 may enable the first user and/or the second user to quickly find content, an artist, a user, information associated with the same, and/or the like. Player controls 14 may provide the first user and/or the second user with control over which content. For example, player controls 14 may enable a user to play, pause, start, stop, rewind, seek, skip forward, skip backward, shuffle, repeat, next, previous, random, move to another page and/or other content, and/or the like. In some embodiments, the player controls may include a rewind button so that after the second user inputs feedback on the feedback interface, the second user can rewind a predetermined amount of time to replay a portion of the content. This way the second user may re-review and/or otherwise not miss any portion of the content.

In some embodiments, the player controls may also include means (e.g., interfaces, menus, controls, and/or the like) for interacting with content. For example, the player controls may enable a user to overlay visual content on video and/or live performances, purchase content displayed within content, purchase items featured in content, select features and/or accessories in content, and/or take any other action with respect to the content. This may be particularly useful in a virtual reality and/or augmented reality context.

In embodiments where content is not transmitted to second users and/or otherwise not presented to second users through the system described herein, the second users may not be enabled to control playback of content. For example, during a live music performance, a second user may not be enabled to control when the performing artist begins, stops, and/or ends a performance. Still, the system described herein may enable second users to provide feedback on content that is not provided through the system and/or content that second users cannot otherwise control playback of.

To ensure that the feedback provided by second users during the playback of content when the content is not controllable by second users (e.g., during a live performance, during review of physical content, during a focus group presentation whereby a focus group administrator controls playback of content for all focus group participants, and/or the like) is properly aligned in time, the first user may be enabled to add one or more markers that indicate specific points in time (see, for example, marker 1063 in FIG. 10E). For example, the first user may initially create a session for collecting feedback on a live music performance using an interface similar to that described with respect to FIG. 1. The first user may specify that the time during which feedback from the audience may be provided opens five minutes before the performing artist takes the stage (and/or any other predetermined length of time before and/or after play of content). When the performing artist takes the stage, the first user may select a button on a session management interface of his user device to create one or more markers of various points in time. For example, the first user may create a marker via the session management interface that indicates the point in time in the feedback collection session at which the live music performance started. The first user may similarly use the system to create markers to indicate the start of each new song during the live music performance. Markers may also indicate section breaks of content such as song sections (e.g., verse, chorus, and/or the like), transitions and/or breaks between scenes in visual content, and/or the like. Markers may also be utilized more generally in that they may enable the first user to input notes of any format during the feedback collection session. As described in more detail herein, these markers may be presented on a display of feedback, may be modified by the first user, and/or may be used by the first user to align feedback entries with the appropriate sections of the content being reviewed.

The first user and/or the second user may also be enabled to add the content to a playlist, an album, a favorites folder or list, and/or the like via the "Add" 15 button. The first user and/or the second user may rate the content by selecting the "Rate" 16 button. The first user and/or the second user may share the content on a social networking site, a text message, an email, an SMS message, an internal messaging system, and/or any other communication method via the "Share" 17 button. The first user and/or the second user may learn more information about the content by selecting the "Info" 18 button. For example, the information 5 associated with the content may be displayed upon selection of the "Info" 8 button. A seek bar 19, a shuffle feature 20, and/or a loop feature 21 may provide the first user and/or the second user with further control of their listening experiences. An album art image 22 may also be displayed. Selecting the album art image 22 may enable a zooming feature to view the album artwork image up close. The album art image 22 may also comprise a display for displaying video content, other images, and/or any other type of content to be reviewed. Paid advertisements 23 and/or random advertisements 24 may be featured throughout the interfaces. The first user may be enabled to purchase and/or manage advertising spots, features, and/or the like throughout the application.

Selecting the "Rate" 16 button may present a feedback interface to the user as seen in FIG. 3, FIGS. 10A-10D, and/or in another configuration. For example, while the content is playing, the second user may select the "Rate" 16 button from the Home Page to make note of what he likes or dislikes about the content. When the "Rate" 16 button is selected as depicted in FIG. 3, the system may determine, indicate, take note of and/or store the point in time at which the "Rate" 16 button was selected with a timestamp, a date, a time, a duration, a number of samples from the beginning of the content, and/or the like. Keeping track of the time at which the "Rate" 16 button was selected may enable the system to inform the first user exactly when an element of the content caught the second user's attention during playback of the content such that the second user experienced some sort of emotional response (e.g., a positive, negative, or neutral emotional response). In some embodiments, the point in time may be identified using an API and/or another data reference associated with a content player. Specifically, the system may identify an elapsed time, a time remaining, a current time, a clock time, a counter, and/or another value to determine at which point in time the second user intended to indicate a like, a dislike, and/or any other response to the content (and/or an element of the content). The system may identify and/or process one or more values to determine and/or calculate the point in time at which feedback is received with reference to playback of the content, a marker created by the first user, and/or another reference point associated with the content. In some embodiments, the point in time associated with provision of feedback on content may relate to a time at which a user took an action, a time at which user input was collected and/or received by a device, and/or a time associated with any other action contemplated herein.

In some embodiments, the "Rate" 16 button may be integrated into a media player in another fashion. For example, as depicted in FIG. 10D, the "Rate" 16 button may include and/or embody a "thumbs up" button and/or a "thumbs down" button featured in a streaming platform interface. In some embodiments, one or more "Rate" 16 buttons may be integrated into a third-party media player, such as an audio streaming application, a video content platform, a video streaming platform, a social media platform, a virtual reality platform, an augmented reality platform, an online dating application, and/or the like. In some embodiments, the second user may not need to select any button to access a feedback interface. Instead, the system may automatically provide users with a feedback interface such as those provided in FIGS. 10A-10D upon initiation of an application, clicking on a link, presentation of a web page, the setting up of a feedback collection session by the first user, the initiation of playback of the content, the opening or start of a feedback collection session, and/or any other operation described herein. The feedback interface may include any combination of interface elements described herein and may be customizable and/or selectable by each user.

As the second user reviews the content, he may be enabled to provide feedback on the content via the feedback interface. In some embodiments, the second user may respond to questions, comments, and/or instructions provided by the first user and/or presented on the feedback interface. In some embodiments, the second user may respond to the rating criteria designated by the first user and/or review certain elements of the content. As an example, the second user may listen to a song, either through a media player associated with the system or played live outside the system, and use the feedback interface to indicate what he likes, dislikes, and/or otherwise notices about the song, such as a musical instrument featured in the song and/or another element of the song. The second user may interact with a variety of input means, including but not limited to a text field, an input slider, a button, a tab, a color selection, an emoticon selection, a selection menu, a camera, a microphone, a biometric input, a gesture detection area, a touchscreen, and/or the like. In some embodiments, the second user may be enabled to create and/or respond using custom rating criteria, and/or otherwise choose his/her own method of communicating his/her opinion about the content.

In some embodiments, the second user may be enabled to rank one or more rating criteria based on the second user's opinion of each rating criterion. For example, the second user may be instructed to rank several instruments in an arrangement of a song, or characters in a television series, from favorite to least favorite. This information may communicate to the first user which instrument is most critical to the song's success, which instrument is most like and which instrument is least liked, which instrument needs the least and/or most improvement, which character is most and/or least liked, which character needs more and/or less screen time, and/or the like. In some embodiments, the user may be enabled to input individual rating criteria, select rating criteria from a list, sort rating criteria in a menu, and/or otherwise create a ranked list.

Each rating criterion (e.g., instrument, element, and/or the like) may be associated with one or more portions of the feedback interface. For example, a portion and/or element of the feedback interface may include a button, a slider, an interface portion in which gestures such as taps, slides, swipes, holds, flicks, drags, zooms, swims, drawings, and/or other gestures may be identified, and/or the like. In some embodiments, an interface portion may include a selectable portion in the sense that upon selection of an interface portion (e.g., selection of a button, a drag of a button, a hold of a button, a hold and/or drag of a slider to a particular location on the interface, a flick of a slider, a selection of a portion of a screen or pad, a gesture, and/or the like), an action is initiated and/or recorded by the application. Any action contemplated herein may correspond to selection of any interface portion. Each interface portion of the feedback interface may be associated with one or more rating criteria. Multiple interface portions may be associated with the same rating criterion and/or interface portions may be associated with different rating criteria. Interface portions may be included on the feedback interface, a third party media player, a dating application, a social media application, a video streaming application, a music streaming control bar, pop-up windows, menus, and/or any other user interface. One or more interface portions may be included in any other interface portion. In some embodiments, an interface portion may include and/or otherwise refer to an instrument button. Similarly, an instrument button may include and/or otherwise refer to an interface portion.

As seen in the drawings, the interface portions of the feedback interface may be arranged in any manner on the feedback interface. In some embodiments, interface portions may be arranged as an array of selectable icons, buttons, sliders, text, images, regions of a screen, and/or the like. In some embodiments, interface portions may be arranged as an list of selectable icons, buttons, sliders, text, images, regions, and/or the like. For example, a menu displaying various options for responses to the content may include one or more interface portions, where each interface portion corresponds to an option for providing feedback, purchasing items and/or content, interacting with content, and/or the like. These options may be selected using a variety of input means, such as clicking using a pointer and/or a mouse, selecting using a controller, selecting, tapping, gesturing on a touchscreen, gesturing in front of a camera, biometric scans, movements, and/or readings, and/or the like.

The second user may be enabled to input different types of information. For example, the second user may be enabled to input text or comments associated with the content as a whole and/or a specific rating criterion. In some embodiments, the second user may be enabled to select a color. In some embodiments, the second user may be enabled to select a numerical value associated with the content as a whole and/or a specific rating criterion. In some embodiments, the second user may be enabled to input and/or select emoticons. In some embodiments, the second user may be enabled to select one or more interface portions associated with rating criteria to indicate whether he/she likes and/or dislikes a specific element of the content. In some embodiments, the user may be enabled to make gestures in front of a camera, including involuntary facial gestures, wherein the camera and/or the system is configured detect, identify, and/or otherwise process the user's gestures made in response to viewing, listening, and/or otherwise reviewing the content.

The inputted text or comments may provide information to the first user of what exactly the second user likes, dislikes, and/or otherwise thinks about the content as a whole and/or with respect to a specific rating criterion. The system may be configured to analyze inputted text and/or comments provided by second users to identify, extract, and/or process keywords that are associated with particular positive, negative, and/or neutral emotions. For example, if a second user inputs "AWESOME!!," then the system may determine that the inputted comment is positive. The system may compare inputted text to a database of keywords predetermined as positive, negative, and/or neutral to determine if the inputted text is positive, negative, and/or neutral. The system may determine whether the inputted text is positive, negative, and/or neutral based on determining a match between the inputted text and the stored keywords. A positive, negative, and/or neutral determination may respectively correlate to a numerical value. For example, a positive determination may equate to +1, a negative determination may equate to −1, a neutral determination may equate to 0, and/or the like. These determined numerical values may be inputted into an algorithm responsible for generating a unique rating score for the work of art as a whole and/or for a specific rating criterion. The first user, the second user, and/or another user (e.g., an administrator) may be enabled to add, delete, or modify the list of keywords in the database. Additionally, the system may automatically determine, based on context clues in text comments and/or other inputs provided by second users, whether a word is positive, negative, and/or neutral. The system may utilize one or more machine learning techniques and/or trainings to accomplish this. The system may further determine an intensity of text. For example, a user input of "AWESOME!!" in all capital letters and with exclamation points may indicate that the user really liked a particular aspect of the content, as opposed to only mildly liking the particular aspect of the content. As such, the system may determine and/or otherwise apply a weighting value that is to be considered when processing the user input. For example, a user input of "AWESOME!!" may be determined by the system to be a positive value such as +3, with +1 for the term "awesome", +1 for all capital letters, and +1 for explanation points. Any combination of factors may be considered when determining a weight value for user input.

A selected color may be associated with an emotion felt by the second user and/or evoked by the content. The second user may select the color via a color wheel, a color palette, a color slider, a selection menu, and/or via other selection means. The system may determine one or more numerical values (red, green, and blue (RGB) values, cyan, yellow, magenta, and black values, a hexadecimal, a hue, saturation, or the like) corresponding to the selected color. For example, a teal blue color may correspond to R-62, G-200, and B-228. These determined numerical values may be inputted into an algorithm responsible for generating a unique rating score for the content as a whole and/or for a specific rating criterion. The system may utilize one or more reference tables comprising one or more numerical values to determine numerical values associated with various colors.

A selected numerical value may communicate how much and/or what extent a second user likes and/or dislikes a work of art as a whole and/or with respect to a specific rating criterion. The numerical value may be selected via an input slider with a range of 1-10, inputted as text, selected as a button, and/or via any other selection means. For example, if the second user strongly likes the content as a whole, then he may select 10, whereas another second user that dislikes the content as a whole then she may select a 1. The scale may be configurable by the first user, the second user, and/or another user (e.g., an administrator). The selected numerical value may be inputted into an algorithm responsible for generating a unique rating score for the content as a whole and/or for a specific rating criterion.

The selected emoticon (e.g., a smiley face, an icon, an image, an emotion, an emoji, and/or the like) may be associated with an emotion felt by the second user and/or evoked by the content. The second user may select the emoticon via a selection menu and/or via other input means. The system may be configured to analyze the inputted emoticon to identify, extract, and/or process emoticons that are associated with particular positive, negative, and/or neutral emotions. For example, if the second user inputs a smiley face "☺" then the system may determine that the inputted emoticon is positive. The system may compare inputted emoticon to a database of emoticon predetermined as positive, negative, and/or neutral to determine whether the inputted emoticon is positive, negative, and/or neutral. The system may determine whether the inputted emoticon is positive, negative, and/or neutral based on determining a match between the inputted emoticon and the stored emoticon. A positive, negative, and/or neutral determination may respectively correlate to a numerical value. For example, a positive determination may equate to +1, a negative determination may equate to -1, a neutral determination may equate to 0, and/or the like. These determined numerical values may be inputted into an algorithm responsible for generating a unique rating score for the content as a whole and/or for a specific rating criterion. The first user, the second user, and/or another user (e.g., an administrator) may be enabled to add, delete, or modify the list of emoticon in the database. Additionally, the system may automatically determine, based on context clues in text comments and/or other inputs provided by second users, whether an emoticon is positive, negative, and/or neutral. The system may utilize one or more machine learning techniques and/or trainings to accomplish this.

FIG. 3 illustrates an exemplary user interface for providing feedback using the response system. The exemplary user interface depicted in FIG. 3 may be transmitted to the second user's device when he selects the "Rate" 16 button from the Home Page. In some embodiments, another interface may be used by the second user, perhaps as described with respect to FIGS. 10A through 10D. In some embodiments, the feedback interface for rating the content may be embedded in an email, on a webpage, in a social media platform, in a media player, in a streaming platform, and/or the like. In some embodiments, the second user may not utilize the "Rate" 16 button to evaluate an aspect of the content. Again, the feedback interface may be presented to the second user in a variety of ways.

When rating the content, the second user may select a rating criterion that he wishes to evaluate by selecting the "Rating Criterion" 25 button. The rating criterion may include an element, an instrument, a rating criterion, a mix, an aspect of the content, a custom rating criterion, an aspect of the content, and/or the like. The rating criteria may be selected from a list or a menu of icons, text, images, and/or the like. In some embodiments, the second user may create his own rating criterion that he wishes to evaluate. In some embodiments, the second user may input text to define a custom rating criterion. The user may learn more about the selected rating criterion and/or its associated rating scale by selecting the "i" 26 button. To be sure, rating criteria may be presented to the second user in a variety of ways on the feedback interface and is not limited to selection from a drop-down menu. In some embodiments, the pop-up menu featuring selectable rating criteria may be presented to the second user in response to the user sliding a slider, selecting an interface portion, performing a gesture on the display of the second user's user device, performing a physical gesture that is identified by one or more input devices of a user device, and/or performing any other action described herein.

Once a rating criterion is selected and/or inputted, the second user may select a rating score to associate with the selected rating criterion. The rating score may be selected using a rating slider 27, a text entry field, a menu, a list, and/or the like. The rating slider 27 may define a scale determined by the rating criterion and/or disclosed via the "i" 26 button.

For example, the scale of the rating slider 27 may include a range of at least one numerical value, qualitative value, and/or the like. The scale may operate along a numerical value range from 0 to 10. From this scale and using the rating slider 27, the second user may select a rating score of 7.8, for example, because he liked the selected rating criterion (e.g., an instrument) at a specific point in time. The system may automatically associate the selected rating score with the selected rating criterion in a database. The purpose of the rating score may be to quantify how much the second user likes and/or dislikes a certain aspect of the content. Upon selection of a numerical value using the slider 27, the system may identify and/or determine a timestamp and/or a time at which the numerical value is selected. This may help indicate, for example, that a particular instrument is liked at a specific point during playback of a song. A value selected using the slider 27 and/or received via other means may be used to weight user input.

The second user may also associate a color with the rating criterion via a color slider 28. Associating a color with an aspect of the content and/or the content as a whole may help the second user express how the content makes him feel at a specific point in time. The first user in turn may receive this information and thus be able to determine a second user's emotional response that is elicited by the content. Upon selection of a color using the slider 28, the system may identify and/or determine a timestamp and/or a time at which the color is selected. This may help indicate, for example, that a particular instrument invokes a feeling associated with the selected color at a specific point during playback of a song.

Each color determined by the color slider 28 may correspond to at least one RGB (red-green-blue) value, CMYK (cyan-magenta-yellow-black) value, and/or one or more similar color values. The at least one RGB or CMYK value may be associated with a numerical value, determined in some embodiments using one or more reference tables. For example, the color red's RGB value may be 255, 0, 0 respectively. Another example may be teal's CMYK value of 100, 0, 0, 50 respectively. In other embodiments, color values may be associated with a HEX number, HTML, CSS, similar computer languages, and/or the like. Additionally, the second user may also input notes via the "Notes" 29 button. The second user's notes may be text, a keyword, an image, an emoticon, and/or the like. In some embodiments, the second user may input a custom rating criterion.

In some embodiments, the system may store submitted feedback (e.g., user input) that a second user submits via the feedback interface. The feedback interface may also include a "Last", "Recent", and/or "Same" button that enables the second user to quickly input the same user input and/or feedback that was previously inputted.

When a second user is finished evaluating the content, he may select the "Done" 30 button. Selecting the "Done" 30 button may enable the system to transmit the information associated with the second user's opinion (a rating criterion selection, a rating score, at least one color value, an emoticon, text, notes, and/or the like) from the second user's device to the system's server, a database, or the like. The second user may be rewarded with a virtual currency, points, and/or the like for submitting his opinion via the response system and/or for performing any other operation described herein. In some embodiments, the virtual currency may be a cryptocurrency, a token, a non-fungible token, and/or any other type of credit that is stored on a blockchain and/or distributed computing network.

FIG. 10A is an exemplary feedback interface 1000 displayed to second users. The interface 1000 may enable a user 1002 (e.g., a first user and/or a second user) to provide feedback on the content using a user device 1004. In some embodiments, the interface 1000 may include a menu button 1006, display information 1008 associated with the content and/or other information such as a time 1010, a duration of the content, and/or the like. The user may be enabled to share 1012 the content with others on a variety of platforms, such as email, text messaging, SMS messaging, Bluetooth, an internal messaging system, a social media network, a content streaming platform, and/or the like. Player controls 1014 may enable the user to control the playback of the content as mentioned above. Button 1016 may represent a "Rate" button as mentioned above.

Upon selection of the button 1016, buttons associated with one or more instruments 1018, 1020, 1022, 1024 (e.g., rating criterion, elements, and/or the like) may appear on the feedback interface 1000. In some embodiments, a button and/or selectable portion of an interface may refer to and/or include an instrument button, and/or vice versa. In some embodiments, the user may simply click and hold down (e.g., engage) the button 1016 to cause the one or more instruments, options of rating criteria and/or elements, and/or other means for selecting the same to appear. For example, the options of instruments and/or the like may appear as a pop-up menu on the feedback interface 1000. Releasing and/or disengaging the button 1016 may cause the pop-up menu of options to disappear. Releasing and/or disengaging the button 1016 may cause the pop-up menu of options to remain visible and/or accessible to the user. In some embodiments, engaging the button 1016 may include touching a portion of a touchscreen, touching and holding a portion of a touchscreen, performing a gesture on a portion of a touchscreen, swiping on a touchscreen, sliding on a touchscreen, dragging on a touchscreen, tapping on a touchscreen, clicking, clicking and holding, dragging using a mouse, tapping, tapping and holding, pressing, selecting, and/or the like. In some embodiments, a pop-up menu displaying options of selectable instruments may be voice-activated and/or gesture activated (e.g., by facial gesture, a body movement, a voice command, a biometric reading, and/or the like) as recognized by a microphone, a camera, a sensor, a biometric scanner, and/or other input receivers of the user device 1004.

Each instrument button 1018, 1020, 1022, 1024 may be represented by a button, selectable portion, interface portion, a slider, a touchscreen, a wheel, a menu, and/or any other input means on the feedback interface. For example, a first button 1018 may be associated with a first instrument (e.g., a guitar), whereas a second button 1020 may be associated with a second instrument (e.g., drums). Selecting a portion of the interface associated with an instrument (e.g., button 1018) may communicate that the second user likes and/or dislikes that particular instrument in the content. For example, if the second user is listening to a song and likes the guitar, he may select the button on the feedback interface that represents the guitar to denote the same. The system may automatically identify and/or determine at which point in time during playback of the content that the user selected the button. In some embodiments, the system may utilize an API of a third-party media player, music streaming platform, a video streaming platform, a virtual reality platform, an augmented reality platform, a content distribution platform, and/or otherwise reference a value to identify a point in time in the content at which a user selection was made. In this manner, a timestamp may be assigned to a selection of an instrument and/or selection of a feedback button.

In some embodiments, a timestamp (e.g., a time value, a sample number, and/or any other value) generally may be associated with a point in time at which a user provides user input. The specific point in time at which user input is provided may vary depending on the feedback interface used and/or method of providing user input. In some embodiments, a time value associated with a provision of user input may be associated with a selection of a selectable portion of a user interface, an opening of a user interface and/or menu, a presentation of an interface and/or interface portion, a movement of an interface portion, a gesture performed on a user interface, a biometric movement such as an eye movement, detection of a biometric movement and/or other data point by a sensor, camera, microphone, and/or other device, a submission of user input via a feedback interface, receipt of user input via a user interface, and/or any other operation described herein. Accordingly, a time value associated with selection of selectable portion of a user interface may refer to a time at which any operation and/or action related to the provision of user input is performed. The system may be enabled to retrieve, determine, track, store, and/or process a time value for any operation and/or action described herein. A time value associated with the provision of user input may refer to a time at which user input is received and/or a time before user input is received.

FIG. 10B illustrates an exemplary feedback interface 1026 that utilizes another type of selection means for enabling a second user to indicate whether he/she likes and/or dislikes various elements (e.g., instruments) of and/or featured in the content. More particularly, one or more sliders 1028, 1030, 1032, 1034 may be used to indicate whether a second user likes and/or dislikes an element (e.g., instrument) of the content. Each slider 1028, 1030, 1032, 1034 may be associated with a different instrument in an arrangement of the content, element of the content, and/or the like. As the song plays, the second user may slide one or more sliders 1028, 1030, 1032, 1034 in a first direction (e.g., up, to the right, and/or the like) to indicate that he/she likes a corresponding instrument at a particular point in time. Similarly, the second user may slide one or more sliders 1028, 1030, 1032, 1034 in a second direction (e.g., down, to the left, and/or the like) to indicate that he/she dislikes a corresponding instrument at a particular point in time. The sliders 1028, 1030, 1032, 1034 may be oriented vertically (including substantially vertically), horizontally (including substantially horizontally), and/or in another configuration on the feedback interface 1026.

In some embodiments, a selection of an instrument may be made using the sliders 1028, 1030, 1032, 1034. Making a selection may include moving a first portion (e.g., fader, head, finger rest, and/or the like) of a slider from a first location on the interface to a second location on the interface. In some embodiments, moving the first portion of a slider may include clicking, touching, dragging, holding dragging, swiping, flicking, and/or performing another gesture. This means of selection similarly applies to buttons, portions of a screen, and/or any other selection mechanism contemplated herein.

Alternatively, the feedback interface 1026 may include only one slide slider 1028 that is used to indicate a like and/or dislike. Sliding the slider 1028 up may indicate that the second user likes an element of the content, whereas, sliding the slider 1028 up may indicate that the second user likes an element of the content. Holding down a portion of the slider 1028 (as opposed to sliding it up or down) may indicate that the second user feels neutral about an element of the content. In response to the second user sliding up, sliding down, and/or holding down a portion of the slider 1028, a pop-up menu may be presented to the second user that enables the second user to indicate which element of the content he likes, dislikes, and/or feels neutral about via a variety of input means described herein. The user may also be enabled to provide any other type of user input via such pop-up menu.

FIG. 10C illustrates an exemplary feedback interface 1036 that utilizes another type of selection means for enabling a second user to indicate whether he/she likes and/or dislikes an element (e.g., instrument) of the content. More particularly, a pair of buttons 1038, 1040, 1042, 1044 may be used to indicate whether a second user likes and/or dislikes an element (e.g., instrument) of the content. Each pair of buttons 1038, 1040, 1042, 1044 may be associated with a different instrument in an arrangement of the content, element of the content, and/or the like. Each pair of buttons 1038, 1040, 1042, 1044 may also include a third button that enables the second user to indicate a neutral emotion. As the song plays, the second user may select one or more buttons 1038, 1040, 1042, 1044 in a first direction (e.g., an up arrow button, a right arrow button, and/or the like) to indicate that he/she likes a corresponding instrument at a particular point in time. Similarly, the second user may select one or more buttons 1038, 1040, 1042, 1044 in a second direction (e.g., a down arrow button, a left arrow button, and/or the like) to indicate that he/she dislikes a corresponding instrument at a particular point in time. The buttons 1038, 1040, 1042, 1044 may be oriented vertically, horizontally, and/or in another configuration on the feedback interface 1036. Again, a selection may be made by clicking, touching, dragging, tapping, pointing, holding and dragging, swiping, flicking, and/or performing another gesture on the interface.

FIG. 10D illustrates an exemplary feedback interface 1046 that utilizes another type of selection means for enabling a second user to indicate whether he/she likes and/or dislikes an element (e.g., instrument) of the content. More particularly, FIG. 10D illustrates how the interactive music feedback system described herein may integrate with a third-party media player, a music streaming platform, and/or the like. The buttons 1016 of an interface may include thumbs-up and/or thumbs-down buttons. In some embodiments, these thumbs-up and/or thumbs-down buttons may be included in a third-party media player. An example of operation is when the second user determines that he likes something about the song, he first selects the like button 1016 and then selects from a pop-up menu 1048 the instrument 1050, 1052, 1054, 1056 that most closely describes the element or aspect of the song that he likes. As contemplated herein, the user may also be enabled to input comments associated with his selection. The pop-up menu 1048 may be presented to the second user after performing various operations and/or making selections on other interface elements described herein. The pop-up menu 1048 may further include means for selecting a most recent instrument, inputting a custom instrument, and/or include any other feedback interface element described herein.

As used herein, terms relating to directionality such as horizontal, horizontally, vertical, vertically, up, down, left, right, and/or the like include those that are substantially similar. To be clear, horizontal includes substantially horizontal, vertical includes substantially vertical, and so on. Further, any term that refers to characteristics also includes terms that are substantially those characteristics. For example, if the term "blue" may also include things that are "substantially blue".

Traditionally, a thumbs-up button on a media player may be selected by a second user when he likes content. Selecting the thumbs-up button may cause the content to be played more frequently, added to a playlist, added to a list of favorites, kept playing in steady rotation, and/or the like. Conversely, a thumbs-down button may traditionally be selected by a second user when he dislikes content. Selecting the thumbs-down button may cause the content to be played less frequently, removed from a playlist, added to a list of songs not to be played, removed from rotation, and/or the like. In this manner, the thumbs-up and/or thumbs-down buttons may be used by a second user to tailor his playlists, radio experiences, content delivery, and/or the like.

To improve upon this feature, the interactive feedback system described herein may enable the second user to indicate exactly what he likes, dislikes, and/or feels neutral about content rather than simply indicating that he likes and/or dislikes the content on a global level. This ability to provide detailed feedback on content may improve a content creator's and/or a content distributor's ability to tailor playlists, content experiences, content delivery, performances, and/or the like so that content is more relevant to identified preferences.

For example, as described herein, the second user may be presented with a pop-up menu 1048 upon selection of a thumbs-up and/or thumbs-down button. This pop-up menu 1048 may present various options to the second user for providing feedback as to what he likes and/or dislikes about the content. For example, after selecting a thumbs-up button, the second user may wish to indicate that it is this particular content that he likes. As another example, the second user may instead indicate that it is not the content that is preferential, but rather the artist, the album on which the content is featured, and/or the like. Similarly, the second user may indicate that a particular element of the content, such as an instrument, a lyric, a key, a pace, a vibe, and/or any other element of content is enjoyed or disfavored. This information may or may not be timestamped as described herein. Thumbs-up and/or thumbs-down buttons may also include up-arrow and/or down-arrow buttons, a favorite button, a heart button, a like button, a reaction button, a dislike button, a comment button, a menu button, a "more" button, a voting button, a rating button, a rate button, a feedback button, an interaction button, a review button, and/or the like. Each of these terms may refer to one another. Additionally, the term "button" may refer to a variety of interface elements including a tab, a slider, a wheel, an interface portion, a selectable interface portion, a gesture pad, a directional pad, a home button, a side button, a volume button, a power button, a touchscreen portion, a sensor, and/or any other I/O device embodied in hardware and/or software.

Via the pop-up menu 1048, the second user may be enabled to select from a list of options, perhaps including one or more buttons 1050, 1052, 1053, 1056 corresponding to various instruments associated with, included, and/or featured in the content. Other forms of indicating likes and/or dislikes may include the use of sliders, buttons, tabs, gestures, voice commands, text inputs, numerical inputs, color inputs, emoticon inputs, and/or any other method. One or more elements, instruments, and/or rating criterion as described above may be selected by the second user.

In some embodiments, the pop-up menu 1048 may be presented to the second user upon clicking and/or touching a thumbs-up and/or thumbs-down button. In some embodiments, the pop-up menu 1048 may be presented to the user upon clicking and holding down a thumbs-up, thumbs-down, and/or other button. In some embodiments, any gesture and/or interaction with a thumbs-up and/or thumbs-down button may activate the pop-up menu 1048. The pop-up menu 1048 may also be activated by a swipe, voice commands, facial gestures, and/or the like. In some embodiments, the pop-up menu 1048 may already be presented to a user such that no user action is required to cause the pop-up menu 1048 to appear.

In some embodiments, the options presented to the second user via the pop-up menu 1048 may include one or more of the following: content title, name, artist, producer, series, director, album, length, genre, time of day, type of event, any instrument, any element, and/or any rating criteria, a repeat feature, a loop feature, any other information associated with the content, an item for purchase, a selectable portion that enables a user to interact with the content, and/or the like. Additionally, in the event that the second user selects a thumbs-down button, the second user may be enabled to select a "not right now" option, a "skip" option, an "inappropriate" option, and/or the like to indicate that he dislikes the content and wants to receive different content and/or stop listening to the content altogether. The second user may also be enabled to create a custom instrument, element, and/or the like upon selection of the thumbs-up and/or thumbs-down buttons. Instead of the content being played less frequently in response to selection of a thumbs-down button as in traditional methods, the interactive content feedback system may simply skip to other content while keeping track of time of day preferences. The interactive music feedback system may, based on information received from these selections, may recommend other content that is more relevant to the second user's preferences at various times of day, better tailor playlists, customize content experiences, ensure efficient and/or relevant content delivery, and/or perform any other action described herein.

Selection of a thumbs-up and/or thumbs-down button, an instrument, element, and/or rating criterion, an option on the pop-up menu 1048, and/or any other input may be assigned a numerical value. This numerical value may be positive, negative, weighted, and/or neutral. The numerical value may be inputted into an algorithm that generates an overall score for the content, a specific rating criterion, and/or the like. Any numerical values received, identified, determined, and/or generated herein may be used, along with any raw inputs received, by the system to determine a next and/or future content for the second user, generate various metrics and analytics to be presented to the first user, recommendations for content, recommendations for improving content, recommendations for purchases, recommendations for interacting with content, and/or the like. In some embodiments, the term "value" may refer to and/or include a numerical value, text, an image, an icon, a reference number, a reference, a pointer, and/or any other indicator. Each of these terms associated with value may refer to one another.

In some embodiments, the system may be configured, using a user device, to track a second user's facial, vocal, and/or bodily expressions, movements, and/or other biometric readings. For example, a microphone of the user device may detect and/or receive voice commands, spoken words, and/or the like produced by the second user, such as "wow, the guitar sounds great!" or "I do not like this chorus." The system may also utilize a camera to track facial movements, facial gestures, hand movements, body movements, eye movements, mouth movements, and/or the like. The system may further be enabled, using a sensor, to obtain a user's heart rate data. By tracking these movements (e.g., blinking, moving one's eyes, a nostril flare, pupil dilation, a frown, a smile, and/or the like), the system may be enabled to identify various human responses to content that the user may not manually input and/or even be aware of. For example, the system may detect a facial movement where a second user's eyebrows raise and lips curl upward. Based on detecting these movements, the system may determine that the user smiled and thus reacted positively to the content at a particular point in time. Vocal, facial, body, biometric, and/or emotional responses may be classified as positive, negative, and/or neutral by the system and/or be used for weighting various other values. Similar to above, these responses may correspond to a numerical value, perhaps stored in one or more databases referenced by the system in identifying and/or transforming user input into manipulatable values. Various facial, vocal, body, biometric, and/or emotional responses may be stored in one or more databases referenced by the system. The system may utilize various artificial intelligence, machine learning, and/or training techniques to identify gestures, movements, biometric readings, responses, and/or the like, amass one or more databases of gestures, movements, biometric readings, responses, and/or the like, and/or assign numerical and/or other values to identified gestures, movements, biometric readings, responses, and/or the like. In some embodiments, the system may record and/or store audio, image, and/or video files of one or more users for reference, analysis, machine learning, identification, authentication, and/or other purposes.

Once a second user inputs and/or submits his response via the feedback interface, inputs may be transmitted to a processing unit of the system for processing. In some embodiments, inputs received at a user device may be transmitted instantaneously (e.g., substantially simultaneously to their receipt at the user device). In some embodiments, inputs received at a user device may be transmitted at predetermined intervals. In some embodiments, inputs received at a user device may be transmitted when playback of a song ends. In some embodiments, inputs received at a user device may be transmitted once an application associated with the feedback interface has been closed and/or a feedback collection session has otherwise been paused, stopped, and/or terminated. In some embodiments, inputs received at a user device may be transmitted once a predetermined amount of input data and/or number of inputs has been received. Inputs received at a user device may be transmitted by one or more of these delivery methods and/or any other data delivery method. The system may process user input, transformed user input, and/or other values associated with user input at a user device, a central location, across a blockchain, and/or in any other method.

The system may be configured to store inputs received from the second user in one or more databases. At least a portion of processing described herein may occur at a user device of the first user, a user device of the second user, a central processing device, a cloud processing device, a blockchain, multiple devices, and/or any other computing device.

In some embodiments, the system's processing of user input may include analyzing raw input data, identifying, generating, and/or determining numerical values based on user input, transforming raw input data into numerical values, and/or the like. In some embodiments, transforming user input may include identifying one or more values for representing the user input and/or the time at which the user input was received. For example, if user input corresponds to a user liking a particular element of content that is being reviewed, the system may identify a positive number value associated with the particular element. Similarly, if user input corresponds to a user disliking a particular element of content that is being reviewed, the system may identify a negative number value associated with the particular element.

In some embodiments, user input and/or transformed user input may be encrypted, encoded, watermarked, and/or otherwise processed. In some embodiments, user input and/or values associated with user input may be inputted into, combined with, and/or otherwise processed using one or more cryptographic hash functions to produce a new value that is generally indecipherable without having a key and/or knowing the hash function used to produce the new value. The system may be enabled to decipher such a value using a particular key and/or other means. The system may utilize unique keys for encoding and/or decoding for each user, each device, each piece of content, times at which user input is received, and/or for any other element of the system described herein. Again, the system's processing of raw user input may occur at a user device where user input is received and/or may occur at another device.

Through analysis of the inputs, the system may be configured to generate a wide variety of metrics associated with the content and/or an audience's opinions of the content. For example, the system may compile multiple users' inputs to produce an overall rating score of content, an average color of an image, a ranked order of rating criterion, a graph of the popularity of responses and/or purchases, an average emotion or emoticon to be associated with the content and/or a specific rating criterion, and/or another metric for an audience as a whole and/or a specific rating criterion. As another example, the system may generate a graph illustrating in time when specific instruments and/or elements of the content are liked and/or disliked, when a user interacted with content, when a made purchases, when a user performed any action and/or responded in any way to content, and/or the like. In this way, the present invention may enable the first user to better understand the preferences of second users (e.g., audience members) who reviewed the content. These metrics may include a system-generated report of results that is made available to the first user, the second user, a group of users, and/or the general public. Indeed, the system may restrict access to results and/or analysis relating to a feedback collection session using one or more security mechanisms described herein.

The system may be configured to generate an overall rating score for a user, the content, and/or an element of the content based on the received inputs. For example, the system may be configured to generate a score using at least one raw input received from at least one second user and/or at least one numerical value associated with raw input received from at least one second user. Upon its generation, a rating score may be associated with and/or assigned to the content, a user, and/or any other piece of information in one or more databases by the system.

The system may further be configured to retrieve, store, track, analyze, and/or process a total number of plays, reviews, responses, a location associated with each user and/or response, and/or a variety of other demographic, profile, and/or other user information. The system may also be configured to retrieve, store, track, analyze, and/or process information associated with any user. Information associated with users may include but is not limited to location information (e.g., a zip code, global positioning system (GPS) coordinates, an IP address, a mailing address, an area code, a hometown, a headquarters, and/or the like), contact information (e.g., an email address, a username, a phone number, a mailing address, a social network profile, and/or the like), demographic information (age, race, religion, gender, and/or the like), user preferences, a user history of activity, a history of purchases, user input, and/or the like. The system may process and/or otherwise utilize this information associated with the users to generate targeted analytics, generate recommendations, and/or perform any other action described herein.

The system may be configured to generate a report that includes a wide array of metrics associated with the feedback retrieved from one or more second users. The report may be accessible by the first user, the second user, a group of users, and/or the general public. The report may also be private, protected by various security means described herein, and/or access restricted by time.

The report may include a system-generated optimized tour route and/or travel schedule using location information associated with one or more users. The report may include demographic information associated with one or more second users. The report may be generated substantially simultaneously to generation of the rating score and/or at a time after generation of the rating score. The report may include any combination of information described herein, user input, transformed user input, and/or any other data associated with the content, one or more users, one or more elements of the content, and/or the like.

The system generally may serve as a tool for enabling the first user to collect and synthesize listener feedback to ultimately identify opportunities to improve the content and/or content delivery. The system may be configured to provide the first user with at least one suggestion and/or recommendation on how to improve the content based on processing the input received from second users. Text, an image, graphs, and/or other information may be presented to the first user with creative recommendations for improving the content, an element of the content, and/or the like. For example, if the content is a song and the song includes some digital clipping, the apparatus may suggest to the first user (e.g., the creator of the content) that they need to rerecord or reprocess the song to achieve a maximum level of audio quality. In some embodiments, a message comprising a recommendation may be generated by the system and/or transmitted to the first user and/or other users. The system may also be configured to determine a level of perceived audio quality based at least in part on input received from second users. In some embodiments, the system may identify trends associated with audience preferences.

FIGS. 4, 10E, and 10F depict exemplary results of the response system. Based on an analysis of the received information associated with the second user's responses (e.g., user input, values associated with user input, and/or processed user input), the system may automatically produce various numerical scores 31 and/or suggestions 32 on how to improve certain aspects of the content as depicted in FIG. 4. The system may also identify which aspects of the content are critical to its overall rating score based on an analysis of user input. The system may also analyze received information and/or inputs to project a probability of commercial success of the content in various demographics, locations, times of year, and/or the like. These suggestions and projections may be transmitted to the first user for viewing and review.

In some embodiments, the system may generate a graph 33 that shows peaks and valleys associated with where the content was liked and/or disliked, and by how much. The height (e.g., amplitude) of each peak, valley, stem, and/or other indicator may correspond with a number of similar responses received, a strength of a response, and/or a weighted value. For example, a peak representing 10 people that liked a guitar performance at point A in a song may be higher than a peak representing 3 people that liked a drum performance at point B. The graphs produced may relate to an overall score for the content and/or specific rating criteria. A drawn line and/or other indication may correspond to a value of the rating score at each point in time, the number of similar responses, the strength of responses, and/or the like. A line color in graph 33 may correspond to a selected color, if any, and/or styles (e.g., colors, shapes, icons, and/or the like) associated with either a user, the content, an instrument or other element of the content, and/or the like. The peaks and valleys may also be negative (e.g., have negative y-coordinates that are displayed below a horizontal x-axis) to indicate dislikes. The values may correspond to user input, raw values, processed user input, and/or other calculations of the system. Neutral responses may be indicated on the x-axis. The x-axis may represent time, duration of the content, duration of the feedback collection session, and/or a portion or a region of the same.

FIG. 4 illustrates that a generated report may also include a map of users' demographic information (a name, a username, an age, a zip code, an email address, and/or the like). An analysis of the at least one second user's demographic information may enable the system to determine an optimal touring route for the first user. Audience demographic information (e.g., of second users) may be sorted, filtered, and/or viewed by the first user. Demographic information may also enable the first user to view feedback from specific demographics in specific locations.

FIG. 10E illustrates an exemplary user interface 1058 displaying results to the first user. In some embodiments, the results may include a graph 1060 of which instruments were liked and/or disliked, including by how much, over a duration of the content and/or feedback collection session. The system may aggregate input received from multiple second users who reviewed the same content to produce a graph 1060. The number of similar responses and/or the weight values associated with responses may correspond to the height of each stem and/or other indication. Each stem (e.g., indication) may represent an instrument, element, individual response, an individual user, a purchase, a user action, and/or the like. The system may identify a best-fitting location, a trend, an average, and/or other summations of input to produce each stem, trend indications 1065, markers 1063, and/or other indications displayed on the graph 1060. In some instances, only a few stems (e.g., indications) may represent a large aggregate of user input data. The first user may also be enabled to sort 1062 various rating criteria so that only certain rating criteria are displayed on the graph 1060. For example, the first user may view aggregated feedback associated with each instrument in the content, aggregated feedback associated with select instruments or select users, aggregated feedback associated with only one instrument and/or one user, and/or any other combination of feedback. The first user may also be enabled to view each individual review, all inputs provided by one user, all raw input submitted by all users, all inputs associated with a particular instrument or other element, all inputs associated with the content, all inputs from users in specific locations, and/or the like. In some embodiments, the system may layer multiple sets of feedback on top of each other, wherein each layer is independently viewable. In sum, the user input, values associated with user input, recommendations, and/or the like may be filterable and/or sortable such that a user may manipulate data and/or subsets of data to analyze what was collected during a feedback collection session.

In some embodiments, the instrument stems in graph 1060 may correspond to sections of a song. For example, the first stem labeled "INST. 1" may correspond to a favorable first verse, whereas the second stem labeled "INST. 2" may correspond to a slightly unfavorable first chorus. In some embodiments, the system may be configured to automatically identify sections of a song based on input data received from second users, a point in time in the song at which input was received, reference to a marker value and/or a marker location, and/or any combination of information contemplated herein. The system may provide a summary indicating which song sections are favored and/or unfavored, most and/or least critical to the song's success, need improvement, and/or the like.

In some embodiments, the instrument stems in graph 1060 may correspond to multiple user responses to a song. For example, the first stem labeled "INST. 1" may correspond to a response of a first user who liked a particular instrument at a first point in time, whereas the second stem labeled "INST. 2" may correspond to a response of a second user who disliked the instrument (or a different instrument) at a second point in time.

In some embodiments, the instrument stems in graph 1060 may correspond to user purchases made during play of content. A value associated with each indication and/or the height (e.g., amplitude) of an indication may correspond to a dollar value associated with a purchase made at a particular point in time during play of content.

In some embodiments, a user may be enabled to seek along the x-axis of the graph 1060, which represents time, duration of the content, and/or duration of a feedback collection session. A user may perform a gesture (e.g., swipe, swim, and/or the like), select a seek button 1061, and/or perform another operation to cause the display of feedback to translate either left or right along the x-axis of the graph 1060. The user may further be enabled to zoom along the x-axis and/or the y-axis of the graph 1060. The user may further be enabled to set endpoints for either the x-axis and/or the y-axis of the graph 1060. In some embodiments, selecting the seek button 1061 may cause the y-axis of the graph 1060 to align with one or more markers 1063 (e.g., the next marker after the current location and/or x-coordinate of the y-axis) and/or may cause displayed feedback to translate along the x-axis of the graph 1060 such that the y-axis of the graph 1060 aligns with a marker 1063. Seeking may cause the system to modify one or more values and/or coordinates of various indications, markers 1063, and/or other displayed items.

In some embodiments, the graph 1060 may also display markers 1063 created and/or imported by the first user during the feedback collection session. Markers 1063 may be vertical lines of a particular style (e.g., dotted, solid, colored, type, shape, and/or the like) and/or any other type of indication and/or section break. Markers 1063 may be used as references for visually identifying sections of the content and/or aligning feedback with sections of the content. In some embodiments, markers 1063 may have different styles than axes of the graph 1060, stems and/or other indications of likes and/or dislikes associated with instruments and/or users, and/or trend indications 1065. A user may seek along the x-axis to align the feedback with one or more markers 1063, references, sections of the content, and/or the like. The user may also seek along the x-axis to align a marker 1063 with the y-axis of the graph 1060. In some embodiments, the system may determine a timestamp and/or other time value of user input based on a time value and/or other reference associated with a marker 1063. A marker 1063 may be associated with one or more values that represent the point in time at which it was created, the point in time associated with a section and/or portion of content, and/or the like. The system may assign each marker 1063 coordinates and/or values based on timing and/or an analysis of content. In some embodiments, the y-axis may represent the beginning of a feedback collection session, the beginning of playback of the content, a marker 1063, and/or another reference.

In some embodiments, the graph 1060 may also include one or more trend indications 1065. Trend indications 1065 may be vertical lines of a particular style (e.g., dotted, solid, colored, type, highlighted, shape, and/or the like) and/or any other type of indication. Trend indications 1065 may also not be represented by a line and may instead take an appropriate form to represent a line of best fit, a most popular element of content, a least popular element of content, a most popular section of content, a least popular section of content, a most popular purchase, a recommendation for improving content, a recommendation for improving an element of content, any other recommendation, and/or a representation of any other information determined by the system described herein. By displaying trend indications 1065 on the graph 1060, the system may enable users to make sense of large amounts of data and/or identify opportunities to improve content and/or an element of content. In some embodiments, each data point, indication, axis, marker 1063, trend indication 1065, and/or other element featured on the graph 1060 may be represented in a unique, different, and/or identifying style.

In some embodiments, the graph 1060 may be viewed alongside a display and/or a presentation of content so that a user reviewing the graph 1060 can watch and/or listen to the content and interpret the data and/or feedback on the graph 1060 as the content plays. The graph 1060 may be configured to scroll in time with playback of content such that indications, markers 1063, trend indications 1065, and/or other elements may translate along the x-axis as content is played.

In some embodiments, a recommendation may be generated by the system using data stored in a database, user input, transformed user input, and/or any other information described herein. In some embodiments, when generating recommendations described herein, the system may reference, access and/or otherwise utilize information associated with user feedback and/or user input collected across one and/or multiple feedback collection sessions. For example, user feedback may be aggregated and accessed by the system to determine recommendations and/or suggestions for amending content, planning tour routes, identifying target audiences, and/or generating any other metric described herein.

In some embodiments, each recommendation described herein may be assigned a value to indicate how strong, weak, useful, applicable, irrelevant, and/or relevant the recommendation is. For example, a recommendation to incorporate a new musical instrument into a song may be assigned, by the system described herein, a value that indicates how much incorporating the musical instrument will improve and/or detract from the song. This value may be supported by one or more projections of commercial success, likeability within a particular audience, and/or the like generated by the system. The system may identify and/or present a number of recommendations that maximizes the likelihood of commercial success, positive reception within an audience and/or audience demographic, a value associated with the content, and/or the like. In some embodiments, a projection may embody a numerical value associated with and/or assigned to the content. This value associated with the content may be based on an analysis of user input, transformed user input, values associated with user input, time values, and/or the like. A user may be enabled to toggle, select, deselect, and/or otherwise interact with recommendations on a display of user feedback to view and/or otherwise understand how each recommendation and/or any combination of recommendations may affect the overall value associated with the content. A user may also be enabled to incorporate such recommendations and/or modifications using the system described herein.

FIG. 10F illustrates another exemplary user interface 1064 displaying results to the first user. Graph 1066 illustrates a popularity chart for each instrument in content. Each bar may be associated with a different instrument. Based on the aggregate of received input from second users, the system may identify which instrument is most popular according to the number of likes and/or dislikes, the strength of likes and/or dislikes, amounts of purchases, and/or any other factors. The first user may also sort 1062 between various instruments, elements, rating criteria, second users, and/or the like to view different layers of data.

Each bar in graph 1066 of FIG. 10F may be associated with a different user. Based on the aggregate of received input from second users, the system may identify, according to the number of likes and/or dislikes, the strength of likes and/or dislikes, and/or any other factors, which user likes the song the most. The height (e.g., amplitude) of each bar in the graph 1066 may correspond to a weight value and/or how much an instrument is liked and/or disliked, a dollar value of a purchase, a number of occurrences of a particular response and/or response type, and/or the like. The bars in graph 1066 may extend both above the x-axis and below the x-axis such that positive y-coordinates represent a like and negative y-coordinates represent a dislike. The bars in graph 1066 may also be oriented horizontally instead of vertically.

In some embodiments, the graph 1066 may be viewed alongside a display and/or presentation of content so that a user reviewing the graph 1066 can watch and/or listen to the content and interpret the feedback on the graph 1066 as the content plays. The graph 1066 may be configured to scroll in time with playback of content such that bars, stems, indications, markers 1063, trend indications 1065, and/or other elements may translate along an x-axis and/or y-axis as content is played. In some embodiments, including any embodiment where data is displayed to a user, bars, stems, indications, markers 1063, trend indications 1065, and/or values associated with the same may change in real time while content plays.

In some embodiments, data contemplated herein may also be visualized in a pie chart as shown in graph 1066. Each portion of the pie chart may correspond to and/or otherwise represent a category of user, an instrument, a popularity rating, a content element, a user action, a purchase, a purchase category, and/or any other piece of information contemplated herein. Each portion of the pie chart may be displayed and/or represented in a particular style to easily distinguish different pieces of information. The pie chart may also be interactive in that a user may be enabled to manipulate and/or adjust portions (e.g., sizes, lines, dividers, markers, indications, trend indications, and/or the like) of the pie chart.

In some embodiments, the system may be enabled to track user input provided by each user for purposes of determining intellectual property rights. For example, in a collaborative content creation session, such as a songwriting session, multiple users may provide feedback on a song. Multiple users may provide feedback that ultimately is incorporated to the final song and/or other content. Accordingly, the system may determine, based on an analysis of user input and/or the final content, which pieces of feedback provided by each user are featured in the final content. The system may then determine and/or assign a percentage of ownership, a percentage of intellectual property rights such as copyrights, publishing rights, and/or any other right to users based on identifying ideas in content that were provided as user input and/or feedback using the system. In some embodiments, the system may be enabled to generate a smart contract, an agreement, a contract, a report, a document, a blockchain item, and/or another record of how ownership, claims of ownership, intellectual property rights, copyrights, royalties, and/or any other rights to content should be distributed among one or more users. In some embodiments, the system may require users to assign intellectual property rights and/or other ownership to another user, such as the user who uploaded content on which feedback is received. In some embodiments, the system may require users to forego any intellectual property rights and/or other ownership interests associated with thoughts and/or ideas provided as user feedback and/or user input during operation of the system described herein.

The system may further include a dashboard that enables the first user to manage his content (e.g., works of art, songs, videos, performances, and/or the like), view and analyze metrics associated with each piece of content, collections of content, message other users, upload and/or share content, configure rating criteria, and/or the like. In some embodiments, the first user may be enabled to configure rating criteria by weighting each rating criterion individually. By weighting one or more rating criteria, the first user may tailor the system-generated overall score to be more relevant to the first user's needs. In response, the system may assign numerical values to user input, content, and/or the like when the same in accordance with the user-specified weights.

Along these lines, FIG. 5 depicts an exemplary user profile page. The system may be configured to enable the first user and/or the second user to create a profile wherein the profile contains information 35 (demographic information, location information, an image, contact information, profile status, and/or the like). A score field may keep track of points and/or virtual currency earned by the user. Any information described herein may be analyzed by the system to help the first user understand second users, calculate numerical values, generate graphs of feedback, process user inputs, produce reports of analytics for content, generate recommendations for next and/or future content for users, generate recommendations for improving content, generate recommendations for purchases, generate interactions with content, and/or the like. The system may support manual and/or automatic entry of this information. In some embodiments, the information 35 may be populated on the user profile page by referencing data via an API and/or another database.

A "Menu" 2 button may be included throughout the interface that may allow for easy navigation. Included in the "Menu" 2 button may be a "Media" 36 button that allows the first user and/or the second user to select content for reviewing. A "Manager" 37 button may enable the first and/or the second user to manage his profile, upload content, manage uploaded content, share uploaded content, review analytics associated with uploaded content, and/or the like. A "Messages" 38 button may provide access to the system's internal messaging system and/or an external messaging system. A "Settings" 39 button may allow changes to be made to preferences, privacy, and/or the like. An "Exit" 40 button may close the program.

As seen in FIG. 6, the system may enable the first user and/or the second user to set preferences, settings, and/or the like. Also, the first user and/or the second user may be enabled to define a color via a color preference slider. Based on an analysis of the at least one color value associated with this defined color preference, the system may suggest next content, a playlist, an advertisement, and/or the like based on the user's selected color. In some embodiments, the analysis may operate similarly to the aforementioned method of extracting the at least one color value from the selected color. In some embodiments, the analysis may operate differently to the aforementioned method of extracting the at least one color value from the selected color. In some embodiments, the color preference value may be treated as an input, and thus may be utilized in various processes described herein. In some embodiments, the system may award virtual currency, points, and/or the like to the first user and/or the second user based on how often the first user and/or the second user changes or modifies the color preference, and/or in response to a user taking any other action and/or the system performing any operation described herein.

More generally, the system may be configured to award users an amount of a virtual currency (e.g., points, rewards, monetary funds, credits, tokens, non-fungible tokens, and/or the like) in exchange for performing a variety of actions. For example, a user may be awarded points for uploading content, reviewing content, reviewing analytics and feedback, creating and/or transmitting a predetermined number of feedback requests and/or feedback collection sessions, creating and/or transmitting a predetermined number of feedback requests and/or feedback collection sessions within a predetermined period of time, creating and/or transmitting a predetermined number of feedback requests and/or feedback collection sessions to a predetermined number of recipients, interacting with content, interacting with feedback results, interacting with a user interface, providing user input and/or various pieces of information, and/or the like. As another example, a user may be awarded points for listening, viewing, reviewing, and/or providing feedback on content, sharing content, and/or the like. A user may be incentivized with virtual currency, points, tokens, non-fungible tokens, credits, and/or a similar reward to share demographic information and/or provide feedback, to review a predetermined number of items of content, to review a predetermined number of items of content within a predetermined time period, to enable particular types of input collection (e.g., to enable camera and/or microphone monitoring), and/or for taking any other action described herein. In some embodiments, virtual currency may be redeemed for subscriptions to content and/or the online platform, access to various other features of the system, access to content, access to interactions with content, item purchases, content purchases, and/or the like.

Virtual currency may be earned by any user for any activity performed by the user and/or the system. Virtual currency may include Bitcoin, Ethereum units, blockchain artifacts, tokens, non-fungible tokens, notes, points, credits, units, stock, equity interests, and/or any item of value generated by blockchain activity. Virtual currency may also include proprietary items of value and/or items of value created by one or more users. Virtual currency may be spent by a user in association with any activity described herein and/or associated with the system, including actions performed by the user, actions performed by a device and/or the system, interactions with content, and/or the like.

The system may process user input such as a selected rating score, a color value and/or a numerical value associated with a selected color, text, images, notes, feedback interface selections, audio footage of a user, video footage of a user, biometric readings of a user, and/or any combination of the aforementioned by inputting user input and/or values associated with user input into an algorithm for computing one or more scores. Any of this information may also be used in any combination to determine the next content and/or future content for a second user, generate any recommendation contemplated herein, compute any metric described herein, and/or display any of the same. Any of this information may also be used in any combination to generate various metrics and/or analytics for the first user. Any of this information may also be used to generate various recommendations for improving and/or modifying the content.

In some embodiments, one or more inputs may be weighted in computing an overall rating score. For example, if the user inputs a guitar's rating score of 7.8, a color of red, a smiley face in the notes, and enters the keywords "love" and "guitar" in the notes, the system may increase the 7.8 to an 8.0 based on the additional positive inputs. Different combinations of color values, emoticons, keywords, numerical values, feedback interface selections, voice commands, facial gestures, and/or other inputs may have different effects on the rating value. In some embodiments, inputs may be processed according to a logarithmic scale. In some embodiments, inputs may be processed according to a linear regression model. In some embodiments, the inputs may be processed in another mathematical way.

As demonstrated above, the system may transmit raw user input and/or processed information (e.g., reports, analytics, metrics, markers, timestamps, values, recommendations, transformed user input, and/or the like) to the first user for viewing and/or further analysis. Other pieces of information that are transmitted by the system to the first user may include but is not limited to a point in time when a listener pressed "Next" and/or skipped the user's song, a total number of plays, a total number of likes, a total number of dislikes, a total number of playlist adds, a total number of views, a total number of shares, a total number of reviews, a total number of fans, a total number of friends, a predictability score of success, a point value, an overall score, a virtual currency value, a numerical value, metadata associated with content, purchase information, and/or the like. The system may be configured to capture, store, transmit, and/or display any piece of information described herein. The system may transmit recommendations for content and/or second content, including options for interacting with content, to the second user in response to the second user completing a review of first content.

The system may be configured to determine an overall and/or average color of an image an album cover and/or other image. The system may analyze an image by receiving its color values in a similar method as the one described above and determining an average, a majority, and/or similar assumption to identify and/or associate a color label with the image and/or content associated with the image. In some embodiments, the system may identify the color of the image by determining the at least one color value associated with each pixel. Another method may be used as well.

As used herein, the term "featured in" may mean include present in, perceived in, appearing in, comprised in, included in, heard in, detected in, identified in, any combination of the aforementioned, associated with, and/or any similar term. For example, a musical instrument that is featured in audio content may mean, in some embodiments, that a musical instrument can be heard by a user and/or detected by a device in the audio content.

In some embodiments, the system may be configured to interface with virtual reality and/or augmented reality techniques. While viewing and/or listening to content, a user may be enabled by the system to select various elements in the content to overlay, filter, enhance, process, augment, tweak, modify, manipulate, and/or otherwise interact with. For example, a user may use a feedback interface of the system to select various outfits, accents, languages, settings for a character in a television show, and the system may augment content presented to the user based on the user selection. The system may track and/or store which user selections are made and/or actions are taken by a user and/or a user device, including the times at which such actions occur, and include results and/or analysis regarding user selections in reports and/or when displaying feedback as described herein. For the avoidance of doubt, an indication on graph 1060 may represent any user action, user selection, user response, purchase, and/or device action described herein and/or otherwise contemplated by one of ordinary skill in the art at the time. Such an indication may indicate the time at which a certain action, selection, purchase, response, and/or the like occurred, was received and/or recorded by a device, stored, and/or any other time associated with the provision and/or receipt of user input (e.g., such actions, selections, responses, purchases, and/or the like) as well as the type of action.

In some embodiments, the system described herein may enable the user to interact with content being displayed on a user device, content being presented in a live setting, and/or content otherwise being accessed by the user. For example, the user may be enabled to control elements of content such as lighting, setting, locations, backgrounds, visuals, audio settings, volume, panning, audio mixes, story plots, stages, characters, accessories, clothes, fashion items, vehicles, dialogue, and/or any other element of content. In some embodiments, the user may also be enabled to select, change, modify, purchase, and/or interact with any element in content and/or in a metaverse associated with content. In some embodiments, the ability to select, modify, and/or interact with content and/or elements of content may be associated with payment of virtual currency, physical currency, digital currency, tokens, cryptocurrency, and/or any other value. For example, a user may view content that features a virtual embodiment of the user (e.g., an avatar) driving a vehicle along a road, wherein the user is enabled to customize his avatar's appearance (e.g., clothes, accessories, body shape, body image, body features, and/or the like), the vehicle type, color, style, manufacturer, and/or the like (e.g., a red sports car made by a particular manufacturer, a green military motorcycle, and/or the like) by making selections and/or otherwise interacting with a user interface, a user device, and/or another element of the system described herein. The principle of requiring payment to access content and/or elements of content using the system described herein may apply to selection of any element of any type of content.

In some embodiments, a user may be enabled by the system to upload and/or import content and/or elements of content to be featured in content. For example, a user may be enabled to select on his user device a photo of himself and upload the photo to the system, wherein his picture is used to generate various elements of content, such as a character's appearance. The system may also employ various security mechanisms described herein to prevent a user from uploading content, including content that is not owned by the user, that the user is not authorized to import and/or upload, that is deemed inappropriate, and/or the like.

Each selection, choice, modification. interaction, and/or the like may require a payment to be made to a company, a licensor, a user, an account, and/or the like. For example, the user viewing content may be required to pay a predetermined number of credits to a creator, a manufacturer, a licensor, and/or a provider (and/or another user or entity) associated with the content in exchange for the ability to experience, use, purchase, select and/or otherwise interact with certain content. A purchase of content may be for a limited period of time, a predetermined number of iterations and/or uses, and/or for unlimited use.

The system may be enabled to identify and/or keep track of each user's purchases, including when purchases are made. In some embodiments, the system may analyze and/or process user purchases, generate a purchase history, and/or display user purchases on graph 1060 where each indication is associated with a purchase at a point in time. Different purchases may be presented on graph 1060 in different styles based on purchase type, purchase amount, purchase time, and/or any other characteristic. In some embodiments, the system may be enabled to recommend purchases to a user based on a user's activity, preferences, prior purchases, user interactions with content, location, and/or the like.

In some embodiments, the system may integrate with one or more smart contracts, blockchain protocols, cryptographic hash functions, and/or some other distributed ledger technology. The system may, in response to performing any action contemplated herein, initiate and/or complete one or more transactions, validations, authentications, requests, and/or any other action associated with a blockchain, a protocol, a smart contract, a hash function, and/or another distributed ledger technology. The system may be enabled to identify, record, store, analyze, display, and/or otherwise track such actions. Such actions, along with any other actions described herein, may be displayed on a graph 1060 and/or graph 1066 as an indication and/or any other representation of data.

In some embodiments, the system may identify and/or track one or more locations associated with the user and/or a user device associated with the user. The system may use any kind of location information and/or geo-filtering technique to determine whether a user is authorized to access content, which content to present to the user, which actions and/or purchases a user can take, and/or perform any system action contemplated herein. Location information may include GPS coordinates, proximity to a reference point (e.g., a device, a beacon, a repeater, a server, a computer, a sensor, and/or the like). For example, the system may determine, based on an analysis of location information associated with the user and/or a user device, that a user is inside a particular movie theater that presents a particular movie only to those present in that theater, and in response, display the particular movie to the user, enable the user to interact with the movie and/or elements in the movie, enable the user to provide feedback on the movie, and/or the like. Should the user move into a second movie theater that presents a second movie, the user may then receive options for interacting with the second movie instead of the first movie (e.g., first content).

Location information may also be utilized by the system as a security mechanism for determining whether a user is permitted and/or authorized to receive, view, listen, experience, and/or otherwise consume content and/or elements of content. It may also be used to restrict access to content. For example, if a user is determined, based on the system's analysis of location information associated with the user and/or a user device, to be within a predetermined distance of a device associated with the provision of content, then the user may be enabled to experience such content, receive notifications associated with such content, join a feedback collection session associated with the content, provide feedback on such content, and/or otherwise interact with such content. However, if the user is determined to be farther away from the access point associated with the content than a permitted distance, then the system may determine that the user is not permitted to access and/or otherwise interact with the content, terminate a communication connection associated with the user, and/or otherwise prevent the user from accessing the content, particular elements of content (e.g., licensed content), interacting with content, providing feedback on content, participating in a feedback collection session, and/or the like.

Security mechanisms surrounding location information may help control the distribution of content and/or elements of content (e.g., licensed content) to users as well as the collection of feedback outside of particular areas, regions, countries, cities, and/or the like. For example, location information techniques described herein may prevent users located outside of a predetermined area from providing feedback on content when a user desires to collect feedback on the content only from users located within the predetermined area. The system may be enabled to determine the location of any user and/or any user device and utilize such location information to perform any action described herein.

In some embodiments, the system may be enabled to determine, based on an analysis of user input, value associated with user input, user data, user preferences, user settings, user history, user activity, location information, parameters of a feedback collection session, metadata, content, settings, watermark information, and/or any other piece of information contemplated herein, that a user is not authorized to transmit, share, experience, and/or otherwise access content and/or particular elements of content. Similarly, the system may be enabled to determine, based on an analysis of the same information that content, elements of content, and/or access to content was shared, transmitted, and/or otherwise accessed in an unauthorized manner. In response to determining that a user has taken an unauthorized action and/or that content has been accessed in an otherwise unauthorized manner, the system may be enabled to take any action described herein, including terminating a communication connection with a user and/or a user device, pausing and/or terminating the provision of content to one or more users, locking a user account, flagging content and/or content sections, flagging a user, removing content and/or elements of content, muting content and/or elements of content, blurring and/or covering content and/or elements of content, turning off a user device, identifying and/or recording a time value associated with the determination, generating a notice and/or notifying a user associated with the content, and/or the like. In order to determine an action is authorized and/or unauthorized, the system may access and/or reference a protocol, a guide, a set of rules, and/or other information that identifies authorized and/or unauthorized users, locations, content, and/or the like.

FIG. 8 illustrates an exemplary process flow 800 for generating a rating score based on a variety of inputs. At block 810, the process includes receiving at least one input, wherein the at least one input comprises at least one of a first numerical value, an emoticon, a color, or at least one keyword. At block 820, the process includes processing the at least one input. At block 830, the process includes generating a second numerical value based on processing the at least one input.

FIG. 7 presents an exemplary block diagram of the system environment 700 for implementing the interactive music feedback system described herein. As illustrated, the system environment 700 may include a network 710, a system 730, and/or a user input system 740. Also shown in FIG. 7 is a user 745 of the user input system 740. The user input system 740 may be a mobile device described herein. The user 745 may be a person who uses the user input system 740 to execute a user application 747, such as a first user and/or a second user. The user application 747 may be an application to communicate with the system 730, facilitate the playing and/or reviewing of media content, enable the inputting of information onto a user interface presented on the user input system 740, or the like. The user application 747 and/or the system application 737 may incorporate one or more parts of any process described herein.

As shown in FIG. 7, the system 730 and the user input system 740 may each be operatively and/or selectively connected to the network 710, which may include one or more separate networks. In addition, the network 710 may include a telecommunication network, local area network (LAN), a wide area network (WAN), a Bluetooth network, and/or a global area network (GAN), such as the Internet. It will also be understood that the network 710 may be secure and/or unsecure and may also include wireless and/or wireline and/or optical interconnection technology.

The user input system 740 may include any computerized apparatus (e.g., device) that can be configured to perform any one or more of the functions of the user input system 740 described and/or contemplated herein. For example, the user 745 may use the user input system 740 to transmit and/or receive information or commands to and from the system 730. In some embodiments, for example, the user input system 740 may include a personal computer system (e.g., a non-mobile or non-portable computing system, a motor vehicle, or the like), a mobile computing device, a personal digital assistant, a mobile phone, a tablet computing device, a network device, and/or the like. As illustrated in FIG. 7, in accordance with some embodiments of the present invention, the user input system 740 may include a communication interface 742, a processor 744, a memory 746 having an user application 747 stored therein, and/or a user interface 749. In such embodiments, the communication interface 742 may be operatively and/or selectively connected to the processor 744, which may be operatively and/or selectively connected to the user interface 749 and the memory 746. In some embodiments, the user 745 may use the user application 747 to execute processes described herein.

Each communication interface described herein, including the communication interface 742, may include hardware, and, in some instances, software, that enables the user input system 740, to transport, send, receive, and/or otherwise communicate information to and/or from the communication interface of one or more other systems on the network 710. For example, the communication interface 742 of the user input system 740 may include a wireless transceiver, modem, server, electrical connection, and/or another electronic device that operatively connects the user input system 740 to another system such as the system 730. The wireless transceiver may include a radio circuit to enable wireless transmission and/or reception of information. Additionally, the user input system 740 may include a positioning system. The positioning system (e.g., a global positioning system (GPS), a network address (IP address) positioning system, a positioning system based on the nearest cell tower location, and/or the like) may enable at least one of the user input system 740, an external server, and/or a computing device in communication with the user input system 740 to determine the location (e.g., location coordinates) of the user input system 740.

Each processor described herein, including the processor 744, may include circuitry for implementing the audio, visual, and/or logic functions of the user input system 740. For example, the processor may include a digital signal processor device, a microprocessor device, and various analog-to-digital converters, digital-to-analog converters, a camera, a microphone, and/or other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 747 of the memory 746 of the user input system 740.

Each memory device described herein, including the memory 746 for storing the user application 747 and/or other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally and/or alternatively include an EEPROM, flash memory, and/or the like. The memory may store any one or more of pieces of information and/or data used by the system in which it resides to implement the functions of that system.

As shown in FIG. 7, the memory 746 may include the user application 747. In some embodiments, the user application 747 may include an interface for communicating with, navigating, controlling, configuring, and/or using the user input system 740. In some embodiments, the user application 747 may include computer-executable program code portions for instructing the processor 744 to perform one or more of the functions of the user application 747 and/or system described and/or contemplated herein. In some embodiments, the user application 747 may include and/or use one or more network and/or system communication protocols.

Also shown in FIG. 7 is the user interface 749. In some embodiments, the user interface 749 may include one or more output devices, such as a display and/or a speaker, for presenting information to the user 745. In some embodiments, the user interface 749 may include one or more input devices, such as one or more buttons, keys, dials, levers, directional pads, joysticks, accelerometers, controllers, microphones, touchpads, touchscreens, haptic interfaces, microphones, scanners, motion detectors, cameras, biometric scanners, and/or the like for receiving information from the user 745. In some embodiments, the user interface 749 may include the input and display devices of a mobile device, which are operable to receive and display information. The user interface 749 may include a feedback interface, a feedback collection session management interface, a use profile, a display of feedback, and/or various selectable portions of an interface as described above.

FIG. 7 also illustrates a system 730, in accordance with an embodiment of the present invention. The system 730 may refer to the "system" and/or "apparatus" described herein. The system 730 may include any computerized apparatus (e.g., computing device) that can be configured to perform any one or more of the functions of the system 730 described and/or contemplated herein. In accordance with some embodiments, for example, the system 730 may include a computer network, an engine, a platform, a server, a database system, a front end system, a back end system, a personal computer system, and/or the like. In some embodiments, such as the one illustrated in FIG. 7, the system 730 includes a communication interface 732, a processor 734, and a memory 736, which includes a system application 737 and a datastore 738 stored therein. As shown, the communication interface 732 is operatively and selectively connected to the processor 734, which is operatively and/or selectively connected to the memory 736.

It will be understood that the system application 737 may be configured to implement any one or more portions of the various user interfaces and/or processes described herein. The system application 737 may interact with the user application 747. It will also be understood that, in some embodiments, the memory may include other applications such as content streaming services, social media platforms, media players, blockchains and/or other data storage platforms, and/or the like. It will also be understood that, in some embodiments, the system application 737 may be configured to communicate with the datastore 738, the user input system 740, and/or the like.

It will be further understood that, in some embodiments, the system application 737 may include computer-executable program code portions for instructing the processor 734 to perform any one or more of the functions of the system application 737 described and/or contemplated herein. In some embodiments, the system application 737 may include and/or use one or more network and/or system communication protocols.

In addition to the system application 737, the memory 736 may also include the datastore 738. As used herein, the datastore 738 may include one or more distinct and/or remote datastores. In some embodiments, the datastore 738 may not be located within the system and may instead be located remotely from the system. In some embodiments, the datastore 738 may store information and/or data described herein. For example, the datastore 738 may store information associated with user accounts, user inputs, reviews, processed inputs, generated reports, numerical values, reference tables, and/or the like. The datastore 738 may also be integrated with one or more other databases such as blockchains, third party data storage systems, and/or the like.

It will be understood that the datastore 738 may include any one or more storage devices, including, but not limited to, datastores, databases, and/or any of the other storage devices typically associated with a computer system. It will also be understood that the datastore 738 may store information in any known way, such as, for example, by using one or more computer codes and/or languages, alphanumeric character strings, data sets, figures, tables, charts, links, documents, and/or the like. Further, in some embodiments, the datastore 738 may include information associated with one or more applications, such as, for example, the system application 737. It will also be understood that, in some embodiments, the datastore 738 may provide a substantially real-time representation of the information stored therein, so that, for example, when the processor 734 accesses the datastore 738, the information stored therein is current and/or substantially current.

It will be understood that the embodiment of the system environment illustrated in FIG. 7 is exemplary and that other embodiments may vary. As another example, in some embodiments, the system 730 includes more, fewer, and/or different components. As another example, in some embodiments, some and/or all of the portions of the system environment 700 may be combined into a single portion. Likewise, in some embodiments, some or all of the portions of the system 730 may be separated into two or more distinct portions.

In addition, the various portions of the system environment 700 may be maintained for and/or by the same or separate parties. It will also be understood that the system 730 may include and/or implement any embodiment of the present invention described and/or contemplated herein. For example, in some embodiments, the system 730 may be configured to implement any one or more of the embodiments of the processes described and/or contemplated herein in connection with any process described herein. Additionally, the system 730 and/or the user input system 740 may be configured to initiate presentation of any of the user interfaces described herein.

In accordance with embodiments of the invention, the term "module" with respect to a system may refer to a hardware component of the system, a software component of the system, and/or a component of the system that includes both hardware and software. As used herein, a module may include one or more modules, where each module may reside in separate pieces of hardware and/or software.

Although many embodiments of the present invention are described herein, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. "And" may refer to "or," and vice versa. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), and/or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and/or hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention may be written in conventional procedural programming languages, such as the "C" programming languages and/or similar programming languages. The computer program code may alternatively and/or additionally be written in one or more multi-paradigm programming languages, such as, for example, F #.

Some embodiments of the present invention are described herein with reference to figures including flowchart illustrations, block diagrams of apparatuses, systems, and/or computing environments, user interfaces, and/or methods. It will be understood that each element of the figures and/or this description and/or combinations of the same may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the figures and/or description.

The one or more computer-executable program code portions may be stored in a transitory and/or non-transitory computer-readable medium (e.g., a memory) that can direct, instruct, and/or cause a computer and/or other programmable data processing apparatus and/or system to function in a particular manner, such that the computer-executable program code portions stored in the computer-readable medium produce an article of manufacture including instruction mechanisms which implement the steps and/or functions specified in the figures and/or description.

The one or more computer-executable program code portions may also be loaded onto a computer and/or other programmable data processing apparatus, system, and/or device to cause a series of operational steps to be performed on a computer and/or other programmable apparatus. In some embodiments, this produces a computer-implemented process such that the one or more computer-executable program code portions which execute on a computer and/or another programmable apparatus provide operational steps to implement the steps specified in the figures and/or the functions specified in the specification Alternatively, computer-implemented steps may be combined with, and/or replaced with, operator- and/or human-implemented steps in order to carry out an embodiment of the present invention.

While certain exemplary embodiments have been described and/or shown in the accompanying drawings, it is to be understood that such embodiments are merely illustrative of and not restrictive on the broad invention, and that this invention should not be limited to the specific constructions and arrangements shown and described, since various other changes, combinations, omissions, modifications and/or substitutions, in addition to those set forth in the above paragraphs, are possible. Those skilled in the art will appreciate that various adaptations, modifications, and/or combinations of the described embodiments can be configured without departing from the scope and/or spirit of the invention. Therefore, it is to be understood that, within the scope of the appended claims, the invention may be practiced other than as specifically described herein.

Referring now to FIGS. 9A and 9B, FIGS. 9A and 9B illustrate an exemplary computing environment 900 for enabling users to provide feedback during playback of media content as described herein. FIG. 9A provides an exemplary elemental view of the computing environment, whereas FIG. 9B provides an exemplary connectivity diagram of the computing environment 900 elements. As shown, the computing environment 900 may be included in and/or utilized by any device described herein. For example, the computing environment 900 may be included in and/or utilized by one or more elements of system environment 700 of FIG. 7. More particularly, the computing environment may be included in and/or utilized by the system 730 and/or the user input system 740 of FIG. 7. Additionally, any units and/or subunits described herein with reference to FIGS. 9A and 9B may be included in one or more elements of FIG. 7. Similarly, any element and/or combination of elements in FIG. 7 may be included in and/or include any unit and/or any subunit of the computing environment 900. The computing environment 900 and/or any of its units and/or subunits described herein may include general hardware, specifically-purposed hardware, and/or software. Each unit and/or subunit of the computing environment 900 may include, utilize, and/or refer to each other.

The computing environment 900 may include, among other elements, a processing unit 902, a memory unit 904, an input/output (I/O) unit 906, and/or a communication unit 908. As described herein, each of the processing unit 902, the memory unit 904, the I/O unit 906, and/or the communication unit 908 may include and/or refer to a plurality of respective units, subunits, and/or elements. Furthermore, each of the processing unit 902, the memory unit 904, the I/O unit 906, and/or the communication unit 908 may be operatively and/or otherwise communicatively coupled with each other so as to facilitate the operations described herein.

The processing unit 902 may control any of the one or more units 904, 906, 908, as well as any included subunits, elements, components, devices, and/or functions performed by the units 904, 906, 908 included in the computing environment 900. The processing unit 902 may also control any unit and/or device included in the system 900 of FIGS. 9A and 9B. Any actions described herein as being performed by a processor may be taken by the processing unit 902 alone and/or by the processing unit 902 in conjunction with one or more additional processors, units, subunits, elements, components, devices, and/or the like. Additionally, while only one processing unit 902 may be shown in FIGS. 9A and 9B, multiple processing units may be present and/or otherwise included in the computing environment 900. Thus, while instructions may be described as being executed by the processing unit 902 (and/or various subunits of the processing unit 902), the instructions may be executed simultaneously, serially, and/or by one or multiple processing units 902 in parallel.

In some embodiments, the processing unit 902 may be implemented as one or more computer processing unit (CPU) chips and/or graphical processing unit (GPU) chips and may include one or more hardware devices capable of executing computer instructions. For example, the processing unit 902 and/or a subunit of the processing unit 902 may include an application-specific integrated circuit (ASIC) and/or the like. The processing unit 902 may execute instructions, codes, computer programs, and/or scripts. The instructions, codes, computer programs, and/or scripts may be received from and/or stored in the memory unit 904, the I/O unit 906, the communication unit 908, subunits and/or elements of the aforementioned units, other devices and/or computing environments, and/or the like. As described herein, any unit and/or subunit (e.g., element) of the computing environment 900 and/or any other computing environment may be utilized to perform any operation. Particularly, the computing environment 900 may include a generic computing system and/or a customized computing system designed to perform the various methods described herein.

In some embodiments, the processing unit 902 may include, among other elements, subunits such as a profile management unit 910, a content management unit 912, a location determination unit 914, a graphical processing unit (GPU) 916, a selection unit 918, a reporting unit 920, a recommendation unit 922, and/or a resource allocation unit 924. Each of the aforementioned subunits of the processing unit 902 may be communicatively and/or otherwise operably coupled with each other.

The profile management unit 910 may facilitate generation, modification, analysis, transmission, and/or presentation of a user profile associated with a user. For example, the profile management unit 910 may prompt a user via a user device to register by inputting authentication credentials, personal information (e.g., an age, a gender, demographic information, and/or the like), contact information (e.g., a phone number, a zip code, a mailing address, an email address, a name, and/or the like), and/or the like. The profile management unit 910 may receive, process, analyze, organize, and/or otherwise transform any data received from the user and/or another computing element so as to generate and/or store a user profile of a user. Possible information processed by the profile management unit 910 includes personal information, contact information, location information, user preferences, a photo, a video recording, an audio recording, a textual description, a virtual currency balance, a history or log of user activity, user preferences, settings, content, user input, feedback, recommendations, and/or the like. In some embodiments, the profile management unit 910 may enable a user to input desired settings associated with a media content review session.

The content management unit 912 may facilitate generation, modification, analysis, transmission, and/or presentation of media content, application data, user interfaces, user inputs, report outputs, and/or the like. For example, the content management unit 912 may control an audio-visual environment and/or appearance of application data and/or user interfaces during execution of various processes. Media content for which the content management unit 912 may be responsible may include advertisements, images, text, themes, audio files, video files, documents, media content, user interfaces, and/or the like. In some embodiments, the content management unit 912 may also interface with a third-party content server and/or memory location for identifying, receiving, transmitting, and/or distributing content to one or more users.

The location determination unit 914 may facilitate detection, determination, identification, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determination unit 914 may include various sensors, a radar, and/or other specifically-purposed hardware elements for enabling the location determination unit 914 to acquire, measure, and/or otherwise transform location information. The location determination unit 914 may identify and/or control a location of a user device, a system application, a cloud-based storage system, any user, and/or any computing device described herein.

The GPU 916 may facilitate generation, modification, analysis, processing, transmission, and/or presentation of media content, user interfaces, and/or any other content. In some embodiments, the GPU 916 may be utilized to render visual content, such as a web page, for presentation on a user device. The GPU 916 may also be utilized to perform any process and/or any portion of any process described herein. The GPU 916 may also include multiple GPUs and therefore may be configured to perform and/or execute multiple processes in parallel. The GPU 916 may also include a variety of other computing processors that are typical of computing devices.

The selection unit 918 may facilitate generation, modification, analysis, processing, transmission, transformation, and/or presentation of user inputs. More specifically, the selection unit 918 may detect and/or process one or more inputs provided at a user device by the first and/or second user. For example, the selection unit 918 may detect selections made on various user interfaces, such as a feedback interface, inputs provided as voice commands, gestures, and/or other means, and/or the like. The selection unit 918 may also transform detected and/or received user inputs into numerical values, determine time values and/or timestamps of feedback collection sessions, user inputs, and/or markers, aggregate user inputs received from multiple users, and/or process user inputs to generate scores, other numerical values, and/or otherwise transform raw user input into a form that is easily processible by the system. The selection unit 918 may also store user inputs in various forms (raw, processed, and/or the like) in a database associated with various types of content.

The reporting unit 920 may facilitate generation, modification, analysis, processing, transmission, and/or presentation of analytic reports. The reporting unit 920 may process, analyze, transform user input into various metrics, analytics, and/or reports for one or more users (e.g., the first user). For example, the reporting unit 920 may generate reports that include graphs that plot which instruments are liked and/or disliked during playback of content, which aspects of content can be improved, time markers, and/or the like. The reporting unit 920 may utilize any user input, any user information (e.g., profile information, demographic information, location information, preferences, user inputs, and/or the like) to generate scores, numerical values, graphs, comparisons, travel routes, target audiences, and/or any other report relating to how content was received by the second user(s). The reporting unit 920 may generate maps, results of feedback surveys, and/or the like. It may also transmit any type of data.

The recommendation unit 922 may facilitate generation, modification, analysis, processing, transmission, and/or presentation of recommendations to users. The recommendation unit 922 may generate recommendations for both the first user and the second user. With respect to the first user, the recommendation unit 922 may generate recommendations for improvements to a work of art. Based on feedback received from second users, these recommendations or suggestions for improving content may be included in reports made available to the first user after feedback has been collected from second users. With respect to the second user, the recommendation unit 922 may generate recommendations for media content delivery. For example, the recommendation unit 922 may recommend next content for the second user to listen to based on preferences identified from previously-provided feedback. Using an analysis of user input provided by a user, the recommendation unit 922 may be harnessed to tailor the user's playlists, content reviewing experiences, and/or other content delivery in a precise and preferential manner.

The resource allocation unit 924 may facilitate the determination, monitoring, analysis, and/or allocation of computing resources throughout the computing environment 900 and/or other computing environments. For example, the computing environment 900 may facilitate a high volume of (e.g., multiple) review sessions and/or transmissions between a large number of supported devices, web servers, cloud-based storage platforms, third party media players, online streaming services, social media networks, and/or other content platforms so that a first user may be enabled to collect feedback from many second users substantially in real time. Multiple first users doing this at the same time may also be desired. As such, computing resources of the computing environment 900 utilized by the processing unit 902, the memory unit 904, the I/O unit 906, and/or the communication unit 908 (and/or any subunit of the aforementioned units) such as processing power, data storage space, network bandwidth, and/or the like may be in high demand at various times during operation. Accordingly, the resource allocation unit 924 may be configured to manage the allocation of various computing resources as they are required by particular units and/or subunits of the computing environment 900 and/or other computing environments. In some embodiments, the resource allocation unit 924 may include sensors and/or other specially-purposed hardware for monitoring performance of each unit and/or subunit of the computing environment 900, as well as hardware for responding to the computing resource needs of each unit and/or subunit. In some embodiments, the resource allocation unit 924 may utilize computing resources of a second computing environment separate and distinct from the computing environment 900 to facilitate a desired operation.

For example, the resource allocation unit 924 may determine a number of simultaneous review sessions, feedback collection sessions, content streaming sessions, and/or data transmissions that have been requested and/or that are currently operating. The resource allocation unit 924 may then determine that the number of sessions and/or session requests meets and/or exceeds a predetermined threshold value. Based on this determination, the resource allocation unit 924 may determine an amount of additional computing resources (e.g., processing power, storage space of a particular non-transitory computer-readable memory medium, network bandwidth, and/or the like) required by the processing unit 902, the memory unit 904, the I/O unit 906, the communication unit 908, and/or any subunit of the aforementioned units for enabling safe and efficient operation of the computing environment 900 while supporting the number of simultaneous sessions, as well as transmission of content. The resource allocation unit 924 may then retrieve, transmit, control, allocate, and/or otherwise distribute determined amount(s) of computing resources to each element (e.g., unit and/or subunit) of the computing environment 900 and/or another computing environment.

In some embodiments, factors affecting the allocation of computing resources by the resource allocation unit 924 may include a number of content requests, a number of active users, the size of the content, a duration of the content, a duration of time during which computing resources are required by one or more elements of the computing environment 900, and/or the like. In some embodiments, computing resources may be allocated to and/or distributed amongst a plurality of second computing environments included in the computing environment 900 based on one or more factors mentioned above. In some embodiments, the allocation of computing resources of the resource allocation unit 924 may include the resource allocation unit 924 flipping a switch, adjusting processing power, adjusting memory size, partitioning a memory element, transmitting data, controlling one or more input and/or output devices, modifying various communication protocols, and/or the like. In some embodiments, the resource allocation unit 924 may facilitate utilization of parallel processing techniques such as dedicating a plurality of GPUs and/or other processors included in the processing unit 902 for processing sessions, session requests and/or distribution of media content between multiple units and/or subunits of the computing environment 900 and/or other computing environments.

In some embodiments, the memory unit 904 may be utilized for storing, recalling, receiving, transmitting, and/or accessing various files and/or information during operation of the computing environment 900. The memory unit 904 may include various types of data storage media such as solid state storage media, hard disk storage media, and/or the like. The memory unit 904 may include dedicated hardware elements such as hard drives and/or servers, software elements such as cloud-based storage drives, distributed ledger technologies, blockchains, distributed storage systems, and/or the like. For example, the memory unit 904 may include various subunits such as an operating system unit 926, an application data unit 928, an application programming interface (API) unit 930, a profile storage unit 932, a content storage unit 934, a training unit 936, a secure enclave 938, and/or a cache storage unit 940.

The memory unit 904 and/or any of its subunits described herein may include random access memory (RAM), read only memory (ROM), and/or various forms of secondary storage. RAM may be used to store volatile data and/or to store instructions that may be executed by the processing unit 902. For example, the data stored may be a command, a current operating state of the computing environment 900, an intended operating state of the computing environment 900, and/or the like. As a further example, data stored in the memory unit 904 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 904 may include one or more databases (e.g., references tables, a cloud-based storage platform, web servers, a secure web container, blockchains, a user device, and/or the like) for storing any data described herein. Additionally or alternatively, one or more secondary databases located remotely from the computing environment 900 may be utilized and/or accessed by the memory unit 904.

The operating system unit 926 may facilitate deployment, storage, access, execution, and/or utilization of an operating system utilized by the computing environment 900 and/or any other computing environment described herein (e.g., a user device, a secure web container, a web server, a cloud-based storage platform, and/or the like). In some embodiments, the operating system may include various hardware and/or software elements that serve as a structural framework for enabling the processing unit 902 to execute various operations described herein. The operating system unit 926 may further store various pieces of information and/or data associated with operation of the operating system and/or the computing environment 900 as a whole, such as a status of computing resources (e.g., processing power, memory availability, resource utilization, and/or the like), runtime information, modules to direct execution of operations described herein, user permissions, security credentials, and/or the like.

The application data unit 928 may facilitate deployment, storage, access, execution, and/or utilization of an application utilized by the computing environment 900 and/or any other computing environment described herein (e.g., a user device, a secure web container, a web server, a cloud-based storage platform, and/or the like). For example, users may be required to download, access, and/or otherwise utilize a software application on a user device such as a smartphone in order for various operations described herein to be performed. Applications required may include a specific rating application, a social media application, a content streaming application, an Internet radio application, a web application, and/or the like. As such, the application data unit 928 may store any information and/or data associated with the application. Information included in the application data unit 928 may enable a user to execute various operations described herein. The application data unit 928 may further store various pieces of information and/or data associated with operation of the application and/or the computing environment 900 as a whole, such as a status of computing resources (e.g., processing power, memory availability, resource utilization, and/or the like), runtime information, modules to direct execution of operations described herein, user permissions, security credentials, and/or the like.

The API unit 930 may facilitate deployment, storage, access, execution, and/or utilization of information associated with APIs of the computing environment 900 and/or applications running on the same and/or any other computing environment described herein (e.g., a user device). For example, computing environment 900 may include one or more APIs for enabling various devices, applications, computing environments, and/or the like to communicate and/or integrate with each other and/or share data (e.g., social media applications, music streaming applications, media players, content platforms, and/or the like). Accordingly, the API unit 930 may include API databases containing information that may be accessed and/or utilized by applications and/or operating systems of other devices and/or computing environments. In some embodiments, each API database may be associated with a customized physical circuit included in the memory unit 904 and/or the API unit 930. Additionally, each API database may be public and/or private, and so authentication credentials and/or a license may be required to access information in an API database.

The profile storage unit 932 may facilitate deployment, storage, access, and/or utilization of information associated with user profiles of users by the computing environment 900 and/or any other computing environment described herein. For example, the profile storage unit 932 may store users' contact information, authentication credentials, user preferences, user history and/or log of behavior, personal information, location information, received input and/or sensor data, and/or metadata. In some embodiments, the profile storage unit 932 may communicate with the profile management unit 910 to receive and/or transmit information associated with a user's profile.

The content storage unit 934 may facilitate deployment, storage, access, and/or utilization of information associated with requested content by the computing environment 900 and/or any other computing environment described herein. For example, the content storage unit 934 may store media content (e.g., one or more images, text, videos, audio content, advertisements, metadata, user interfaces, user inputs, processed user inputs, feedback, recommendations, and/or the like) to be presented to a user and/or processed during operations described herein. The content storage unit 934 may store content that may be recalled user devices, web servers, systems, and/or any other computing device during operations described herein. In some embodiments, the content storage unit 934 may communicate with the content management unit 912 to receive, stream, and/or transmit content from/to web servers, third party content platforms, user devices, and/or the like.

The training unit 936 may facilitate deployment, storage, access, analysis, and/or utilization of machine learning techniques related to interpreting user inputs, processed user inputs, and/or other information (e.g., user information, location information, and/or the like). For example, the training unit 936 may analyze user inputs, processed user inputs, metadata, user demographic information, and/or any other information to identify trends of review habits, determine whether received user input is associated with a positive, negative, and/or neutral emotion, recommend next content for a user, recommend improvements to content, and/or the like. In some embodiments, the training unit 936 may be comprised in a secure network location such as behind a firewall, in a sandbox, in a virtual machine computing environment, in a secure enclave 938, and/or within a separate memory partition so as to not be vulnerable to hacking attacks.

The secure enclave 938 may facilitate secure storage of data. In some embodiments, the secure enclave 938 may include a partitioned portion of storage media included in the memory unit 904 that is protected by various security measures. For example, the secure enclave 938 may be hardware secured. In other embodiments, the secure enclave 938 may include one or more firewalls, encryption mechanisms, authentication requirements, and/or other security-based protocols. Authentication credentials of a user may be required prior to providing the user access to data stored within the secure enclave 938. The secure enclave 938 may include and/or be included in the encrypted data stores and/or any other data store described herein.

The cache storage unit 940 may facilitate short-term deployment, storage, access, analysis, and/or utilization of data. For example, the cache storage unit 948 may serve as a short-term storage location for data so that the data stored in the cache storage unit 948 may be accessed quickly. In some embodiments, the cache storage unit 940 may include RAM and/or other storage media types that enable quick recall of stored data. The cache storage unit 940 may included a partitioned portion of storage media included in the memory unit 904.

As described herein, the memory unit 904 and its associated elements may store any suitable information. Any aspect of the memory unit 904 may comprise any collection and/or arrangement of volatile and/or non-volatile components suitable for storing data. For example, the memory unit 904 may comprise random access memory (RAM) devices, read only memory (ROM) devices, magnetic storage devices, optical storage devices, distributed storage devices, and/or any other suitable data storage devices. In particular embodiments, the memory unit 904 may represent, in part, computer-readable storage media on which computer instructions and/or logic are encoded. The memory unit 904 may represent any number of memory components within, local to, and/or accessible by a processor.

The I/O unit 906 may include hardware and/or software elements for enabling the computing environment 900 to receive, transmit, and/or present information. For example, elements of the I/O unit 906 may be used to receive user input from a user via a user device, present media content and/or user interfaces to the user via the user device, and/or the like. In this manner, the I/O unit 906 may enable the computing environment 900 to interface with a human user. As described herein, the I/O unit 906 may include subunits such as an I/O device 942, an I/O calibration unit 944, and/or content driver 946.

The I/O device 942 may facilitate the receipt, transmission, processing, presentation, display, input, and/or output of information as a result of executed processes described herein. In some embodiments, the I/O device 942 may include a plurality of I/O devices. In some embodiments, the I/O device 942 may include one or more elements of a user device, a computing system, a server, and/or a similar device. The I/O device 942 may include a variety of elements that enable a user to interface with the computing environment 900. For example, the I/O device 942 may include a keyboard, a touchscreen, a touchscreen sensor array, a controller, a mouse, a stylus, a button, a sensor, a depth sensor, a tactile input element, a location sensor, a biometric scanner, a laser, a microphone, a camera, a heartbeat monitor, an electrocardiogram device, a brain scanning device, an eye scanning device, a wearable device, a screen, a display, and/or another element for receiving and/or collecting input from a user and/or information associated with the user and/or the user's environment. Additionally and/or alternatively, the I/O device 942 may include a display, a screen, a projector, a sensor, a vibration mechanism, a light emitting diode (LED), a speaker, a radio frequency identification (RFID) scanner, a wearable device, an embedded device, a headset, glasses, and/or another element for presenting and/or otherwise outputting data to a user. In some embodiments, the I/O device 942 may communicate with one or more elements of the processing unit 902 and/or the memory unit 904 to execute operations described herein. For example, the I/O device 942 may include a display, which may utilize the GPU 916 and/or another processor to present content to a user of a user device. The I/O device 942 may also be utilized for collecting user input (e.g., interface selections, voice commands, gestures, and/or the like).

The I/O calibration unit 944 may facilitate the calibration of the I/O device 942. For example, the I/O calibration unit 944 may detect, receive, and/or determine one or more settings of the I/O device 942, and then adjust and/or modify settings so that the I/O device 942 may operate more efficiently.

In some embodiments, the I/O calibration unit 944 may utilize a content driver 946 (and/or multiple content drivers) to calibrate the I/O device 942. For example, the content driver 946 may be installed on and/or otherwise accessible by a user device so that the user device may recognize and/or integrate with the I/O device 942, thereby enabling content to be displayed, received, generated, and/or the like. Additionally, the content driver 946 may facilitate the receipt, detection, retrieval, and/or recognition of user input at a user device. In some embodiments, the I/O device 942 may be calibrated by the I/O calibration unit 944 based on information included in the content driver 946.

The communication unit 908 may facilitate establishment, maintenance, monitoring, and/or termination of communications (e.g., a content streaming connection and/or distribution of content, web application data, user input, Bluetooth®, cellular data, WiFi, and/or the like) between the computing environment 900 and other devices such as user devices, web servers, cloud-based storage platforms, social media platforms, media players, content platforms, other computing environments, third party server systems, blockchains, and/or the like. The communication unit 908 may further enable communication between various elements (e.g., units and/or subunits) of the computing environment 900. In some embodiments, the communication unit 908 may include a network protocol unit 948, an API gateway 950, an encryption engine 952, and/or a communication device 954. The communication unit 908 may include hardware and/or software elements. In some embodiments, the communication unit 908 may be utilized to transmit and/or receive media content, user inputs, reports, recommendations, information, metadata, and/or any other data contemplated herein.

The network protocol unit 948 may facilitate establishment, maintenance, and/or termination of a communication connection between the computing environment 900 and another device by way of a network. For example, the network protocol unit 948 may detect and/or define a communication protocol required by a particular network and/or network type. Communication protocols utilized by the network protocol unit 948 may include Wi-Fi protocols, Li-Fi protocols, cellular data network protocols, Bluetooth® protocols, WiMAX protocols, Ethernet protocols, powerline communication (PLC) protocols, blockchain protocols, distributed ledger protocols, Voice over Internet Protocol (VoIP), device protocols, network protocols, and/or the like. In some embodiments, facilitation of communication between the computing environment 900 and any other device, as well as any element internal to the computing environment 900, may include transforming and/or translating data from being compatible with a first communication protocol to being compatible with a second communication protocol. In some embodiments, the network protocol unit 948 may determine and/or monitor an amount of data traffic to consequently determine which particular network protocol is to be used for establishing a web browsing session, a content streaming session, a feedback collection session, a network connection, distributing web content, transmitting data, and/or performing other operations described herein.

The API gateway 950 may facilitate the enablement of other devices and/or computing environments to access the API unit 930 of the memory unit 904 of the computing environment 900. For example, a user device may access the API unit 930 via the API gateway 950. In some embodiments, the API gateway 950 may be required to validate user credentials associated with a user of a user device prior to providing access to the API unit 930 to the user. The API gateway 950 may include instructions for enabling the computing environment 900 to communicate with another device.

The encryption engine 952 may facilitate translation, encryption, encoding, decryption, and/or decoding of information received, transmitted, and/or stored by the computing environment 900. Using the encryption engine, each transmission of data and/or instance of information may be encrypted, encoded, and/or translated for security reasons, and any received data may be encrypted, encoded, and/or translated prior to its processing and/or storage. For example, the encryption engine 952 may be utilized to encrypt content, user input, feedback results, recommendations, and/or any information contemplated herein. In some embodiments, the encryption engine 952 may generate and/or refer to an encryption key, an encoding key, a translation key, and/or the like, which may be transmitted along with any data content. In some embodiments, the encryption engine 952 and/or a processing device associated with the computing environment may utilize one or more cryptographic hash functions for processing data and/or compression algorithms to compress content, user input, processed user input, feedback results, recommendations, and/or any other information contemplated herein.

The communication device 954 may include a variety of hardware and/or software specifically purposed to enable communication between the computing environment 900 and another device, as well as communication between elements of the computing environment 900. In some embodiments, the communication device 954 may include one or more radio transceivers, chips, analog front end (AFE) units, antennas, processing units, memory, other logic, and/or other components to implement communication protocols (wired or wireless) and related functionality for facilitating communication between the computing environment 900 and any other device. Additionally and/or alternatively, the communication device 954 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes. The communication device 954 may also include and/or refer to various storage locations such as a blockchain, cloud-based storage systems, hard drives, and/or the like.

It is contemplated that the computing elements be provided according to the structures disclosed herein may be included in integrated circuits of any type to which their use commends them, such as ROMs, RAM (random access memory) such as DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and/or VLIW (very long instruction word) processors, and/or to analog integrated circuits such as digital to analog converters (DACs) and/or analog to digital converters (ADCs). ASICS, PLAs, PALs, gate arrays and specialized processors such as digital signal processors (DSP), graphics system processors (GSP), synchronous vector processors (SVP), and/or image system processors (ISP) all represent sites of application of the principles and structures disclosed herein.

Implementation is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, and/or any combination thereof. When an embodiment is embodied, at least in part, in software, the software may be stored in a non-volatile, machine-readable medium.

Networked computing environment such as those provided by a communications server may include, but are not limited to, computing grid systems, distributed computing environments, cloud computing environments, device-based computing devices, blockchains, and/or the like. Such networked computing environments include hardware and software infrastructures configured to form a virtual organization comprised of multiple resources which may be in geographically disperse locations.

In some embodiments, the network described herein may include any wireless and/or wired communications network that facilitates communication (e.g., transmission and/or receipt of between the computing environment 900 and any other device. For example, the one or more networks may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

In some embodiments, each selectable portion of the plurality of selectable portions may comprise at least one of a touchscreen region, a touchpad region, a screen region, a pad region, a user interface region, a button, a button region, a tab, a tab region, a bar, a bar region, a window, a window region, a slider, a slider region, a menu item, a radio button selection, an image, an image region, an icon, an icon region, text, an optics lens, and a biometric sensor.

In some embodiments, a selection of the selected selectable portion may comprise at least one of a touch of, a click of, a tap of, a hold of, a selection of, an engaging of, a swipe of, a triggering of, a push of, a pull of, a movement of, a gesture in, a gesture over, a hover over, and an interaction with at least one of a touchscreen region, a touchpad region, a screen region, a pad region, a user interface region, a button, a button region, a tab, a tab region, a bar, a bar region, a window, a window region, a slider, a slider region, a headset, a wearable device, a menu item, a radio button selection, an image, an image region, an icon, an icon region, text, an optics lens, and a biometric sensor.

In some embodiments, a selection of a selected selectable portion may indicate that a user emotionally responded to media content at the point in time associated with the selection of the selected selectable portion.

In some embodiments, an indication that a user emotionally responded to media content may comprise an indication that the first user at least one of liked, loved, disliked, hated, heard, noticed, favorited, shared, saved, downloaded, talked about, commented about, purchased, saw, viewed, heard, watched, enjoyed, deleted, removed, engaged with, paid attention to, ignored, grew tired of, felt good about, felt happy about, felt neutral about, felt sad about, felt bad about, felt angry about, felt lonely about, felt excited about, felt curious about, felt interested in, felt disinterested about, felt introspective about, felt inspired by, felt unsure about, felt fond toward, felt distant toward, wanted to hear more of, wanted to hear less of, wanted to hear more loudly, wanted to hear less loudly, wanted to change, wanted to notate, wanted to hear again, wanted to stop playback of, smiled about, frowned about, scowled about, snarled about, laughed about, danced to, swayed to, fell asleep to, rolled eyes because of, rested eyes because of, closed eyes because of, opened eyes because of, and cried because of media content and/or a performance of a particular element and/or musical instrument featured in media content.

In some embodiments, an indication that a user emotionally responded to media content may comprise an indication that the user emotionally responded to a performance of a musical instrument associated with a selected selectable portion.

In some embodiments, content and/or a performance of a musical instrument associated with a selected selectable portion and/or any element featured in content may comprise at least one of a recorded performance, a live performance, a sports performance, a taped performance, a videoed performance, a human performance, a computer-generated performance, a sampled performance, a programmed performance, a computer-executed performance, a triggered performance, a processed performance, a presentation of, a demonstration of, a triggering of, a production of, an interaction with, and a playing of the musical instrument associated with the selected selectable portion, another element featured in the content, and/or the content.

In some embodiments, a performance of a musical instrument associated with a selected selectable portion and/or another element of and/or featured in the content may be featured in and/or associated with at least one audio track comprised in the content.

In some embodiments, a musical instrument associated with a selectable portion and/or another element of content may comprise at least one of a stringed instrument, a keyed instrument, a brass instrument, a woodwind instrument, a percussion instrument, a human voice, a digital voice, an analog instrument, a digital instrument, a hybrid instrument, an electronic instrument, a hardware instrument, a software instrument, a virtual instrument, and a synthesizer.

In some embodiments, a timestamp and/or time value of a point in time associated with a selection of a selectable portion may comprise at least one of a length of time, a time value, a playback position, a playhead position, a date value, a numerical value, an alphanumeric value, a hexadecimal value, and a value.

In some embodiments, a duration of time associated with content may comprise at least one of a length of time, a time value, a playback position, a region, a section, a playhead position, a date value, a numerical value, an alphanumeric value, a hexadecimal value, and/or another value associated with the content.

In some embodiments, a duration of time associated with content may comprise only a portion of at least one of a length of time, a region, a section, a time value, a playback position, a playhead position, a date value, numerical value, an alphanumeric value, a hexadecimal value, and a value associated with the content.

In some embodiments, user input may be received substantially simultaneously to and/or after a point in time associated with a selection of a selectable portion.

In some embodiments, at least one of the first user and the second user is enabled to filter, by a computing processor, at least one response to content from a display of responses to content by user, musical instrument, timestamp, time of receipt, date of receipt, user input, transformed user input, value, selection, and/or deselection so as to cause display of only a subset of all responses to content.

In some embodiments, the first user and/or the second user may be enabled to modify, by a computing processor, a display of responses to content by zooming, moving, translating, and/or navigating along an axis of the display and/or otherwise interacting with values associated with user input, user input, a musical instrument, content, a user, a style, a label, text, an image, an icon, metadata, and/or a value.

In some embodiments, a display of responses to content may comprise a display of user input, transformed user input, a value, text, an icon, an image, and/or an indication associated with a user, content, and/or a response to content.

In some embodiments, a display of responses to content may be generated in response to receiving, from a database and/or by a computing processor, user input, transformed user input, a timestamp, a time value, a duration, a style, a value, a label, text, an image, an icon, metadata, a username, and/or an element associated with content.

In some embodiments, a style associated with a user, an instrument and/or element associated with a selectable portion, an instrument and/or element associated with content, content, a location, a recommendation, a trend, and/or any other piece of information described herein may comprise a color, a transparency, a type, a weight, a shape, a design, a line, a stem, a data point, a label, text, an image, an icon, and/or a value. In some embodiments, a style may identify an indication as being associated with at least one of the aforementioned pieces of information described herein.

In some embodiments, a performance includes a recorded performance, a live performance, a sports performance, a taped performance, a videoed performance, a human performance, a computer-generated performance, a sampled performance, a programmed performance, a computer-executed performance, a triggered performance, a processed performance, a presentation of, a demonstration of, a triggering of, a production of, an interaction with, and a playing of content and/or an element of content such as a musical instrument. In some embodiments, a performance may be featured in at least one audio and/or video track comprised in content.

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of," and/or other similar terms should generally be construed broadly to include situations both where communications and connections are direct between referenced elements or through one or more intermediaries between the referenced elements, including through the Internet or some other communicating network. "Network," "system," "environment," and/or other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and/or timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly and/or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

What is claimed is:

1. A method comprising:
receiving, by a first user interface at a user device, first user input from a first user at a point in time during playback of audio content;
providing a second user interface at the user device in response to receiving the first user input, wherein the second user interface comprises a plurality of selectable portions, wherein each selectable portion of the plurality of selectable portions represents an associated, different musical instrument featured in the audio content;

receiving, by the second user interface at the user device, second user input from the first user, wherein the second user input comprises a selection of a selectable portion of the plurality of selectable portions;

transforming, by at least one computing processor of the user device, the first user input and the second user input into transformed user input, wherein the transformed user input comprises a first value associated with the point in time at which the first user input was received and a second value associated with at least one of the selected selectable portion and the musical instrument associated with the selected selectable portion;

transmitting, by a communication interface of the user device, the transformed user input to a database not comprised in the user device for storage, wherein the transformed user input is associated in the database with at least one of the first user, a second user associated with the audio content, the musical instrument associated with the selected selectable portion, and the audio content; and generating, by at least one computing processor and using the transformed user input, a display of at least one user response to the audio content, wherein the display includes a substantially horizontal axis representing a duration of time associated with the audio content and an indication that the first user responded to the musical instrument associated with the selected selectable portion at the point in time at which the first user input was received, wherein the indication has an x-coordinate along the substantially horizontal axis representing the first value, and wherein the indication has a y-coordinate above, on, or below the substantially horizontal axis representing the second value.

2. The method of claim 1, wherein the first user input comprises at least one of a touch of, a click of, a tap of, a hold of, a selection of, an engaging of, a swipe of, a triggering of, a push of, a pull of, a movement of a gesture in, a gesture over, a hover over, and an interaction with at least one of a touchscreen region, a touchpad region, a screen region, a pad region, a user interface region, a button, a button region, a tab, a tab region, a bar, a bar region, a window, a window region, a slider, a slider region, a menu item, a radio button selection, an image, an image region, an icon, an icon region, text, an optics lens, and a biometric sensor.

3. The method of claim 1, wherein each selectable portion of the plurality of selectable portions comprises at least one of a touchscreen region, a touchpad region, a screen region, a pad region, a user interface region, a button, a button region, a tab, a tab region, a bar, a bar region, a window, a window region, a slider, a slider region, a menu item, a radio button selection, an image, an image region, an icon, an icon region, text, an optics lens, and a biometric sensor.

4. The method of claim 1, wherein the selection of the selected selectable portion comprises at least one of a touch of, a click of, a tap of a hold of, a selection of, an engaging of, a swipe of, a triggering of, a push of, a pull of, a movement of, a gesture in, a gesture over, a hover over, and an interaction with at least one of a touchscreen region, a touchpad region, a screen region, a pad region, a user interface region, a button, a button region, a tab, a tab region, a bar, a bar region, a window, a window region, a slider, a slider region, a menu item, a radio button selection, an image, an image region, an icon, an icon region, text an optics lens, and a biometric sensor.

5. The method of claim 1, wherein the indication indicates that the first user at least one of liked, loved, disliked, hated, heard, noticed, favorited, shared, saved, downloaded, talked about, commented about, purchased, deleted, removed, engaged with, paid attention to, ignored, grew tired of, felt good about, felt happy about, felt neutral about, felt sad about, felt bad about, felt angry about, felt lonely about, felt excited about, felt curious about, felt interested in, felt disinterested about, felt introspective about, felt inspired by, felt unsure about, felt fond toward, felt distant toward, wanted to hear more of, wanted to hear less of, wanted to hear more loudly, wanted to hear less loudly, wanted to change, wanted to notate, wanted to hear again, wanted to stop playback of, smiled about, frowned about, scowled about, snarled about, laughed about, danced to, swayed to, fell asleep to, rolled eyes because of, rested eyes because of, closed eyes because of, opened eyes because of, and cried because of the musical instrument associated with the selected selectable portion.

6. The method of claim 1, wherein the indication indicates that the first user responded to a performance of the musical instrument associated with the selected selectable portion.

7. The method of claim 6, wherein the performance of the musical instrument associated with the selected selectable portion comprises at least one of a recorded performance, a live performance, a taped performance, a videoed performance, a human performance, a computer-generated performance, a sampled performance, a programmed performance, a computer-executed performance, a triggered performance, a processed performance, a presentation of, a demonstration of, a triggering of, a production of, an interaction with, and a playing of the musical instrument associated with the selected selectable portion.

8. The method of claim 1, wherein the first user interface enables the first user to control playback of the audio content.

9. The method of claim 1, wherein the first value comprises at least one of a length of time, a duration, a time value, a playback position, a playhead position, a date value, a numerical value, an alphanumeric value, a hexadecimal value, and a value.

10. The method of claim 1, wherein the duration of time associated with the audio content comprises at least one of a length of time, a time value, a playback position, a playhead position, a date value, a numerical value, an alphanumeric value, a hexadecimal value, and a value associated with the audio content.

11. The method of claim 1, wherein the duration of time associated with the audio content comprises only a portion of at least one of a length of time, a time value, a playback position, a playhead position, a date value, numerical value, an alphanumeric value, a hexadecimal value, and a value associated with the audio content.

12. The method of claim 1, wherein the first user input is received prior to to the selection of the selected selectable portion.

13. The method of claim 1, wherein the first user input is received substantially simultaneously to the selection of the selected selectable portion.

14. The method of claim 1, wherein at least one of the first user and the second user is enabled to filter, by a computing processor, at least one response to the audio content from the display of at least one response to the audio content by at least one of user, musical instrument, time value, time of receipt, date of receipt, and demographic information such that the display of at least one response to the audio content comprises a display of a subset of all responses to the audio content.

15. The method of claim 1, wherein at, least one of the first user and the second user is enabled to modify, by a computing processor, the display of at least one response to the audio content by at least one of zooming, moving, translating, navigating, and selecting at least one duration portion along the substantially horizontal axis of the display.

16. The method of claim 1, wherein the display of at least one response to the audio content is generated in response to receiving, from the database and by a computing processor, at least one of the transformed user input, the first value, and the second value.

17. The method of claim 1, wherein the indication is displayed in a style associated with at least one of the first user and the musical instrument associated with the selected selectable portion.

18. The method of claim 17, wherein the style associated with at least one of the first user and the musical instrument associated with the selected selectable portion comprises at least one of a color, a transparency, a type, a weight, a shape, a design, a line, a stem, a data point, a label, text, an image, an icon, and a value that identifies the indication as being associated, with at least one of the first user and the musical instrument associated with the selected selectable portion.

19. A system comprising:
at least one memory comprising instructions; and
at least one processing device, wherein the instructions, when executed by the at least one processing device, cause the system to perform the operations of:
receiving, by a first user interface at a user device, first user input from a first user at a point in time during playback of audio content;
providing a second user interface at the user device in response to receiving the first user input, wherein the second user interface comprises a plurality of selectable portions, wherein each selectable portion of the plurality of selectable portions represents an associated, different musical instrument featured in the audio content;
receiving, by the second user interface at the user device, second user input from the first user, wherein the second user input comprises a selection of a selectable portion of the plurality of selectable portions;
transforming, by at least one computing processor of the user device, the first user input and the second user input into transformed user input, wherein the transformed user input comprises a first value associated with the point in time at which the first user input was received and a second value associated with at least one of the selected selectable portion and the musical instrument associated with the selected selectable portion;
transmitting, by a communication interface of the user device, the transformed user input to a database not comprised in the user device for storage, wherein the transformed user input is associated in the database with at least one of the first user a second user associated with the audio content, the musical instrument associated with the selected selectable portion, and the audio content; and
generating, by at least one computing processor and using the transformed user input, a display of at least one user response to the audio content, wherein the display includes a substantially horizontal axis representing a duration of time associated with the audio content and an indication that the first user responded to the musical instrument associated with the selected selectable portion at the point in time at, which the first user input was received, wherein the indication has an x-coordinate along the substantially horizontal axis representing the first value, and wherein the indication has a y-coordinate above, on, or below the substantially horizontal axis representing the second value.

20. A computer program product comprising at least one non-transitory computer-readable medium comprising code, wherein the code, when executed by at, least one processing device of a system, causes the system to perform the operations of:
receiving, by a first user interface at a user device, first user input from a first user at a point in time during playback of audio content;
providing a second user interface at the user device in response to receiving the first user input, wherein the second user interface comprises a plurality of selectable portions, wherein each selectable portion of the plurality of selectable portions represents an associated, different musical instrument featured in the audio content;
receiving, by the second user interface at the user device, second user input from the first user, wherein the second user input comprises a selection of a selectable portion of the plurality of selectable portions;
transforming, by at least one computing processor of the user device, the first user input and the second user input into transformed user input, wherein the transformed user input comprises a first value associated with the point in time at which the first user input was received and a second value associated with at least one of the selected selectable portion and the musical instrument associated with the selected selectable portion;
transmitting, by a communication interface of the user device, the transformed user input to a database not comprised in the user device for storage, wherein the transformed user input is associated in the database with at least one of the first user, a second user associated with the audio content, the musical instrument associated with the selected selectable portion, and the audio content; and
generating, by at least one computing processor and using the transformed user input, a display of at least one user response to the audio content, wherein the display includes a substantially horizontal axis representing a duration of time associated with the audio content and an indication that the first user responded to the musical instrument associated with the selected selectable portion at the point in time at which the first user input was received, wherein the indication has an x-coordinate along the substantially horizontal axis representing the first value, and wherein the indication has a y-coordinate above, on, or below the substantially horizontal axis representing the second value.

* * * * *